(12) United States Patent
Ogawa et al.

(10) Patent No.: US 7,991,263 B2
(45) Date of Patent: Aug. 2, 2011

(54) RECORDING MEDIUM ON WHICH 3D VIDEO IS RECORDED, PLAYBACK APPARATUS FOR PLAYING BACK 3D VIDEO, AND SYSTEM LSI

(75) Inventors: Tomoki Ogawa, Osaka (JP); Taiji Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/818,413

(22) Filed: Jun. 18, 2010

(65) Prior Publication Data

US 2010/0260481 A1 Oct. 14, 2010

Related U.S. Application Data

(62) Division of application No. 12/569,016, filed on Sep. 29, 2009.

(60) Provisional application No. 61/101,329, filed on Sep. 30, 2008.

(51) Int. Cl.
*H04N 5/77* (2006.01)
*H04N 5/775* (2006.01)

(52) U.S. Cl. ........................ 386/223; 386/230

(58) Field of Classification Search .................. 386/223, 386/230, 323, 324, 326, 337, 341, 210
See application file for complete search history.

(56) References Cited

U.S. PATENT DOCUMENTS 6,574,423 B1 6/2003 Oshima et al.
2003/0234909 A1* 12/2003 Collender et al. .............. 353/7

FOREIGN PATENT DOCUMENTS

| EP | 1 605 696 | 12/2005 |
| EP | 1 641 259 | 3/2006 |
| JP | 2007-515025 | 6/2007 |
| JP | 2008-67393 | 3/2008 |
| WO | 2004-077827 | 9/2004 |
| WO | 2005/002219 | 1/2005 |
| WO | 2005/048261 | 5/2005 |

* cited by examiner

*Primary Examiner* — Robert Chevalier
(74) *Attorney, Agent, or Firm* — Wenderoth, Lind & Ponack, L.L.P.

(57) ABSTRACT

A left view graphics stream and a right view graphics stream recorded on a recording medium each include one or more display sets, and the display sets are data groups used for displaying one screen worth of one or more graphics objects. The one or more display sets included in the left view graphics stream are in one-to-one correspondence with the one or more display sets included in the right view graphics stream, and an identical playback time for the video stream on the playback time axis is set in each of the corresponding display sets. Each display set includes state information indicating whether the data is all data necessary for displaying one screen worth of one or more graphics objects, or is a difference from the immediately previous display set, and the state information included in corresponding display sets indicate identical content.

9 Claims, 48 Drawing Sheets

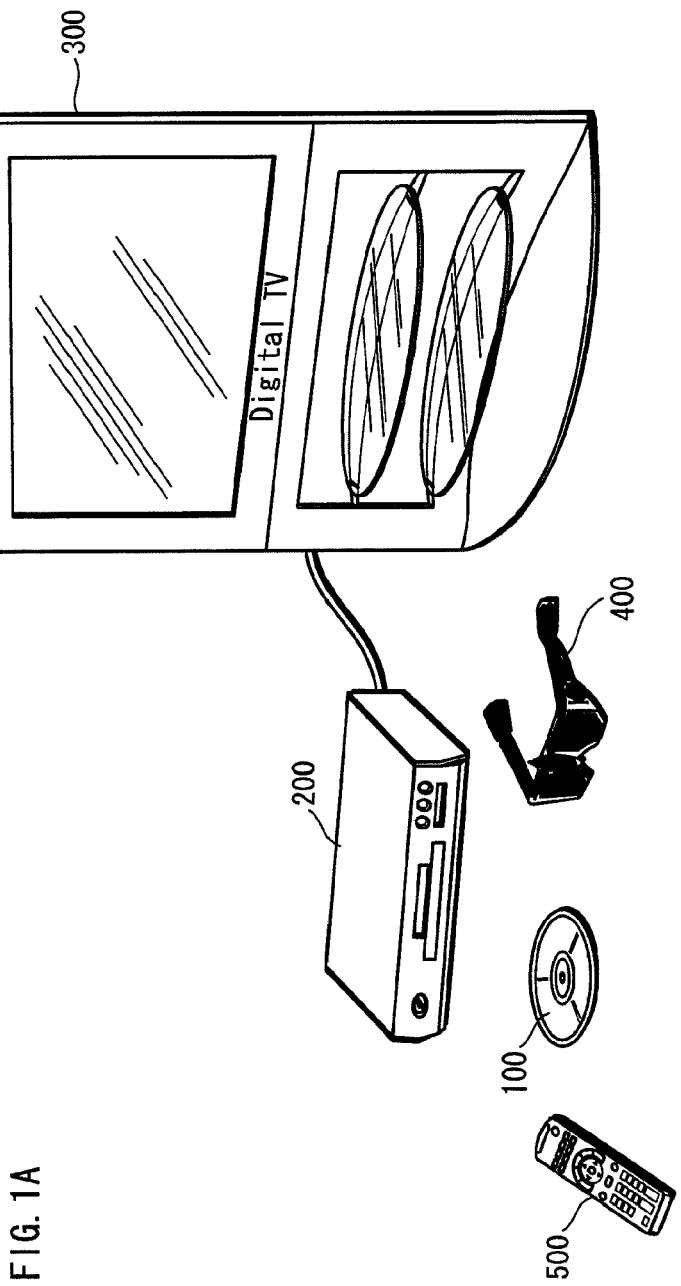
FIG. 1A
FIG. 1B   When viewing left view video
FIG. 1C   When viewing right view video

FIG. 6A

| PID range | PES stream types |
|---|---|
| 0x0100 | Program map |
| 0x1001 | PCR |
| 0x1011 | BaseView video (L or R) |
| 0x1012 | Enhanced View video (R or L) |
| 0x1100-0x111F | Audio |
| 0x1220-0x123F | BaseView PG graphics (L or R) |
| 0x1240-0x125F | EnhancedView PG graphics (R or L) |
| ⋮ | ⋮ |
| 0x1800 | Text subtitles |

FIG. 6B

Source packet sequence that makes up a BaseView

| Video =0x 1011 | Video =0x 1011 | Audio =0x 1100 | Audio =0x 1100 | PG =0x 1220 | PG =0x 1221 | PG =0x 1222 | PG =0x 1223 | PG =0x 1224 | PG =0x 1225 | PG =0x 1226 |
|---|---|---|---|---|---|---|---|---|---|---|

Source packet sequence that makes up an EnhancedView

| Video =0x 1012 | Video =0x 1012 | Audio =0x 1101 | Audio =0x 1101 | PG =0x 1240 | PG =0x 1241 | PG =0x 1242 | PG =0x 1243 | PG =0x 1244 | PG =0x 1245 |
|---|---|---|---|---|---|---|---|---|---|

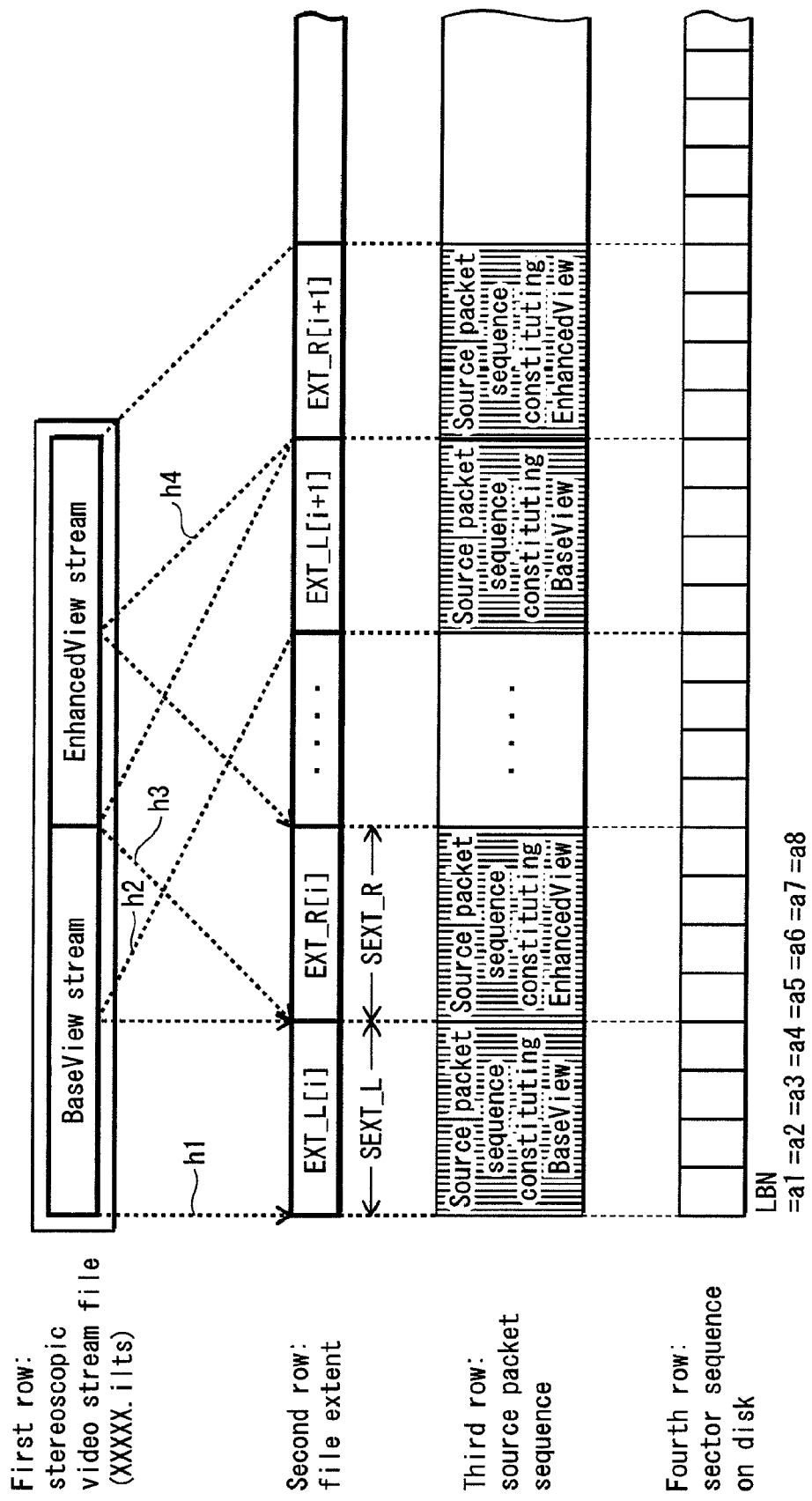

FIG. 14A
window_definition_segment

| window_id |
| window_horizontal_position |
| window_vertical_position |
| window_width |
| window_height |

FIG. 14B
presentation_composition_segment

| segment_type |
| segment_length |
| composition_number |
| composition_state |
| palette_update_flag |
| palette_id |
| composition_object(1) |
| composition_object(2) |
| ... |
| composition_object(i) |
| ... |
| composition_object(m) | wd1

| object_id |
| window_id |
| forced_on_flag |
| object_cropped_flag |
| object_horizontal_position |
| object_vertical_position |
| cropping_rectangle information (1) |
| cropping_rectangle information (2) |
| ... |
| cropping_rectangle information (i) |
| ... |
| cropping_rectangle information (n) | wd2

| object_cropping_horizontal_position |
| object_cropping_vertical_position |
| object_cropping_width |
| object_cropping_height |

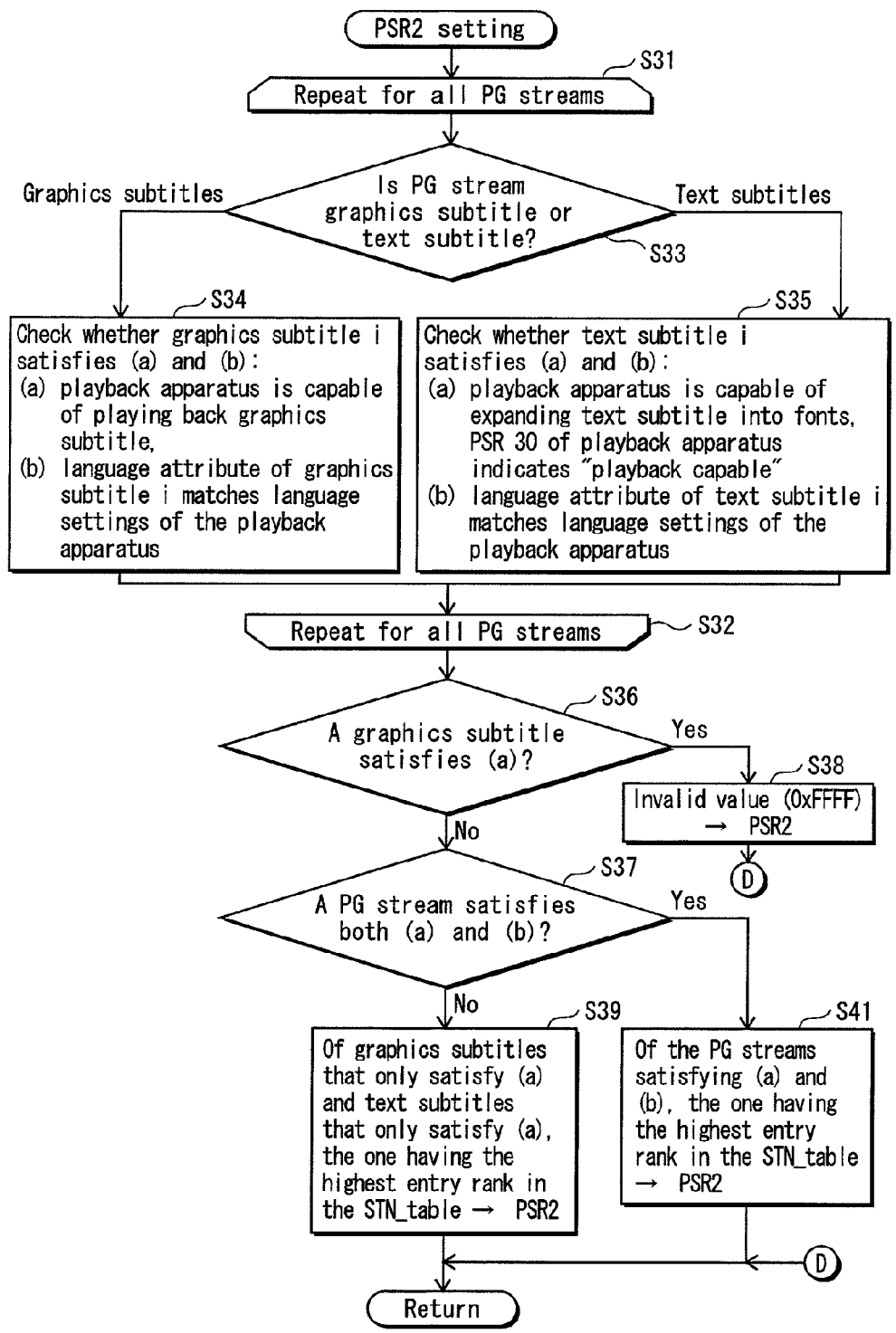

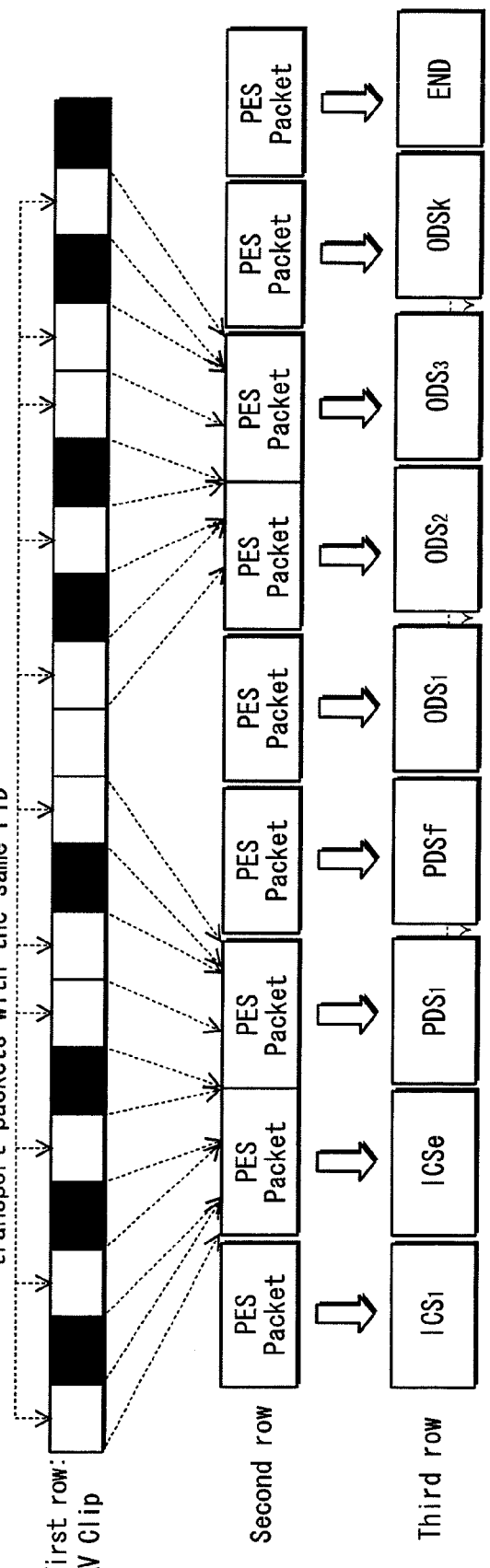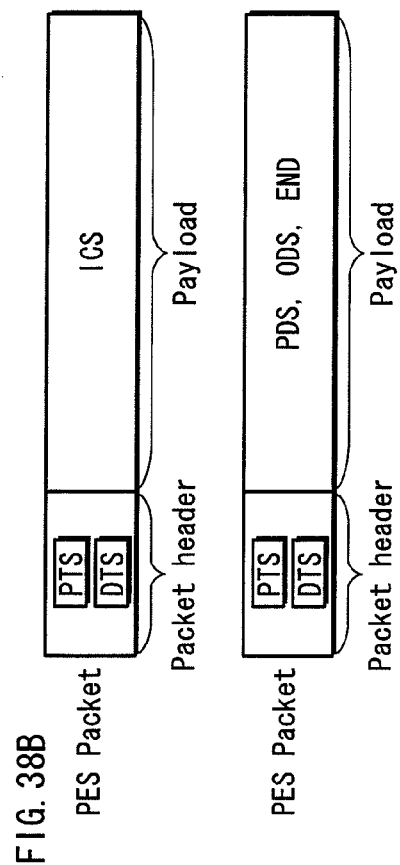

1 to 1 correspondence 1 to many correspondence

FIG.48A

| 3D-PCS | PCS | WDS | PDS | ODS | 3D-ODS | ODS | 3D-ODS | ODS | 3D-ODS | ODS | END |

Composition Segment: {3D-PCS, PCS}
Definition Segment: {WDS, PDS, ODS, 3D-ODS, ODS, 3D-ODS, ODS, 3D-ODS, ODS}

FIG.48B

| 3D-PCS (L) | 3D-PCS (R) | PCS | WDS | PDS | ODS | 3D-ODS | ODS | 3D-ODS | ODS | 3D-ODS | ODS | END |

Composition Segment: {3D-PCS(L), 3D-PCS(R), PCS}
Definition Segment: {WDS, PDS, ODS, 3D-ODS, ODS, 3D-ODS, ODS, 3D-ODS, ODS}

US 7,991,263 B2

RECORDING MEDIUM ON WHICH 3D VIDEO IS RECORDED, PLAYBACK APPARATUS FOR PLAYING BACK 3D VIDEO, AND SYSTEM LSI

This application is a Divisional of U.S. application Ser. No. 12/569,016, filed Sep. 29, 2009, which claims benefit of provisional U.S. application Ser. No. 61/101,329, filed Sep. 30, 2008.

BACKGROUND OF THE INVENTION (1) Field of the Invention

The present invention relates to stereoscopic view of graphics when using a 2-graphics decoder structure in a playback apparatus.

(2) Description of the Related Art

In recent years, distribution has rapidly increased of Blu-ray Discs (hereinafter referred to as "BD") compliant with a next-generation optical disk standard. A playback apparatus compatible with the BD-ROM standard enables enjoying video that has a high degree of realism by outputting a high-quality video stream in which subtitles and graphics have been superimposed on a display apparatus such as a display connected to the playback apparatus (for example, see patent document 1).

Meanwhile, as a technical trend of display apparatuses, not only flat images, but also stereoscopic view displays have begun to be distributed, which enable enjoying videos that seem to leap out at the viewer. Although there are various methods for stereoscopic displays, as a basic principle, a stereoscopic video is artificially created by implementing a system of showing different pictures to the left and right eyes as a left view and a right view, using the difference between the two eyes.

SUMMARY OF THE INVENTION

An issue arises of how to perform stereoscopic display of graphics to be composited with video and played back. Here, when the graphics are subtitles or a menu, the subtitle or menu can be caused to appear as if projecting out from the screen by shifting the coordinates of the image data making up the non-compressed graphics object according to the left view playback time and the right view playback time, respectively. In this coordinate shift, the graphics merely appear in front of the screen in a flat state, and do not appear stereoscopic themselves.

In movie works of recent years, there is an example of realizing animated graphics that meticulously synchronize the characters in the movie work by using a data structure of a Presentation Graphics Stream that is mainly used for subtitles.

In a stereoscopic view caused by a coordinate shift, when the graphics represent, for example, an animated character, it merely appears that a flat character is in front of the screen, and stereoscopically reproducing such features as the hollows in the animated character's face or the way the nose protrudes is impossible. For this reason, there is the view that this technology is insufficient for entertainment purposes.

In view of this, to make an animated character appear stereoscopically, there is an idea of combining left view graphics data and right view graphics data in one graphics stream, and by decoding the graphics stream, causing realization of stereoscopic view.

However, when using this idea, since the decoding load of the graphics decoder is doubled, a clock frequency that is a reference for operation of the graphics decoder must be made higher, thus preventing low product cost.

To avoid making the clock frequency higher, one approach is to make the graphics data have a 2-stream structure, and make the playback apparatus a 2-decoder structure. In other words, the left view graphics data and the right view graphics data are built into separate graphics streams, and the playback apparatus is equipped with two graphics decoders. Then, causing the two graphics decoders to process the two graphics streams enables causing the playback apparatus to decode the left view and right view graphics data without making the clock frequency too high.

Meanwhile, there is a problem that, when using the 2-decoder structure in the playback apparatus, the stereoscopic view of graphics during random access cannot be ensured. This problem is described specifically as follows. The left view and the right view graphics streams are structured respectively to include a plurality of display sets (hereinafter referred to as "DS"), and each DS is a data group to be used for displaying one screen worth of one or more graphics. There are a plurality of types of DS. There are DSs that include all data necessary for displaying one screen of graphics, and DSs that include only a difference from the immediately previous DS. A DS that indicates the difference from the immediately previous DS cannot independently perform display of the entire graphics. Here, since there is a difference in perspective between the image seen from the left view and the image seen from the right view, even in a case in which all data necessary for display of one screen of graphics are included, there are cases in which there is a great change from the immediately previous DS in the animated character in one DS, while due to a blind spot, there is not a great change in the animated character in the other DS. Therefore, it is thought that only including only the difference from the immediately previous DS is sufficient.

In this case, a problem occurs that, when skipping from these DSs in the playback apparatus, even if decoding can be performed correctly for one of the graphics, for the other one, the data necessary for playback cannot be provided to the decoder and cannot be decoded. As a result, there are cases in which a stereoscopic view of graphics is impossible during random access.

The present invention aims to provide a recording medium that ensures a stereoscopic view of graphics during random access.

To achieve the above aim, the recording medium that is an embodiment of the present invention is a recording medium on which is recorded a video stream, a left view graphics stream and a right view graphics stream, wherein the left view graphics stream and the right view graphics stream each include one or more display sets, each display set is a data group used for displaying one screen worth of one or more graphics objects, the one or more display sets included in the left view graphics stream are in one-to-one correspondence with the one or more display sets included in the right view graphics stream, and an identical playback time for the video stream on a playback time axis is set in display sets that correspond with each other, each display set includes state information indicating that the display set is one of (i) all data necessary for displaying the one screen worth of one or more graphics objects, and (ii) a difference from an immediately previous display set, and identical content is indicated by the state information included in display sets that correspond with each other in the left view graphics stream and the right view graphics stream.

According to the structure described above as means to solve the problem, state information of display sets of the left view graphics stream, and state information of display sets of a right view graphics stream that corresponds to the display set, have identical content. For this reason, when the state information in a display set of one graphics stream indicates that all data necessary for display of one screen worth of graphics are included, the state information in the corresponding display set of the other graphics stream indicates that all data necessary for displaying the one screen worth of graphics are included.

Accordingly, since the DSs are provided at points likely to be chosen as playback start points, during random access, if it is possible to decode one of the graphics streams, it is also necessarily possible to decode the other graphics stream. Thus, ensuring stereoscopic view of graphics during random access is possible.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 1 shows a structure of a home theater system;

FIG. 6 shows a plurality of numerical ranges into which the packet IDs of TS packets may fall, and PES stream types of TS packets of the packet IDs in the numerical value ranges, in correspondence with each other;

FIG. 7 shows an interleaving arrangement;

FIG. 14 shows a data structure of WDS and PCS;

FIG. 36 is a flowchart indicating a PSR2 setting procedure;

FIG. 38 shows an IG stream structure;

FIG. 48 shows a DS that includes a 3D-PCS.

DESCRIPTION OF THE PREFERRED EMBODIMENT

Figure 2:
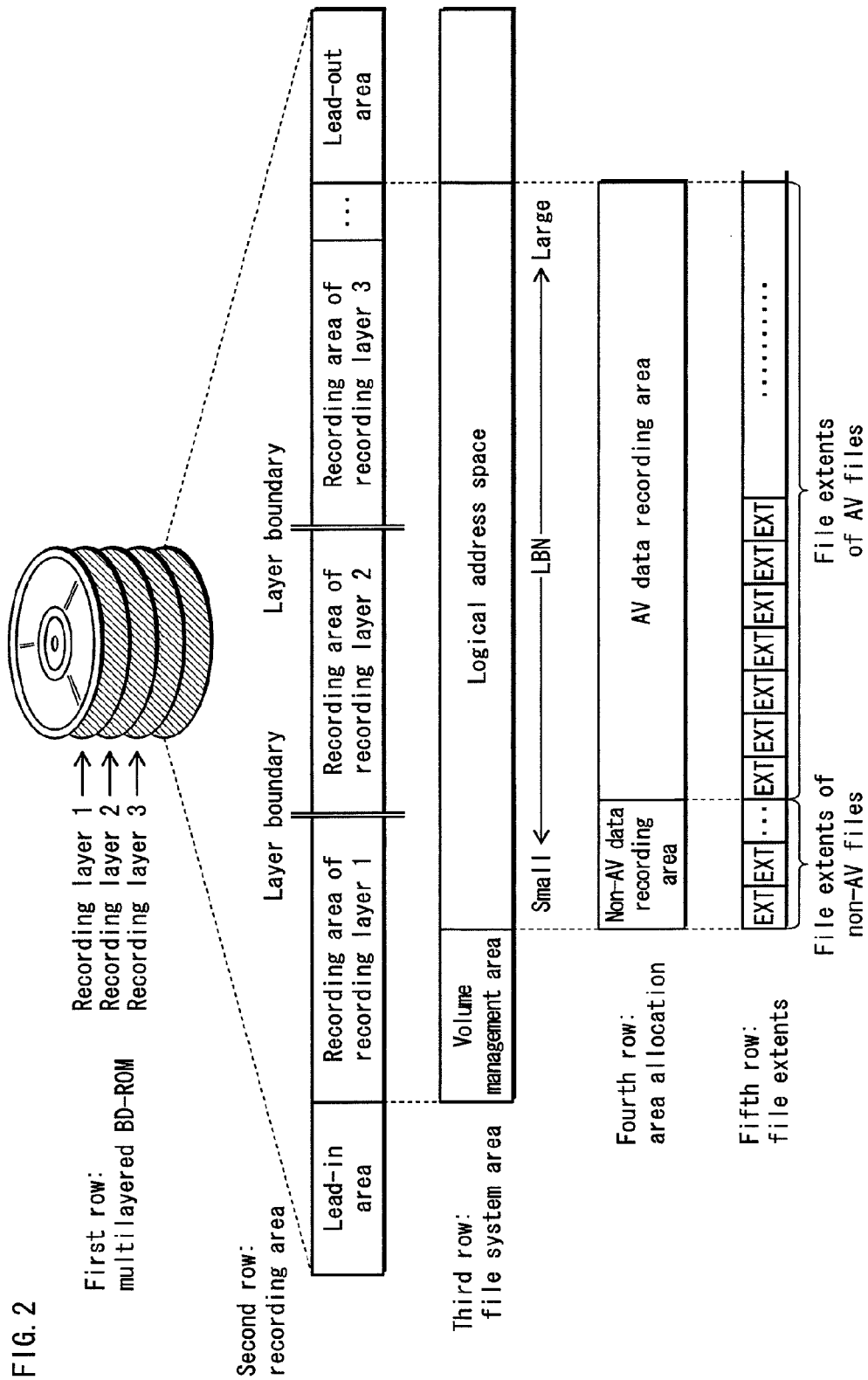
FIG. 2 shows an internal structure of a BD-ROM.

Embodiments of the present invention are described below with reference to the drawings.

Embodiment 1

Overall Structure

FIG. 1 shows a mode pertaining to a usage act of a recording medium and a playback apparatus. As shown in FIG. 1A, a BD-ROM 100 that is an example of the recording medium, and a playback apparatus 200 constitute a home theater system together with a television 300, a pair of liquid crystal shutter goggles 400, and a remote control 500, and are provided for use by a user.

The BD-ROM 100 supplies, for example, a movie to the home theater system.

The playback apparatus 200 is connected to the television 300, and plays back the BD-ROM 100.

The television 300 provides an interactive operation environment to the user by displaying the video playback of a movie, displaying a menu, etc.

The liquid crystal shutter goggles 400 are composed of a pair of liquid crystal shutters and a control unit, and realize a stereoscopic view with use of the parallax between the user's eyes. The liquid crystal shutters of the liquid crystal shutter goggles 400 use liquid crystal lenses having a property that the light transmittance of the lens changes depending on the applied voltage. The control unit of the liquid crystal shutter goggles 400 receives, from the playback apparatus, a synchronization signal indicating the switching between the output of a right view image and a left view image, and switches between a first state and a second state according to this synchronization signal.

FIG. 1B shows the first state. In the first state, the applied voltage is so adjusted to make the liquid crystal lens corresponding to the right view becomes non-transparent and the liquid crystal lens corresponding to the left view becomes transparent. In this state, an image for the left view is supplied for viewing.

FIG. 1C shows the second state. In the second state, the applied voltage is so adjusted to make the liquid crystal lens corresponding to the right view become transparent and the liquid crystal lens corresponding to the left view become non-transparent. In this state, the image for a right view is supplied for viewing.

In general, the right view and the left view of the human eyes perceive slightly different images due to the positional difference therebetween. This positional difference makes it possible for humans to perceive images visible to the eye as a stereoscopic image. In view of this, by synchronizing the timing at which the liquid crystal shutter goggles 400 switches between the first state and the second state as described above with the timing of switching the output between the right view image and the left view image, the user experiences an illusion that a flat surface is stereoscopic.

Next, the following describes a time interval for displaying the right view image and the left view image.

Specifically, in a monoscopic display image, there is a difference in viewing between a right view and a left view corresponding to the binocular parallax, and a display that appears stereoscopic is achieved by performing display by switching between the right view and the left view in a short time period.

The duration of each time interval should be short enough to create an optical illusion that a three-dimensional (i.e., stereoscopic) image is displayed.

Returning to FIG. 1A, the remote control 500 is a device for receiving user operations on a hierarchical GUI. In order to be able to receive such user operations, the remote control 500 is provided with a menu key for calling up a menu constituting the GUI, arrow keys for moving the focus from one GUI component to another GUI component of the menu, an enter key for activating a currently focused GUI element of the menu, and a return key for returning to a higher hierarchical page of the menu, and numeric keys.

This concludes the description of the home theater system.

Recording Medium

Next, the following describes the recording medium targeted for playback by the playback apparatus 200. The recording medium that is played back by the playback apparatus 200 is the BD-ROM 100. FIG. 2 shows the internal structure of the BD-ROM 100.

The first row depicts the BD-ROM, which is a multi-layered optical disk. The second row depicts a spiral track on each recording layer in a manner of being extended in a horizontal direction. The spiral track is handled as one contiguous recording area. The recording area is composed of a lead-in area located at the innermost position, a lead-out located at the outermost position, and the recording areas on the first, second, and third recording layers located between the lead-in and lead-out areas.

The third row depicts the file system area of the BD-ROM. The file system area is composed of a "volume management area" and a "logical address space".

The "volume management area" is an area having file system management information stored therein. The file system management information is used to handle the respective recording areas on the first, second, and third recording layers as one contiguous file system space.

The "logical address space" is an address space in which sectors are addressable with consecutive logical block numbers (LBNs). That is, the respective recording areas on the first, second, and third recording layers depicted on the second row constitute one contiguous logical address space.

The fourth row depicts the allocation of the logical address space in the file system management area. The file system management area has a non-AV data recording area at the innermost position and also has an AV data recording area immediately following the non-AV data recording area.

The fifth row depicts extents recorded in the non-AV data recording area and the AV data recording area. In the AV data recording area, extents (EXT, EXT, EXT . . . in the figure) constituting an AV file are recorded. In the non-AV data recording area, extents (EXT, EXT, EXT . . . in the figure) constituting a file other than an AV file are recorded.

Figure 3:
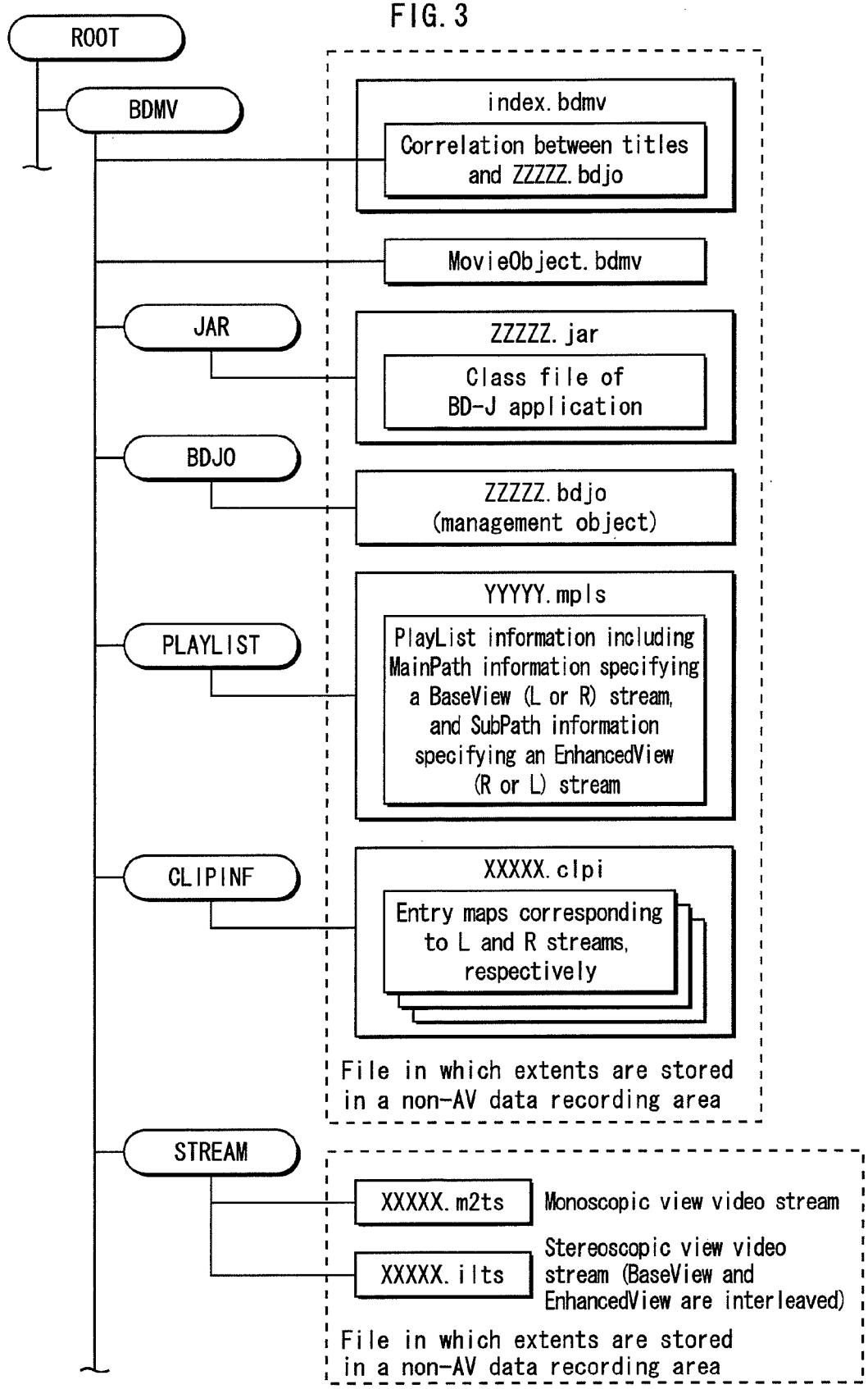
FIG. 3 shows an application format of the BD-ROM.

FIG. 3 depicts an application format of the BD-ROM.

The "BDMV directory" is a directory for storing such data as AV contents and management information handled on the BD-ROM. The BDMV directory has five sub-directories called "JAR directory", "BDJO directory", "PLAYLIST directory", "CLIPINF directory", and "STREAM directory".

The BDMV directory contains two types of files: "index.bdmv" and "MovieObject.bdmv".

The "index.bdmv" file contains management information relating to the entire BD-ROM. The index.bdmv file is read first after the disk is inserted to the playback apparatus, which enables the playback apparatus to uniquely identify the disk. In addition, the index.bdmv file indicates, for each of a plurality of titles available for playback on the BD-ROM, a title number and a BD-J object or movie object defining the title.

The "MovieObject.bdmv" contains one or more movie objects. Each movie object is a management object defining the control procedure to be executed by the playback apparatus in an operation mode (HDMV mode) in which a command interpreter is a control entity. The movie object includes one or more commands and a mask flag indicating whether or not to mask a menu call or a title call made by a user.

The "JAR directory" contains a JAR file corresponding to an archive file. The archive file is created by combining one or more class files and one or more data files into a single file. The one or more class files and one or more data files are combined into one file with the use of, for example, an archiver (not depicted).

The description below is directed to a Java (registered trademark) archive file as an example of the archive file.

For example, the Java (registered trademark) archive file defines the control procedure to be executed by the playback apparatus in an operation mode (BD-J mode). The control entity in the BD-J mode is a Java virtual machine, which is a bytecode interpreter, provided within the playback apparatus. A file containing a JAR file is identified by a 5-digit number "zzzzz" and the extension "jar".

The "BDJO directory" is a directory in which a file containing a management object (BDJ object) is placed. The BDJ object defines the control procedure to be executed by the playback apparatus in the operation mode (BD-J mode). The control entity in the BD-J mode is the Java virtual machine, which is a bytecode interpreter provided within the playback apparatus. A file containing a BDJ object is identified by a 5-digit number "zzzzz" and the extension "bdjo".

The "PLAYLIST directory" is a directory in which a file containing PlayList information is placed. The PlayList information includes main-path information specifying a playback section of a BaseView video stream and sub-path information specifying a playback section of an EnhancedView video stream. A file containing PlayList information is identified by a five-digit number "yyyyy" and the extension "mpls". The BaseView video stream is a video stream for presenting a monoscopic (two-dimensional) display for one of the left view and the right view. On the other hand, a video stream for presenting the right view or the left view and is not a BaseView video stream is referred to as an "EnhancedView video stream". Picture data constituting the EnhancedView video stream is compressed based on the screen correlation with picture data constituting a corresponding BaseView video stream.

One example of a video compression scheme employing the correlation between the right and left views is Multiview Video Coding (MVC), which is the video compression standard provided by amending MPEG-4 AVC/H.264. The Joint Video Team (JVT) is a joint project between ISO/IEC MPEG and ITU-T VCEG and completed the development of MVC, which is an amendment to H.264/MPEG-4 AVC video compression standard, in July 2008. MVC is intended for collectively encoding a plurality of video images for a plurality of different views. In the encoding, the correlation between past and future screens is used for encoding as well as the correlation between screens for different viewpoints to achieve a higher compression efficiency as compared with compression performed separately for screens of different views.

Streams constituting a BaseView and an EnhancedView are not limited to video streams. Presentation graphics (PG) streams may also constitute BaseView and EnhancedView. In the following description, a "BaseView stream" may refer to either of a BaseView video stream and a BaseView PG stream, and an "EnhancedView stream" refers to an EnhancedView video stream and an EnhancedView PG stream.

The "CLIPINF directory" is a directory in which a file containing clip information (clip information file) is placed. A clip information file is identified by a five-digit identifier "xxxxx" and the extension "clpi" and includes entry maps. One of the entry maps is of a video stream for the left view and another is of a video stream for the right view.

The extents constituting files contained in the directories mentioned above are recorded in the non-AV data area.

The "STREAM directory" is a directory for storing an AV clip file containing a monoscopic video stream and an AV clip file containing a stereoscopic video stream. A file containing a monoscopic video stream is identified by a five-digit identifier "xxxxx" and the extension "m2ts". A file storing a stereoscopic video stream is identified by a five-digit identifier "xxxxx" and the extension "ilts".

The extents constituting a file containing a BaseView stream and placed in the STREAM directory and the extent constituting a file containing an EnhancedView stream and placed in the STREAM directory are recorded in the AV data recording area.

Figure 4:
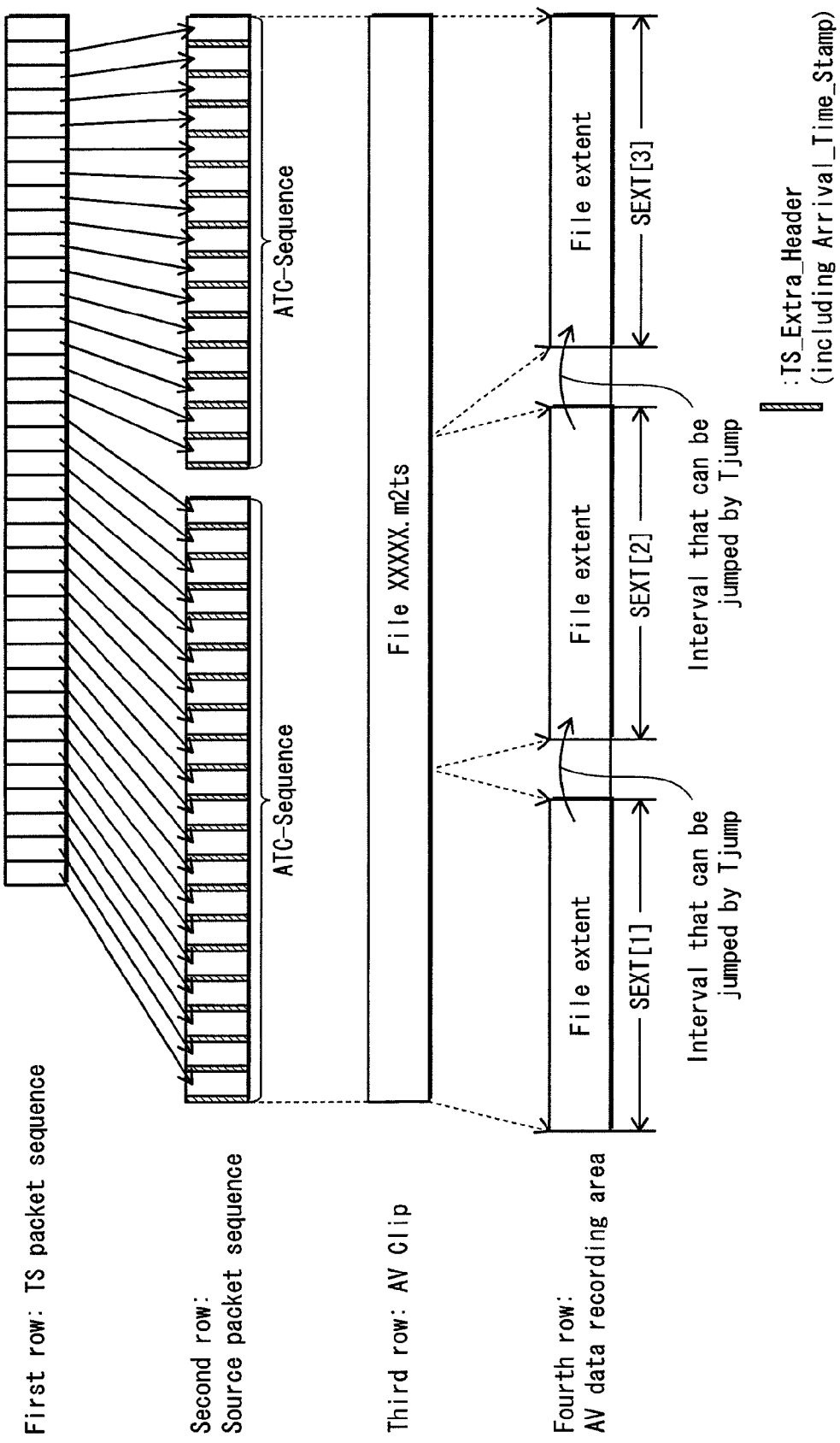
FIG. 4 shows a process through which source packets constituting a left view stream and a right view stream are written into an AV data area.

FIG. 4 shows the processes through which the source packets of a BaseView stream and of an EnhancedView stream are recorded into the AV data area. In the figure, the first row depicts TS packets constituting the BaseView stream or EnhancedView stream.

Each TS packet of 188 bytes that constitutes the BaseView stream or the EnhancedView stream is attached with a 4 byte TS_extra_header (hatched box in the figure) as depicted in the second row of the figure, which results in a sequence of source packets of 192 bytes. The TS_extra_header includes an Arrival_Time_Stamp indicating the time at which the TS packet is to be input to the decoder.

The source packets of the BaseView stream and EnhancedView stream constitute one or more "ATC sequences". An "ATC sequence" refers to an arrangement of source packets constituting the time axis for ATSs without any discontinuity (i.e., no arrival time-base discontinuity) in the values of Arrival_Time_Clock fields referred to by the Arrival_Time_Stamp fields. In other words, an "ATC sequence" refers to a sequence of source packets having a successive sequence of Arrival_Time_Clock fields referred to by the Arrival_Time_Stamp fields. As will be described below, an ATS is attached at the head of a TS packet and indicates the time at which the TS packet is to be transferred to the decoder.

Such an ATC sequence constitutes an AV clip and recorded on the recording layers with the file name "xxxxx.m2ts".

Similarly to any normal computer file, such an AV clip is divided into one or more file extents and recorded in the area on the recording layers. The third row of FIG. 4 depicts an AV clip and the fourth row schematically depicts how the AV clip is recorded. The file extents depicted on the fourth row as constituting a file has a data length equal to or greater than a predetermined size (the size is called S_EXT).

Figure 5:
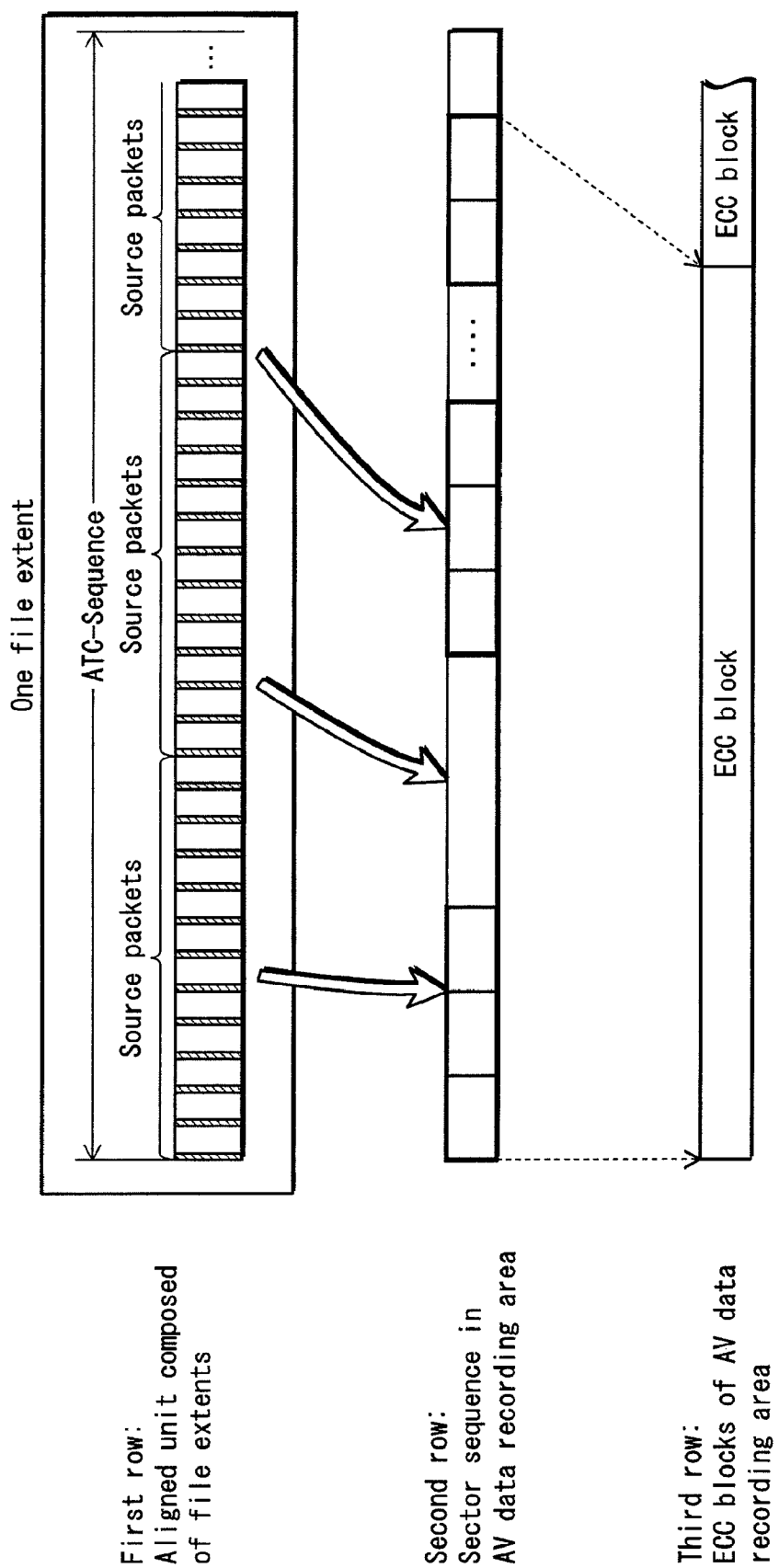
FIG. 5 shows correspondences between physical units of a BD-ROM and source packets constituting one file extent.

FIG. 5 depicts the relation between the physical units of the BD-ROM and the source packets constituting one file extent. As depicted on the second row in the figure, a plurality of sectors are formed in the AV file recording area of the BD-ROM. The source packets of the file extent is divided into groups of a plurality of source packets and recorded into contiguous sectors, as depicted in the first row. The plurality of source packets are collectively referred to as an "Aligned Unit" and writing to the BD-ROM is carried out in Aligned Units.

As depicted on the third row of the figure, an error-correcting code is attached to every plurality of sectors to constitute an ECC block. A playback apparatus is ensured to acquire a complete set of source packets as long as an access to the BD-ROM is made in Aligned Units. This concludes the description of the process of writing an AV clip to the BD-ROM.

FIG. 6A is a table showing possible numerical ranges of packet IDs of TS packets (PID) and the types of PES streams carried by TS packets having the respective packet IDs.

TS packets having the packet ID "0x0100" constitute a program map (Program_map), whereas TS packets having the packet ID "0x1001" constitute a program clock reference (PCR).

TS packets having the packet ID "0x1011" constitute a BaseView video stream, and TS packets having the packet ID "0x1012" constitutes an EnhancedView video stream.

TS packets having packet IDs ranging from "0x1100" to "0x111F" constitute an audio stream.

TS packets having packet IDs ranging from "0x1220" to "x123F" constitute a BaseView PG stream. TS packets having packet IDs ranging from "0x1240" to "0x125F" constitute an EnhancedView PG stream. Note that TS packets constituting a PG stream for a two-dimensional view and not a BaseView PG stream are assigned with the packet IDs ranging from "0x1200" to "0x121F".

The TS packets constituting video streams and TS packets constituting PG streams are grouped together depending on whether the TS packets constitute the BaseView or the EnhancedView. FIG. 6B shows one example.

As shown in FIG. 6B, the group of source packets constituting the BaseView include: source packets (each depicted as "Video" in the figure) having the PID "0x1011" and constituting the BaseView video stream; source packets (each depicted as "Audio") having the PID "0x1100" and constituting an audio stream; and source packets (each depicted as "PG") having the PIDs "0x1220", "0x1221", "0x1222", "0x1223", "0x1224", "0x1225", and "0x1226" and constituting a PG stream.

On the other hand, the group of source packets constituting the EnhancedView include: source packets (each depicted as "Video") having the PID "0x1012" and constituting an EnhancedView video stream; source packets (each depicted as "Audio") having the PID "0x1101" constituting an audio stream; and source packets (each depicted as "PG") having the PIDs "0x1240", "0x1241", "0x1242", "0x1243", "0x1244", and "0x1245" and constituting a PG stream.

The source packets belonging to the BaseView group and the EnhancedView group are interleaved. FIG. 7 shows one example of the interleaved arrangement of the source packets. In the example shown in the figure, extents constituting the BaseView and the EnhancedView are alternately recorded in the order of "BaseView", "EnhancedView", "BaseView" and "EnhancedView" . . . .

In FIG. 7, the first row depicts an AV file, and the second row depicts the extents EXT_L[i], EXT_L[i+i], EXT_R[i], and EXT_R [i+1] constituting the AV file. The third row depicts a sequence of source packets belonging to the extents, and the fourth row depicts a sequence of sectors on a recording layer. Note that variables "i" and "i+1" in the brackets indicate the playback order of the respective extents. According to this notation, the two extents attached with the variable "i", namely EXT_L[i] and EXT_R[i], are to be played synchronously. Similarly, the two extents attached with the variable "i+1", namely EXT_L[i+1] and EXT_R[i+1], are to be played synchronously.

The extents EXT_L[i] and EXT_L[i+1] are constituted by the source packets having the PID "0x1011". Dashed arrows h1, h2, h3, and h4 indicate the membership, i.e., which of the BaseView stream and EnhancedView stream each of the extents EXT_L[i] and EXT_L [i+1] belongs to. According to the membership indicated by the arrows h1 and h2, the extents EXT_L[i] and EXT_L[i+1] belong to the BaseView stream and the extents EXT_R[i] and EXT_R[i+1] belong to the EnhancedView stream as indicated by the arrows h3 and h4.

The size of the extent EXT_L[i] is referred to as SEXT_L [i], whereas the size of the extent EXT_R[i] is referred to as SEXT_R[i].

The following describes how to determine the size SEXT_L and SEXT_R. Note that in a playback apparatus, extents are read alternately to two read buffers, one for the right view and the other for the left view, before being supplied to a video decoder. In view of this, SEXT_L and SEXT_R need to be determined in view of the time taken before the respective read buffers for the right view and the left view become full. When Rmax1 denotes the transfer rate to the right-view read buffer, the capacity of the right-view read buffer needs to be determined to satisfy the following relation:

Right-View Read Buffer=$R$max1×"Time Taken to Fill Left-View Read Buffer during operation involving a jump"

The term "jump" is synonymous with a disk seek. The contiguous area that can be secured for recording in the BD-ROM is limited. Therefore, a BaseView stream and an EnhancedView stream are not necessarily located next to each other on the BD-ROM, and rather are recorded in discrete areas.

The following now considers the "Time Taken to Fill Left-View Read Buffer during operation involving a jump". TS packets are transferred to the left-view read buffer at the transfer rate Rud−Rmax2. This Rud−Rmax2 indicates the difference between the output rate Rmax2 of the left-view read buffer and the input rate Rud of the left-view read buffer. Then, the time taken to fill the left-view read buffer is expressed as RB2/(Rud−Rmax2).

Regarding the reading of data to the left-view read buffer, it is necessary to consider the jump time (Tjump) from a right-view video stream to a left-view video stream and the jump time (Tjump) from the left view video stream to the right view video stream. Thus, the time expressed as (2×Tjump+RB2/(Rud−Rmax2)) is necessary to fill the left-view read buffer.

Let Rmax1 denote the transfer rate of the right-view read buffer. Then, all the source packets in the right-view read buffer need to be output at the transfer rate Rmax1 within the storage time of the left-view read buffer. Therefore, the size RB1 of the right-view read buffer is given by the following expression:

$RB1 \geq R\text{max}1 \times \{2 \times T\text{jump} + RB2/(Rud - R\text{max}2)\}$ In a similar manner, the size RB2 of the left-view read buffer is given by the following expression:

$RB2 \geq R\text{max}2 \times \{2 \times T\text{jump} + RB1/(Rud - R\text{max}1)\}$ Specifically, the memory size of the right-view read buffer and of the left-view read buffer is equal to 1.5 MB or less. According to the present embodiment, the extent size SEXT_R and the extent size SEXT_L are determined to be equal or substantially equal to the right-view read buffer and the left-view read buffer, respectively. This concludes the description of how the BaseView stream and EnhancedView stream are recorded.

The following describes an internal structure of a BaseView stream and an EnhancedView stream.

Figure 8:
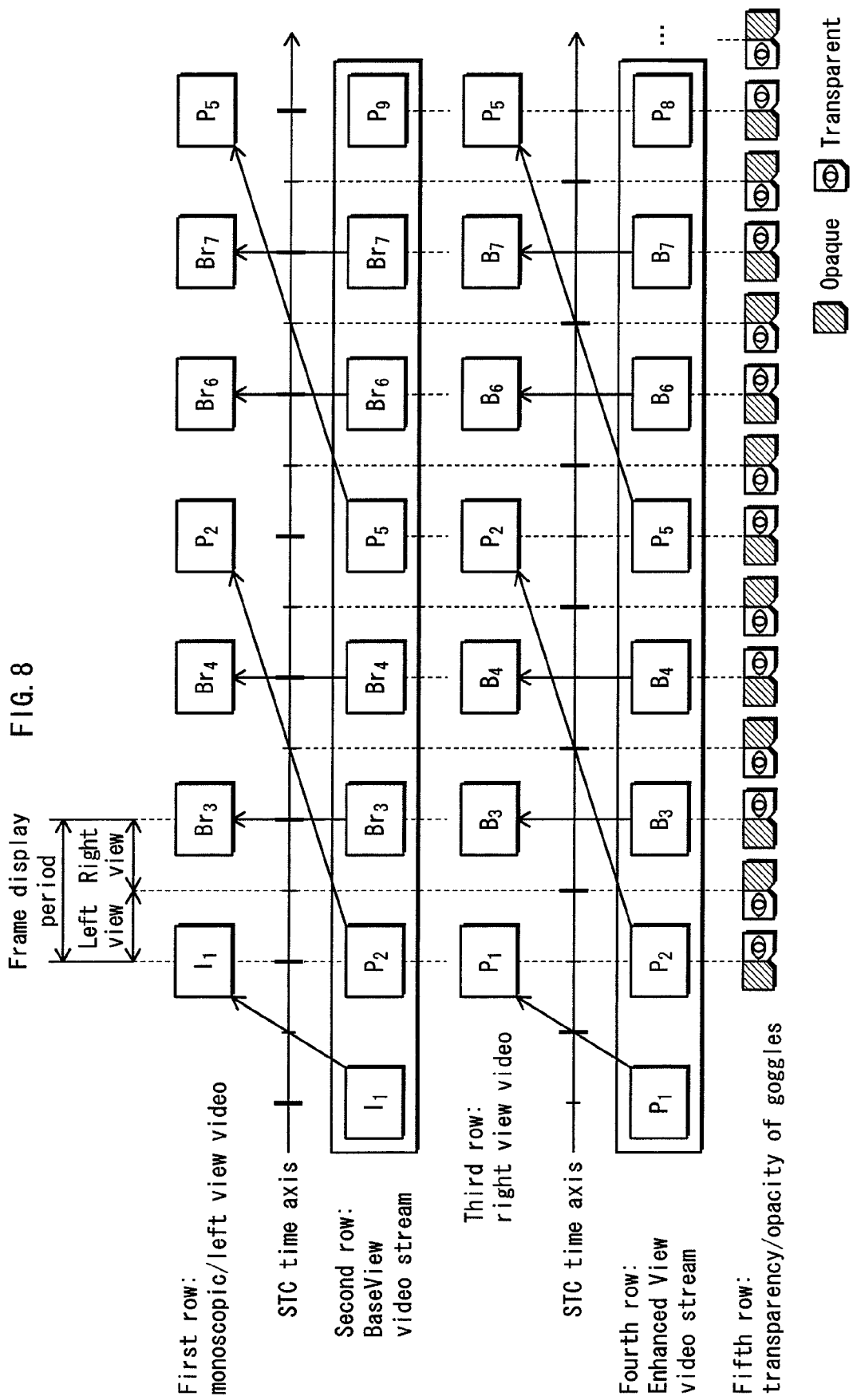
FIG. 8 shows an example of internal structures of a Base-View stream and an EnhancedView stream.

FIG. 8 depicts an internal structure of a stereoscopic pair of a BaseView stream and an EnhancedView stream for stereoscopic viewing.

Each of the BaseView stream and the EnhancedView stream contains picture data, for example. There many types of picture data, including I-picture, P-picture, and B-picture.

An I-picture is picture data corresponding to one screen.

A P-picture is picture data representing the difference from the I-picture to which the P-picture refers.

A B-picture is picture data generated with reference to both an I-picture and a P-picture.

The second row of this figure depicts an internal structure of the BaseView stream. This stream contains pieces of picture data I1, P2, Br3, Br4, P5, Br6, Br7, and P9.

These pieces of picture data are decoded with the timing indicated by the DTSs (decoding time stamp: indicating the time at which decoding of that piece of picture data by a decoder is to be started) attached to the respective pieces of picture data. The first row depicts left-view pictures and the decoded pictures I1, P2, Br3, Br4, P5, Br6, Br7, and P9. The left-view images are presented by executing playback of the pictures in the order of I1, Br3, Br4, P2, Br6, Br7, and P5 according to the values of PTSs attached to the respective pictures.

The fourth row depicts an internal structure of the EnhancedView stream. This secondary video stream contains pictures P1, P2, B3, B4, P5, B6, B7, and P8. Those pieces of picture data are decoded with the timing indicated by the DTSs attached to the respective pieces of picture data. The third row depicts the right-view images. The right-view images are presented by executing playback of the decoded pictures P1, P2, B3, B4, P5, B6, B7, and P8 in the order of P1, B3, B4, P2, B6, B7, and P5 according to the values of PTSs (Presentation Time Stamp: information indicating the presentation times of video and audio of that picture) attached to the respective pictures.

The fifth row depicts how the states of the LC shutter goggles 400 is switched. As depicted on the fifth row, one of the LC shutters corresponding to the right view is closed during the time that left-view images are presented, whereas the other of the LC shutters corresponding to the left view is closed during the time that right-view images are presented.

Also, the EnhancedView streams are compressed by the intra-picture prediction using the timewise redundancy between pictures as well the redundancy between pictures corresponding to different views. That is to say, the pictures of the EnhancedView stream are compressed with reference to pictures of the BaseView stream having the same presentation time.

For example, the first P-picture in the EnhancedView stream refers to an I-picture in the BaseView stream, and a B-picture in the EnhancedView stream refers to a Br-picture in the BaseView stream. The second P-picture in the EnhancedView stream refers to a P-picture in the BaseView stream.

Figure 9:
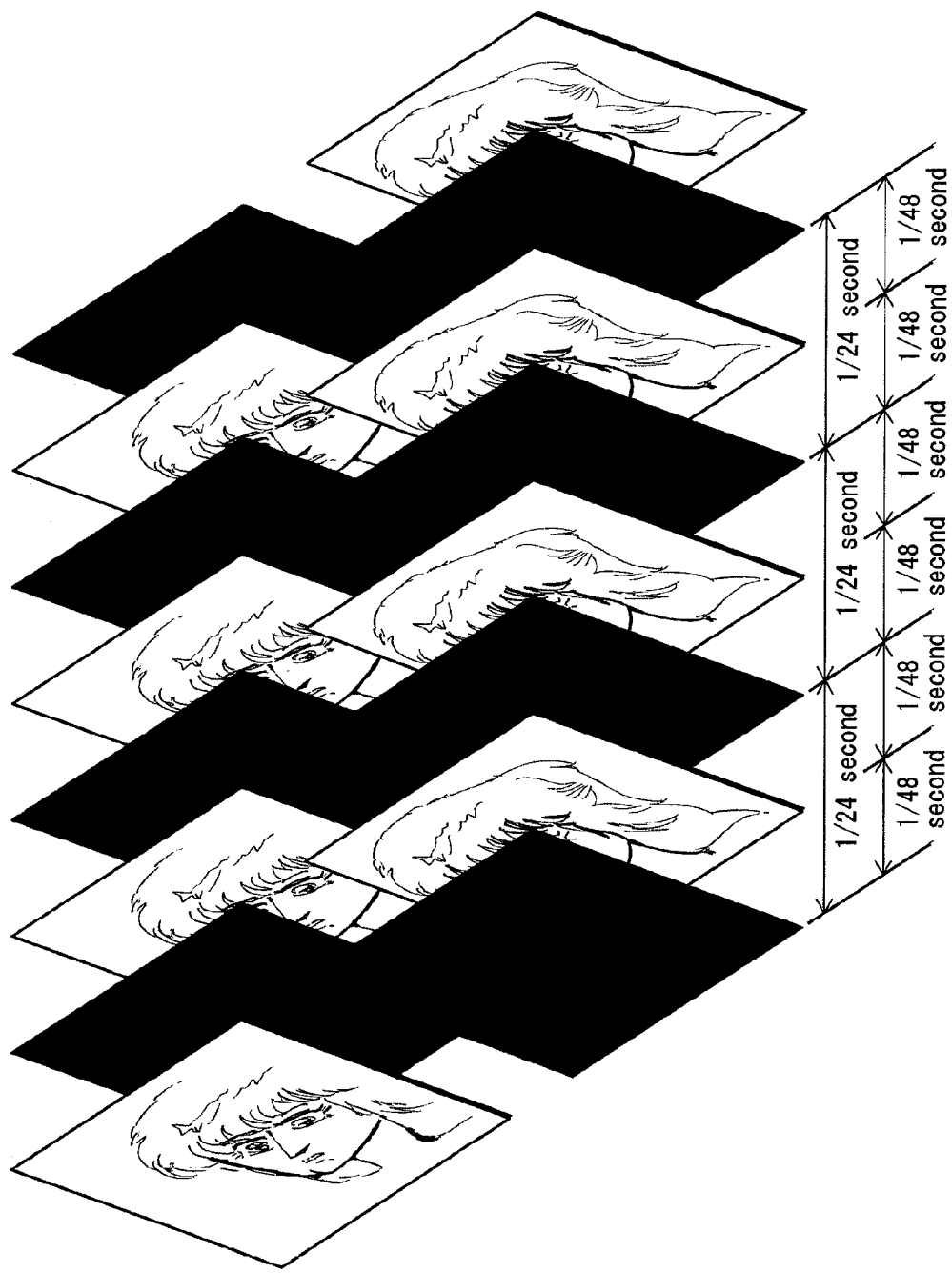
FIG. 9 shows what type of video is provided for playback when switching between transparency/opacity of goggles at the timing shown in FIG. 8.

FIG. 9 illustrates playback images presented to the user by switching the transparent/opaque states of the goggles with the timings depicted in FIG. 8. Suppose that the screen display period is ⅟24 sec and the transparent/opaque states of the individual goggles corresponding to the right view and left view are switched at every ⅟48 sec. Consequently, pictures corresponding to the right view and the left view are alternately presented one by one. FIG. 9 schematically depicts that images presented for the left view are slightly different from images presented for the right view, with respect to the angle and/or position of the face of a person appearing in the images (Note that the difference in the face angle and position in FIGS. 9 and 10 are only schematic illustrations).

Figure 10:
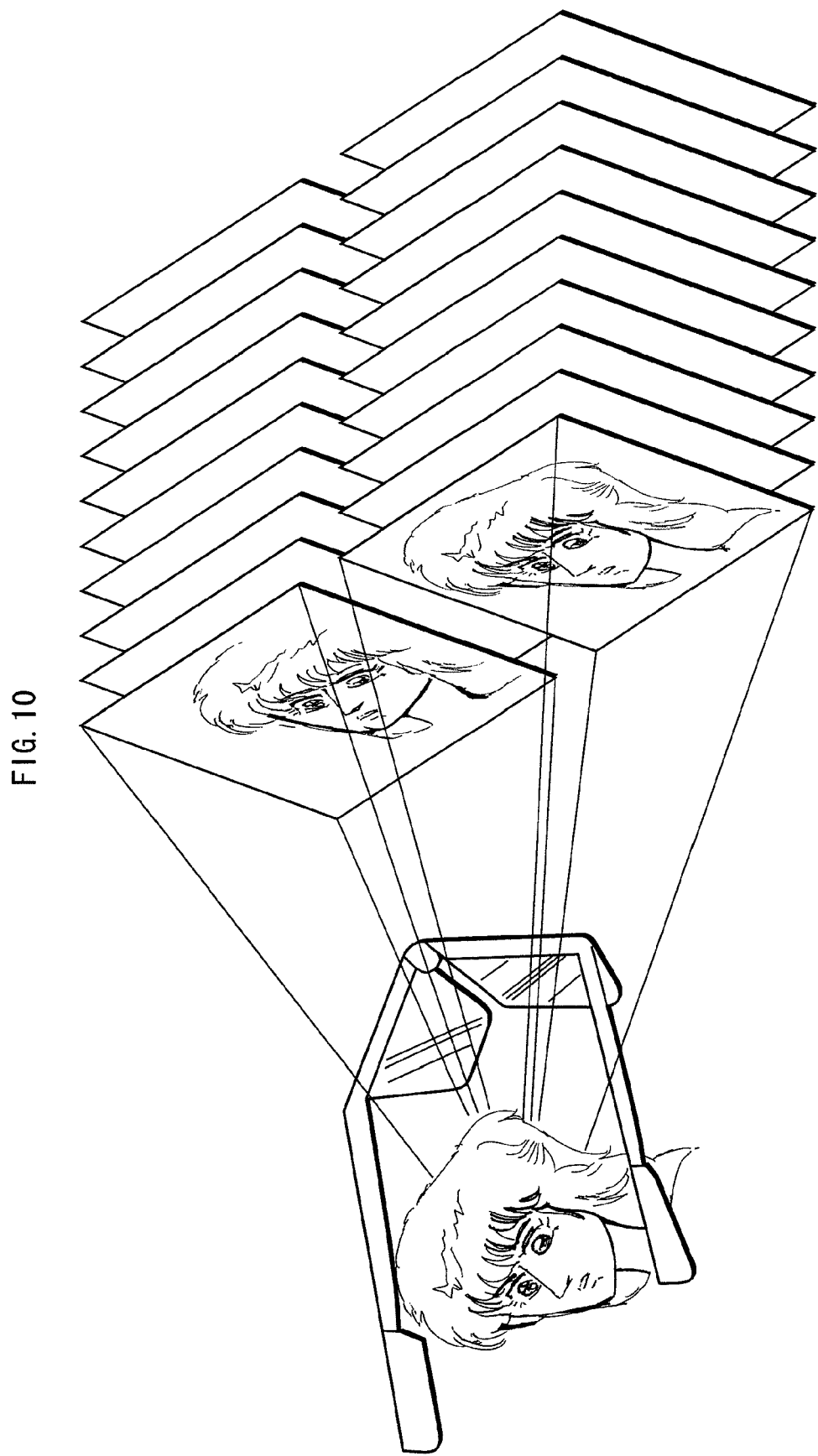
FIG. 10 shows a stereoscopic effect due to an afterimage effect in the eye.

FIG. 10 illustrates a stereoscopic image created by an afterimage effect in the human eye. Switching the transparent/opaque states of the goggles according to the timing shown in FIG. 8 enables causing recognition as a stereoscopic image.

Figure 11A:
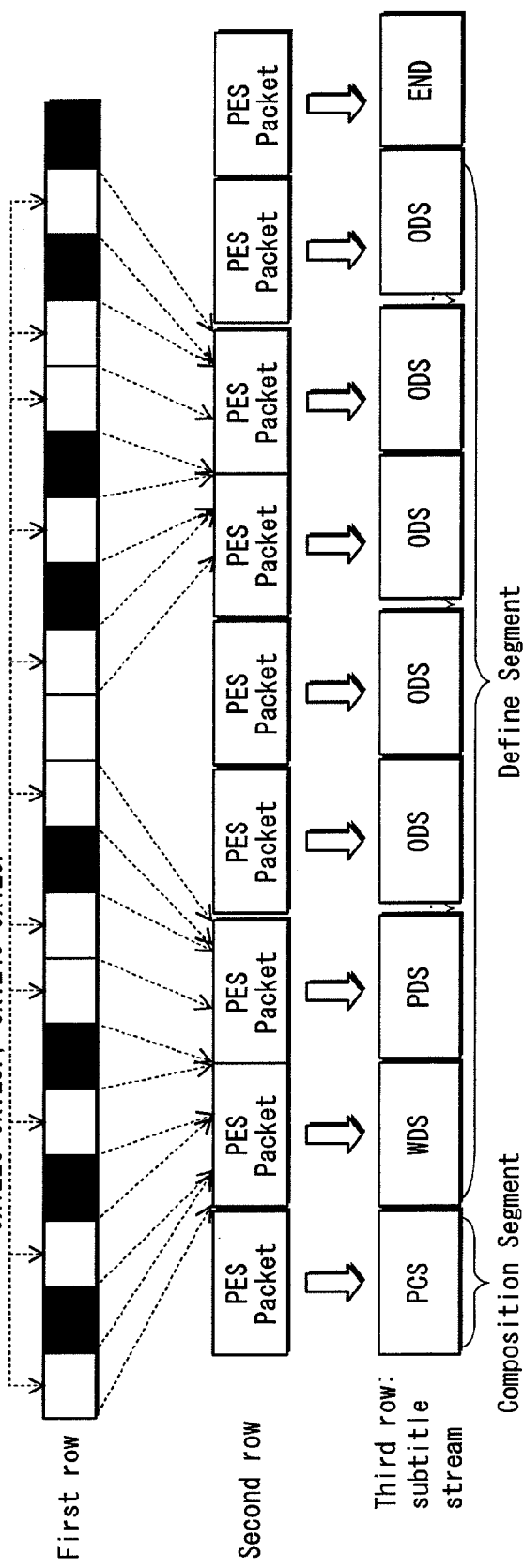
FIG. 11 shows a structure of a PG stream.

The following describes PG streams. FIG. 11 depicts a structure of a PG stream. In FIG. 11, the first row depicts a sequence of TS packets constituting an AV Clip and the second row depicts a sequence of PES packets constituting the PG stream. The sequence of PES packets on the second row are acquired by extracting and concatenating payloads of TS packets having a predetermined PID from among the TS packets on the first row.

The third row depicts a structure of the PG stream. The PG stream is composed of functional segments including PCS (Presentation composition segment), WDS (Window Definition Segment), PDS (Palette Definition Segment), ODS (Object Definition Segment), and END (END of Display Set Segment). Of these functional segments, a PCS is called a display composition segment, and WDS, PDS, ODS, and END are called definition segments. PES packets and functional segments may be in one-to-one correspondence or in one-to-multiple correspondence. That is, one functional segment may be converted into one PES packet or fragmented into a plurality of PES packets and recorded on the BD-ROM.

Figure 11B:
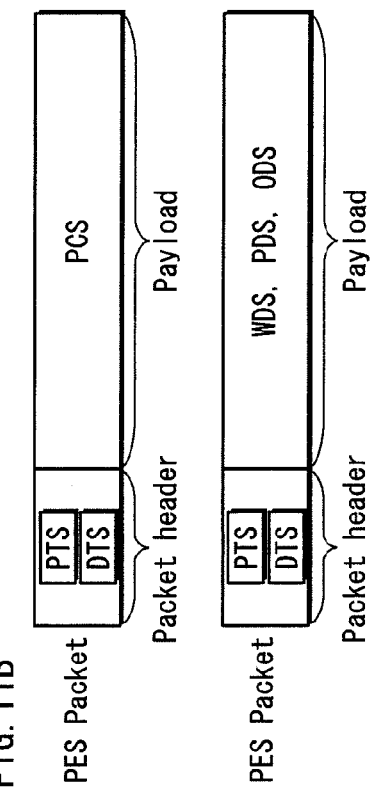

FIG. 11B depicts PES packets acquired by converting functional segments. As depicted in FIG. 11B, each PES packet is composed of a "packet header" and "payload", which is the data entity of the functional segment. The packet header contains a DTS and a PTS of the functional segment. In the following description, the DTS and PTS contained in the PES packet header of a functional segment is referred to as the DTS and PTS of the functional segment.

Figure 12:
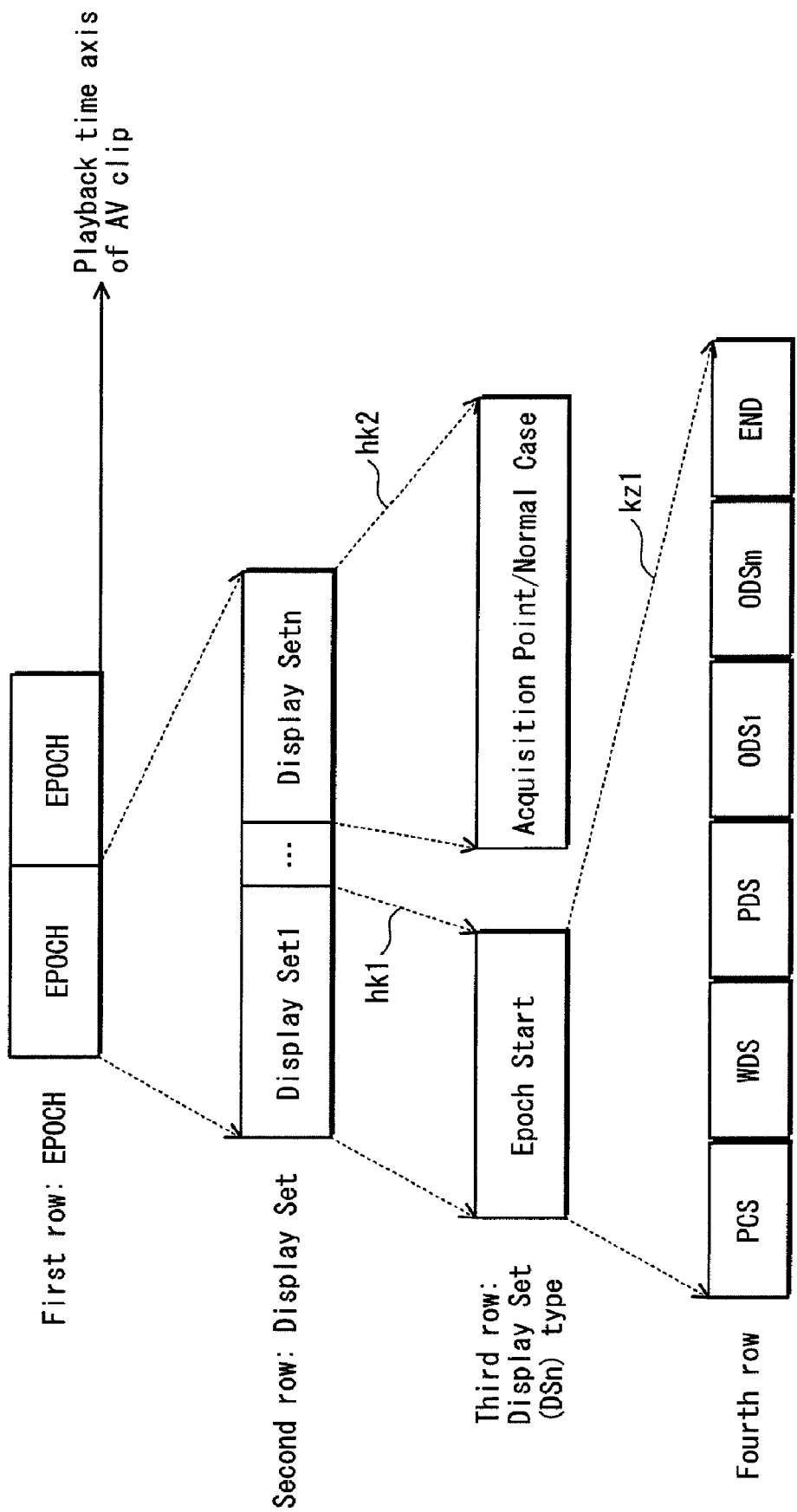
FIG. 12 shows a logical structure composed of various types of functional segments.

The functional segments of the various types mentioned above constitute a logical structure as shown in FIG. 12. FIG. 12 depicts the logical structure constituted by the various types of functional segments. In the figure, the fourth row depicts the functional segments, the third row depicts types of Display Sets, the second row depicts Display Sets, and the first row depicts Epochs. Each Display Set (hereinafter, simply "DS") depicted on the second row is a set of functional segments constituting one screen of graphics data, or of graphics data contained in the PG stream. Also, a broken line kz1 in the figure indicates the membership, i.e., which of the functional segments depicted on the fourth row belongs to which DS. It is shown that a series of functional segments PCS-WDS-PDS-ODS-END constitute one DS. A playback apparatus is capable of configuring one screen of graphics data by reading from the BD-ROM a plurality of functional segments constituting the DS.

Each Epoch depicted on the first row refers to a period, on the playback time axis of the AV Clip, over which the memory management is continuous, and also refers to a group of data allocated to that period. The memory to be managed includes a graphics plane for storing one screen of graphics data and an object buffer for storing decompressed graphics data. The memory management is said to be continuous if no flash of the graphics plane and the object buffer occurs through the Epoch and erasing and rendering of graphics data occurs only during a limited rectangular area of the graphics plane. (*Please note that to "flash" means to clear the stored content of the entire Graphics Plane and the entire Object Buffer.) In other words the rectangular area is fixed in size and position over the Epoch. When deletion and rendering of graphics are performed within the fixed rectangular area, synchronization of graphics and video is ensured. In other words, the Epoch is a time unit on the playback time axis during which the synchronization between video and graphics is ensured. To change the predetermined area for which rendering/deletion is performed, it is necessary to define a change point on the playback time axis and set a new Epoch from that point forward. At the boundary between such two Epochs, the synchronization between video and graphics is not ensured.

Also, described with reference to the position of subtitles on the display screen, an Epoch is said to be a period, on the playback time axis, during which subtitles are displayed only within a fixed rectangular area of the display screen.

This completes the description of Epochs. The following now describes Display Sets.

In FIG. 12, the broken lines hk1, 2 indicate to which type of DS in the third row each DS in the second row belongs. Also, the series of DSs including Epoch Start, Acquisition Point, and Normal Case constitute an Epoch depicted on the first row. Note that "Epoch Start", "Acquisition Point", and "Normal Case" denote types of DSs. Though the Acquisition Point DS precedes the Normal Case DS in FIG. 12, this is merely an example and the order may be reversed.

An "Epoch Start" is a Display Set that indicates the start of a new Epoch. For this reason, an Epoch Start contains a complete set of functional segments necessary for constituting a display composition. An Epoch Start is provided at such a position that is likely to be chosen as a playback start point and the beginning of a chapter in a movie is one example.

An "Acquisition Point" is a Display Set that is not the start of an Epoch but contains a complete set of functional segments necessary for constituting a subsequent display composition. An Acquisition Point DS ensures that graphics are duly displayed as long as playback is started from the Acquisition Point DS. In other words, the Acquisition Point DS enables screen composition from a midpoint in the Epoch. Each Acquisition Point DS is provided at a position that may be chosen as a starting point, such as a position that is specifiable using a time search. "Time search" refers to an operation by which a user inputs a number of minutes/seconds to locate a corresponding playback point. The time is specified by a user input in units of, say, 10 seconds (or 10 minutes), so that playback points positioned at intervals of 10 seconds (or 10 minutes) will be specifiable using the time search. The Acquisition Point DSs are provided in positions that are specifiable using the time search, so that playback of the PG stream is duly executed in response to a time search.

A "Normal Case" DS contains only difference data relative to the previous Display Set. For example, if a DSv graphic has the same content as an immediately preceding DSu but has a different display composition from the DSu, the DSv will be a Normal Case DS containing only a PCS and an END. With this arrangement, there is no need to provide ODSs that have already been provided. As a result, the amount of data stored on the BD-ROM can be reduced. On the other hand, it is not possible to display graphics using a Normal Case DS alone since the DS contains difference data only.

The following describes the Definition Segments (ODS, WDS, and PDS).

An "Object_Definition_Segment" is a functional segment that defines a graphics object. The following describes graphics objects.

AV clips recorded on BD-ROMs feature an image quality equivalent to that of high-definition television pictures.

The resolution for displaying graphics objects is set to an equivalently high 1920×1080. This high resolution permits reproduction of movie theater style subtitles (e.g. crisp handwriting style subtitles) and animated characters on BD-ROMs, for example. A graphics object is composed of a plurality of pieces of run-length data. Run-length data expresses a pixel string using a pixel code that indicates a pixel value and a continuous length of the pixel value. The pixel code is 8 bits in length, and takes a value of 1 to 255. The run-length data is able to select 256 colors of a possible 16,777,216 in accordance with the pixel code, and set the pixel color. Note that when a graphics object is for presenting subtitles, it is necessary to dispose a text string on a transparent background.

Figure 13A:
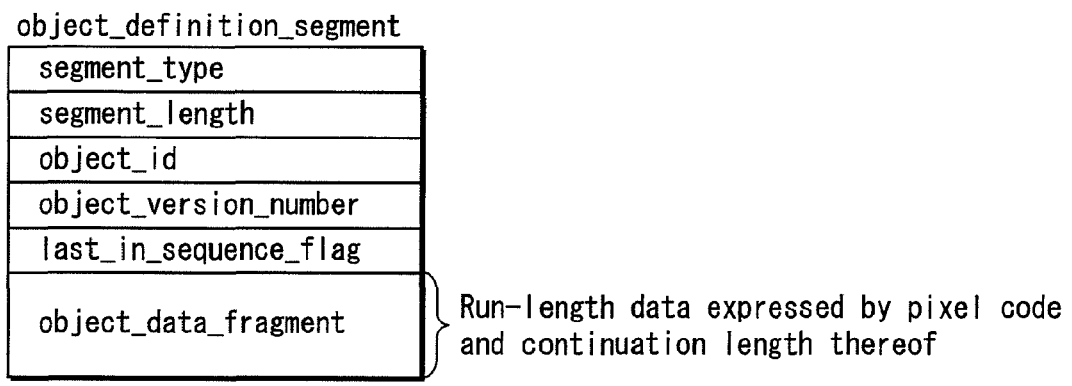
FIG. 13 shows a data structure of ODS and PDS.
Figure 13B:
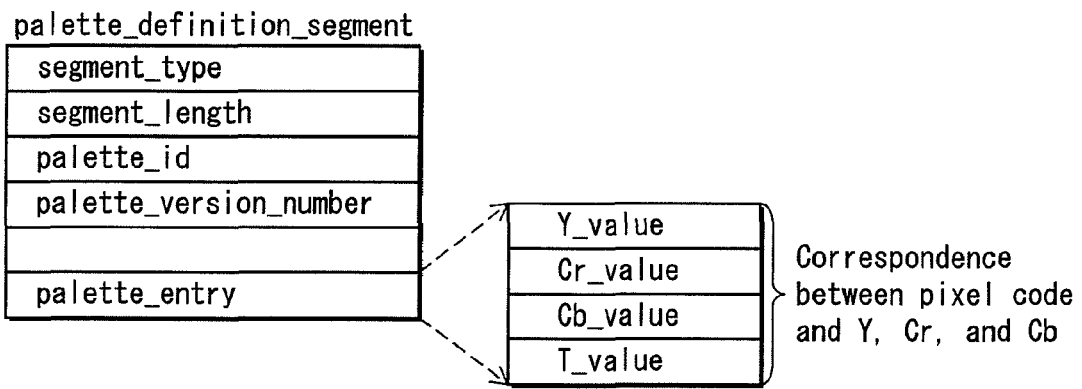

The ODS defines PGs according to a data structure shown in FIG. 13A. As shown in FIG. 13A, the ODS is composed of the following fields: "segment_type" indicating that the segment is of the ODS type; "segment_length" indicating the data length of the ODS; "object_id" uniquely identifying the graphics object corresponding to PGs in the Epoch; "object_version_number" indicating a version of the ODS in the Epoch; "last_in_sequence_flag"; and "object_data_fragment" containing a consecutive sequence of bytes corresponding to part or all of the PGs.

The Epoch of the graphics stream includes a plurality of ODSs having the same ID. The plurality of ODSs having the same ID also have the same width and height, and are assigned with a common area in the Object Buffer. After one of the ODS having the same ID is read in the common area, the read ODS is overwritten by a subsequent ODS having the same ID. In this way, according to the playback progression of the video stream, the ODSs in the object buffer being written over by the subsequently read ODSs that have the same identifier, enable the pictures in the ODS to achieve a temporal transition. The restriction that graphics objects having the same ID also have the same vertical and horizontal size is only applied within the same Epoch. Graphics objects belonging to a certain Epoch, and graphics objects belonging to the next Epoch, may have different vertical and horizontal sizes.

Explanations about the last_insequence_flag and object_data_fragment are given next. In some cases, it is not possible to store the decompressed graphics that constitute the PG in one ODS due to a payload constraint of the PES packet. In such cases, the graphics are split into a series of consecutive fragments, and one fragment is set to the object_data_fragment. When one Graphics Object is stored as more than one fragment, every fragment except a last fragment has the same size. The last fragment is less than or equal to the size of previous fragments. The ODS carrying the fragments appear in the same sequential order in the DS, with an end of the sequence indicated by the ODS having the last_insequence_flag. Although the above described syntax of the ODS is based on a premise that the fragments are stacked in from the preceding PES, the fragments may be stacked so that each PES contains a blank part.

A "Palette Definition Segment (PDS)" is a functional segment storing palette data. The palette data indicates combinations of pixel codes of 1 to 255 and pixel values. Each pixel value is composed of a red difference component (Cr value), a blue difference component (Cb value), a luminance component (Y value), and a transparency (T value). Each pixel code in the run-length data is converted into a pixel value indicated by the palette to generate a color. A data structure of PDS is shown in FIG. 14B. As shown in FIG. 14B, the PDS includes the following fields: "segment_type" indicating that the segment is of the PDS type; "segment_length" indicating the data length of the PDS; "palette_id" for uniquely identifying the palette included in the PDS, "palette_version_number" indicating a version of the PDS within the Epoch; and "palette_entry" carrying information for each entry. The "palette_entry" field indicates a red difference component (Cr value), a blue difference color component (Cb value), a luminance component (Y value), and a transparency (T value) for each entry.

The following describes a WDS.

A "window_definition_segment" is a functional segment that defines a rectangular area on the Graphics Plane. As described above, the memory management is continuous over an Epoch on condition that clearing and rendering takes place only within a fixed rectangular area on the Graphics Plane. The rectangular area on the Graphics Plane is called a "Window", and is defined by a WDS. FIG. 15A depicts a data structure of a WDS. As shown in the figure, a WDS includes the following fields: "window_id" uniquely identifying the Window on the Graphics Plane; "window_horizontal_position" indicating the horizontal position of a top left pixel on the Graphics Plane; "window_vertical_position" indicating a vertical position of a top left pixel on the Graphics Plane;

"window_width" indicating a width of the Window on the Graphics Plane; and "window_height" indicating a height of the Window on the Graphics Plane.

The following describes the values that window_horizontal_position field, the window vertical_position_field, and the window_width field may take. These fields relate to the coordinate system defining the internal area of the graphics plane. This Graphics Plane has a two-dimensional area having a size defined by the values of video_height and video_width.

The window_horizontal_position field specifies a horizontal position of the top left pixel of the Window on the Graphics Plane, and thus takes value in a range of 1 to the video_width. The window_vertical_position field specifies the vertical position of the top left pixel of the Window on the Graphics Plane, and thus takes a value in a range of 1 to the video_height.

The window_width field specifies the width of the Window on the Graphics Plane, and thus takes a value in a range of 1 to (video_width)−(window_horizontal_position). The window_height field specifies the height of the Window on the Graphics Plane, and thus takes a value in a range of 1 to (video_height)−(window_vertical_position).

The position and size of a Window can be defined for each Epoch using the window_horizontal_position, window_vertical_position, window_width, and window_height fields in the WDS. Thus, adjustments may be made at the time of authoring, such that the Window does not interfere with elements of the picture over the period of an Epoch. For instance, the Window may be made to appear in a desired margin to ensure subtitles displayed using graphics are clearly viewed. Since a WDS may be defined for each Epoch, the graphics are displayed at a suitable position on the display screen, as elements of the picture change with time. This maintains that graphics are displayed at suitable position for ensuring clear view of the graphics. As a result, the quality of the movie product can be raised to the level of a cinema film, in which subtitles are integrated into the picture.

The following describes an "END of Display Set Segment". The END of Display Set Segment is a functional segment indicating that transmission of a Display Set is complete, and is positioned immediately after the last ODS in the Display Set. The END of Display Set Segment includes the following fields: "segment_type" indicating that the segment is of the END of Display Set type; and "segment_length" indicating the data length of the END of Display Set Segment. The fields of the END of Display Set Segment do not specifically require description and thus are not depicted in the figures.

This concludes the description of ODS, PDS, WDS and END.

The following now describes a PCS. The PCS is a functional segment for constituting an interactive screen. FIG. 14B depicts a data structure of the PCS. As shown in FIG. 14B, the PCS includes the following fields: "segment_type"; "segment_length"; "composition_number"; "composition_state"; "palette_update flag"; "palette_id"; and "composition_object (1) to (m)".

The "composition_number" field identifies a graphics update in the Display Set, using a number from 0 to 15. Specifically, the composition_number field is incremented by one for each graphics update from the beginning of the Epoch to the PCS containing the composition_number field.

The "composition_state" field indicates whether the Display Set starting from the PCS is a Normal Case, an Acquisition Point, or an Epoch Start.

The "palette_update_flag" field indicates whether the PCS describes a Palette-only Display Update. The Palette-only Display Update is an update that is limited to replacing the palette with a new palette. To indicate a Palette-only Display Update, the palette_update_flag is set to 1.

The palette_id indicates a palette to be used for a Palette-only Display Update.

The "composition_object" fields (1) to (m) each contain control information for realizing a screen composition using the Display Set to which the PCS belongs. In FIG. 14B, a composition_object(i) is expanded, as indicated by broken lines wd1, to illustrate an internal structure of the composition_object fields. As illustrated, the composition object(i) includes the following fields: "object_id_ref"; "window_id ref"; "forced_on flag"; "object_cropped_flag"; "object_horizontal_position"; "object_vertical_position"; and "cropping_rectangle_information (1) (2) . . . (n)".

The "object_id_ref" field contains a reference value that is a PG identifier (object_id). This reference value identifies the PGs to be used to present the display composition corresponding to the composition_object(i).

The window_id ref field contains a reference value that is a window_identifier (window_id). This reference value specifies the Window in which the PGs is to be displayed to present the display composition corresponding to the composition_object(i).

The "forced_on_flag" is 1 when indicating a graphics object to be forcibly displayed even when the graphics object is set to OFF in the setting of the playback apparatus.

The "object_cropped_flag" field indicates whether or not PGs cropped in the object buffer are to be displayed. When the object_cropped_flag field is set to 1, the cropped PGs in the object buffer are displayed. When the object_cropped_flag field is set to 0, the cropped PGs in the object buffer are not displayed.

The object_horizontal_position field specifies a horizontal position of the top left pixel of the PGs on the graphics plane.

The object vertical_position_field specifies a vertical position of the top left pixel of the PGs on the graphics plane.

The "cropping_rectangle information(1), (2) . . . (n)" fields are valid when the "object_cropped_flag" field is set to 1. The cropping_rectangle information(i) is expanded, as indicated by broken lines wd2, to illustrate an internal structure of the composition rectangle information. As indicated by the broken lines, the cropping_rectangle information(i) includes the following fields: "object_cropping_horizontal_position"; "object_cropping_vertical_position"; "object_cropping_ width"; and "object_cropping_height". The object_cropping_horizontal_position field specifies a horizontal position of the top left corner pixel of a cropping rectangle for PGs on the graphics plane. The cropping rectangle is used to crop a portion of the PGs and corresponds to a "Region" in the ESTI EN 300 743 standard. The "object_cropping_vertical_position" specifies a vertical position of a top left pixel of the graphics object on the graphics plane.

The "object_cropping_width" field specifies a width of the cropping rectangle in the graphics object.

The "object_cropping_height" field specifies a width of the cropping rectangle in the graphics object.

This concludes the description of the data structure of PCS.

Restriction when Using a 2-Decoder Model

The following describes how the fields of the above-described functional segments are set for each of the left-view PG stream and the right-view PG stream, respectively.

Figure 15:
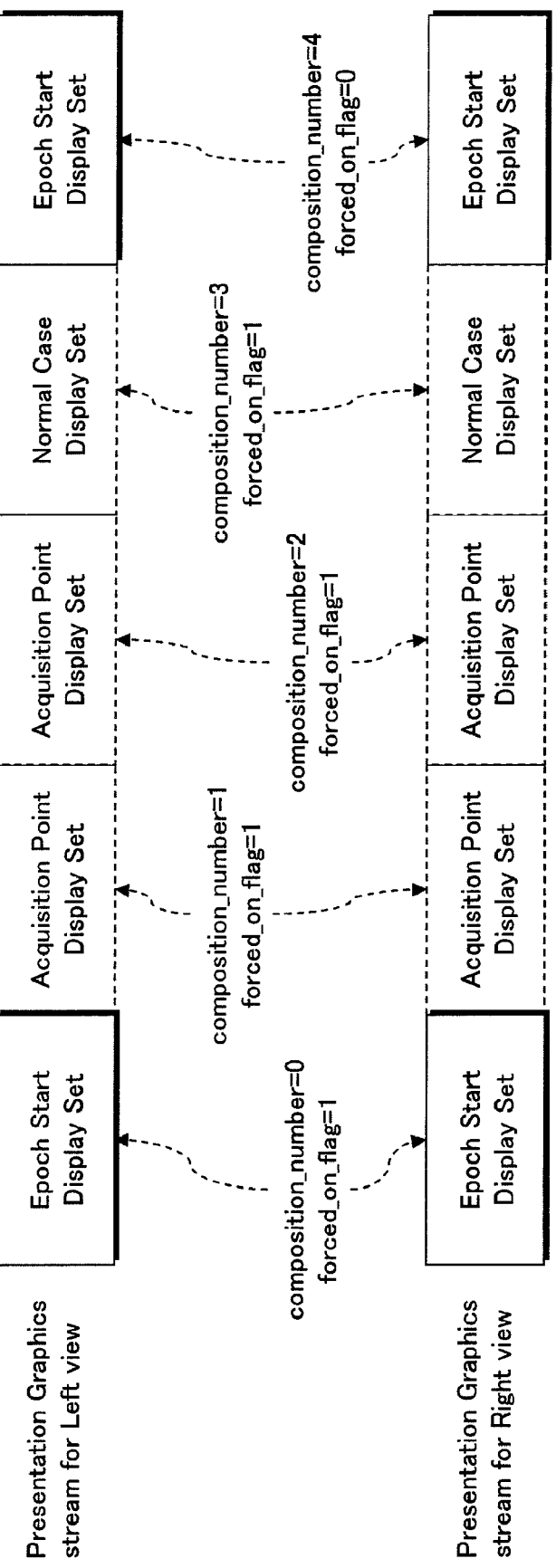
FIG. 15 shows DS types, composition_numbers, and forced_on flags for DSs corresponding to the left view PG stream and the right view PG stream.

FIG. 15 shows a correspondence between a type of DS, a composition_number, and a forced_on_flag included in a left view PG stream, and a type of DS, a composition_number, and a forced_on flag that are included in a right view PG stream. As shown in FIG. 15, the DS that is an Epoch Start and the DS that is an Acquisition Point always exist as a pair of left view and right view. The reason for this is that the Epoch Start and the Acquisition Point are a unit that can complete drawing of one or more graphics objects as a single unit, and 3D playback cannot be performed unless the Epoch Start and the Acquisition Point are a pair. In other words, when the DS for the left view is an Epoch Start, there is always a paired DS for the right view, and that composition_state also must be an Epoch Start.

Similarly, when the left view DS is an Acquisition Point, a right view DS always exists to be paired with the left view DS, and that composition_state also must be an Acquisition Point.

When the left view DS is Normal Case, it is also preferable for the corresponding right view DS to be Normal Case.

In this way, by making DSs that correspond share the same type, a stereoscopic view can be ensured, for example when performing random access. In other words, when the left view DS is for example, Epoch Start, since the DS of the corresponding right view is also Epoch Start, arranging the left view DS and the right view DS in positions that reveal that these display sets are skipped enables avoiding a situation in which only one of the left view and the right view is decoded and the other one cannot be decoded.

Also, as shown in FIG. 15, the composition_number of a left view DS must be equal to the composition_number of a right view DS that is to be played back as a pair with the left view DS. Making the composition_numbers equal for correlating the DSs for the left view and the right view in this way enables the graphics decoder to easily determine which of the left view DS and the right view DS to output at the time of playback.

Furthermore, it is necessary to set the forced_on flag in the DS of the left view PG stream to the same value as the forced_on flag of the DS corresponding to the right view PG stream. The reason is that a stereoscopic view of the graphics object is impossible when only the right view of the graphics object (or only the left view of the graphics object) is output during playback, and the corresponding left view of the graphics object (or right view of the graphics object) is not output.

The fact that presentation composition segments are stored in PES packets has already been described. Of course, the PTS of the PES packet that stores the presentation composition segment included in the left view DS must be identical in value with the PTS of the PES packet that stores the presentation composition segment included in the right view DS.

Also, in the palette definition segment of the left view DS and the palette definition segment of the corresponding right view DS, identical content is set for correspondences between code values, luminosity and color difference, and the palette_ids are also identical for both.

Figure 16:
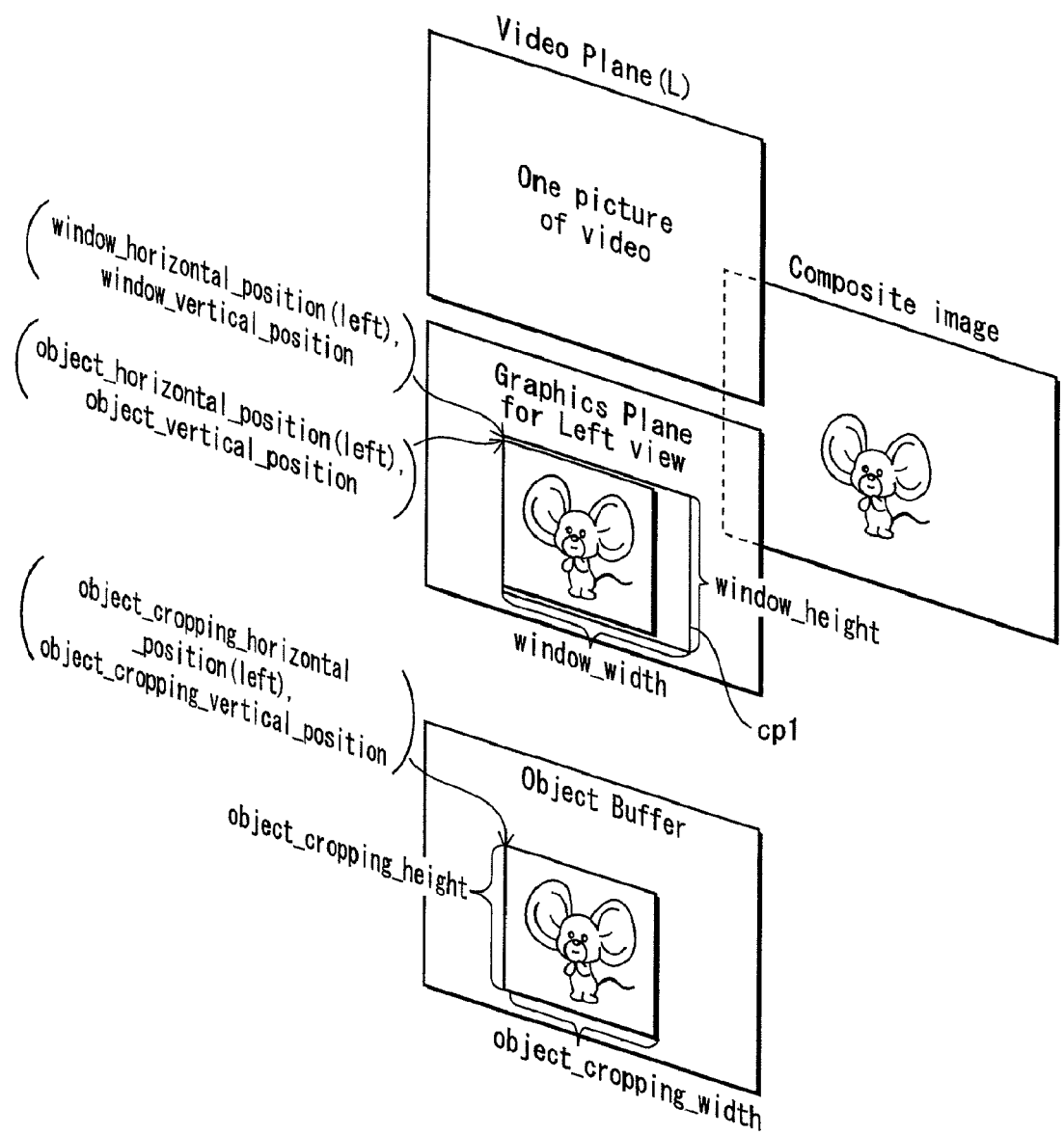
FIG. 16 shows a notation example of WDS and PCS that belong to a left-view DS.
Figure 17:
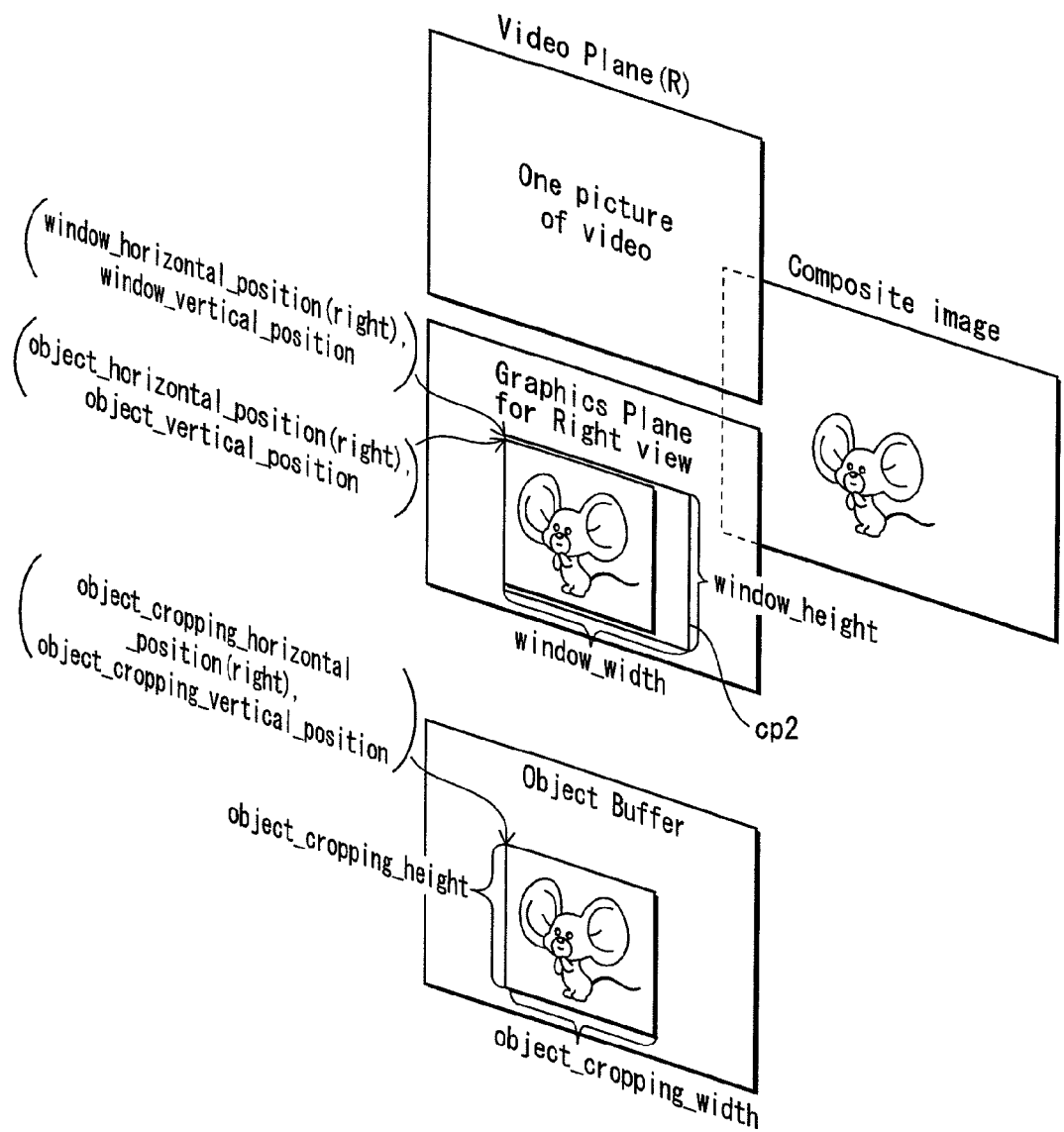
FIG. 17 shows a notation example of WDS and PCS that belong to a right-view DS.

Next, the following describes how the fields of WDS and the other fields described above in the PCS are filled in. FIGS. 16 and 17 show examples of writing of WDS and PCS belonging to a Display Set. Here, although an example is described of a case in which the graphics are animated characters, the graphics may be subtitles composed of decorative script, etc.

FIG. 16 shows an example of writing WDS and PCS belonging to the left view DS. In FIG. 16A, the window_horizontal_position (left) field and the window_vertical_position field value in the WDS specify the top left coordinates of the Window on the graphics plane. The window_width field and the window_height field in the WDS specify the height and width of the display screen of the window. Here, the (left) of the window_horizontal_position (left) means that this window_horizontal_position has a different value from the corresponding window_horizontal_position (right).

In FIG. 16A the object_cropping_horizontal_position (left) field and the object_cropping_vertical_position field that are included in the crop information specify a basepoint of a cropping rectangle in a coordinate system whose origin is the top left of the graphics object in the object buffer. The cropping rectangle (enclosed by a thick line) is then defined using the values of the object_cropping_width field, the object_cropping_height field, and the basepoint. The cropped graphics object is then disposed in a region cp1 (enclosed by a rectangle) so that a top left corner of the cropped graphics object lies at a pixel specified by an object_horizontal_position (left) field value and an object vertical_position_field value in the coordinate system of the graphics plane. This causes the graphics to be written into the window of the graphics plane. Consequently, the graphics are overlaid with the moving picture.

FIG. 17 is a notation example of WDS and PCS belonging to a right view DS. In FIG. 17A, the window_horizontal_position (right) and window_vertical_position of WDS indicate an top left coordinate of the window in the graphics plane, and the window_width and the window_height indicate the width and height of the display screen of the window. Here, the "right" of the window_horizontal_position (right) means that this window_horizontal_position is a different value from the window_horizontal_position (left) of the corresponding left view.

The object_cropping_horizontal_position (right) and the object_cropping_vertical_position in the crop information of FIG. 17A indicate a basepoint of a cropping range in the coordinate system that takes the top left coordinate of the graphics in the object buffer as a base. The range indicated by the object_cropping_width, the object_cropping_height, and this basepoint (indicated by a bold line portion in the drawing) is the cropping range. The cropped graphics are arranged in the coordinate system of the graphics plane in the rectangular range cp2 that has the object_horizontal_position (Right) and the object_vertical_position as the basepoint (top left). This causes the graphics to be written into the window of the graphics plane. Consequently, the graphics are overlaid with the moving picture.

As shown above, regarding WDS, the window_width and window_height are set with the same values in both the left view and the right view. The reason for this is that, when the horizontal widths and vertical widths of the display screens of the windows are different between the left view and the right view, there are cases in which the graphics fit in the display screen of the window in one view, and do not fit in the display screen in the other view, and synchronization between the video and the graphics are not safeguarded in such a case. Also, regarding the top left coordinate of the window in the graphics plane, the value of the window_vertical_position is the same for both the left view and the right view, but the value of the window_horizontal_position is different between the left view and the right view. This is normally caused by the difference in the position of a visible object in a horizontal direction between the left eye and the right eye. Depending on the method of generating graphics, the values of the window_vertical_position may be different between the left view and right view, and the values of the window_horizontal_position may be the same for both the left view and the right view.

Also, the object_cropping_width and the object_cropping_height may be set with the same values for both the left view and the right view. The reason for this is that when the cropping range is different, a difference results in the graphics arranged in the graphics plane between the left view and the right view. Also, regarding the basepoint of the cropping range, although the object_cropping_vertical_position is set with the same value in both the left view and the right view, the object_cropping_horizontal_position is set with different values between the left view and the right view. The values of the object_cropping_vertical_position may be different between the left view and the right view, and the value of the object_cropping_horizontal_position may be the same between the left view and the right view.

Also, regarding the basepoint of the rectangular range, although the object_vertical_position is set with the same value between the left view and the right view, the object_horizontal_position is set with a different value between the left view and the right view. As described above, this is normally caused by the difference in the position of a visible object in a horizontal direction between the left eye and the right eye. Depending on the method of generating graphics, the values of the object_vertical_position may be different between the left view and right view, and the values of the object_horizontal position may be the same for both the left view and the right view.

Figure 18:
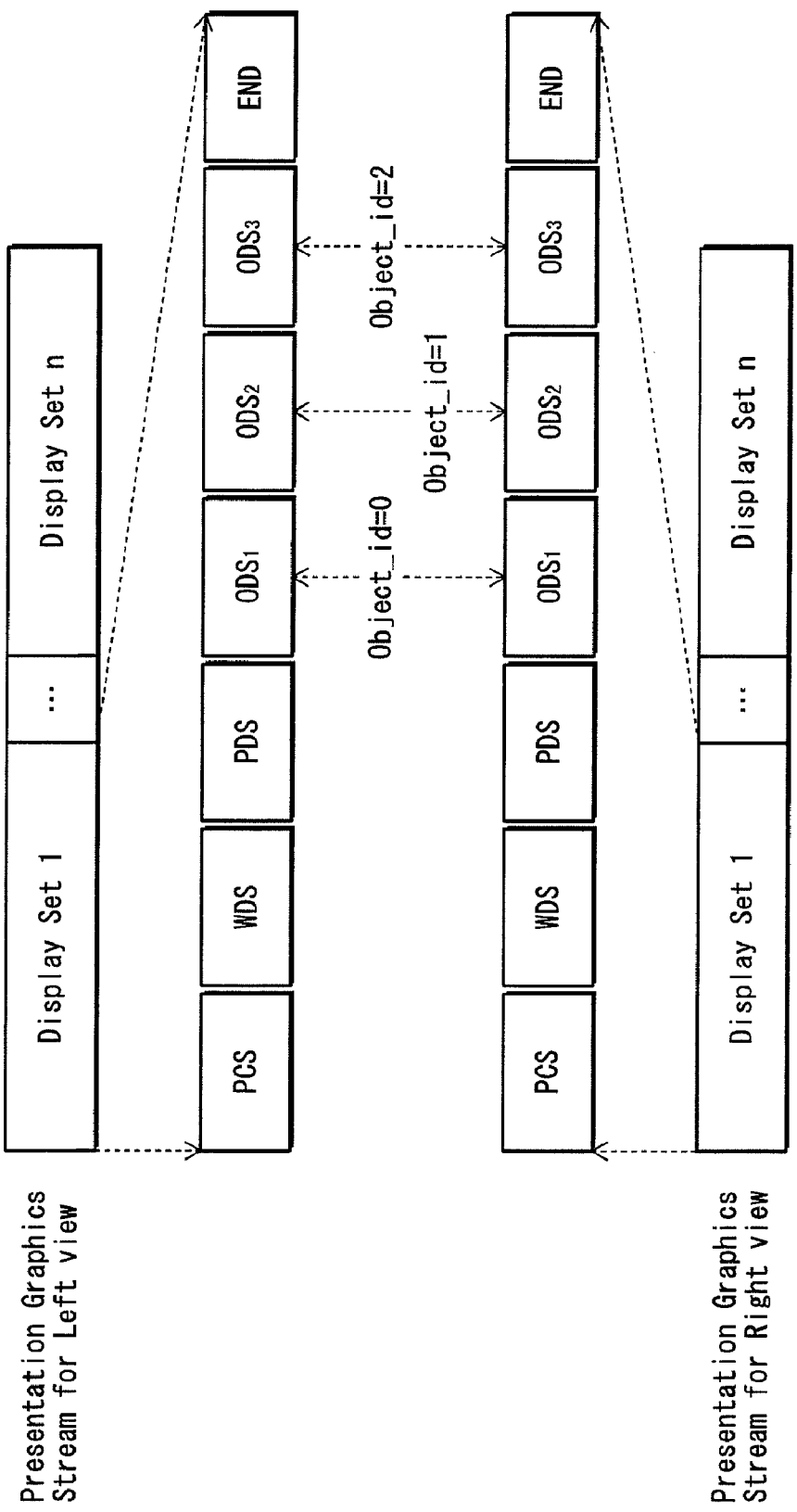
FIG. 18 shows object ids of DSs corresponding to a left-view PG stream and a right-view PG stream.

Furthermore, as shown in FIGS. 16 and 17, since the graphics of the left view and the graphics of the right view are graphics viewed from different angles, object_data_fragments of both ODSs are naturally different. As shown in FIG. 18, the object_id is set with the same value. The reason for this is that, when using a 2-decoder structure in the playback apparatus, it is possible to use a structure in which one graphics controller is shared between the two decoders, and in that case, unless the object ids of the graphics objects corresponding to the left view and the right view are set with the same value, the graphics controller cannot distinguish which graphics objects correspond to each other.

Adding the above-described restriction enables realization of a stereoscopic view in a 2-decoder structure by a left view PG stream and a right view PG stream.

The following describes the manner in which Display Sets including PCSs and ODSs are allocated to the playback time axis of the AV Clip. An Epoch is a period on the playback time axis over which memory management is continuous, and each Epoch constitutes one or more Display Sets. At issue, therefore, is the manner in which the one or more Display Sets are allocated to the playback time axis. Note that the playback time axis is an assumed axis used to prescribe decoded timings and playback timings for each screen of picture data making up the video stream that is multiplexed into the AV Clip. The decode timing and playback timing are expressed to an accuracy of 1/90000 seconds. The DTS and PTS associated with the PCS and ODS in the Display Set specify timings for synchronous control on the playback time axis. In other words, the DSs are allocated to the playback time axis by carrying out synchronous control using the DTSs and PTSs associated with the PCSs and ODSs.

Figure 19:
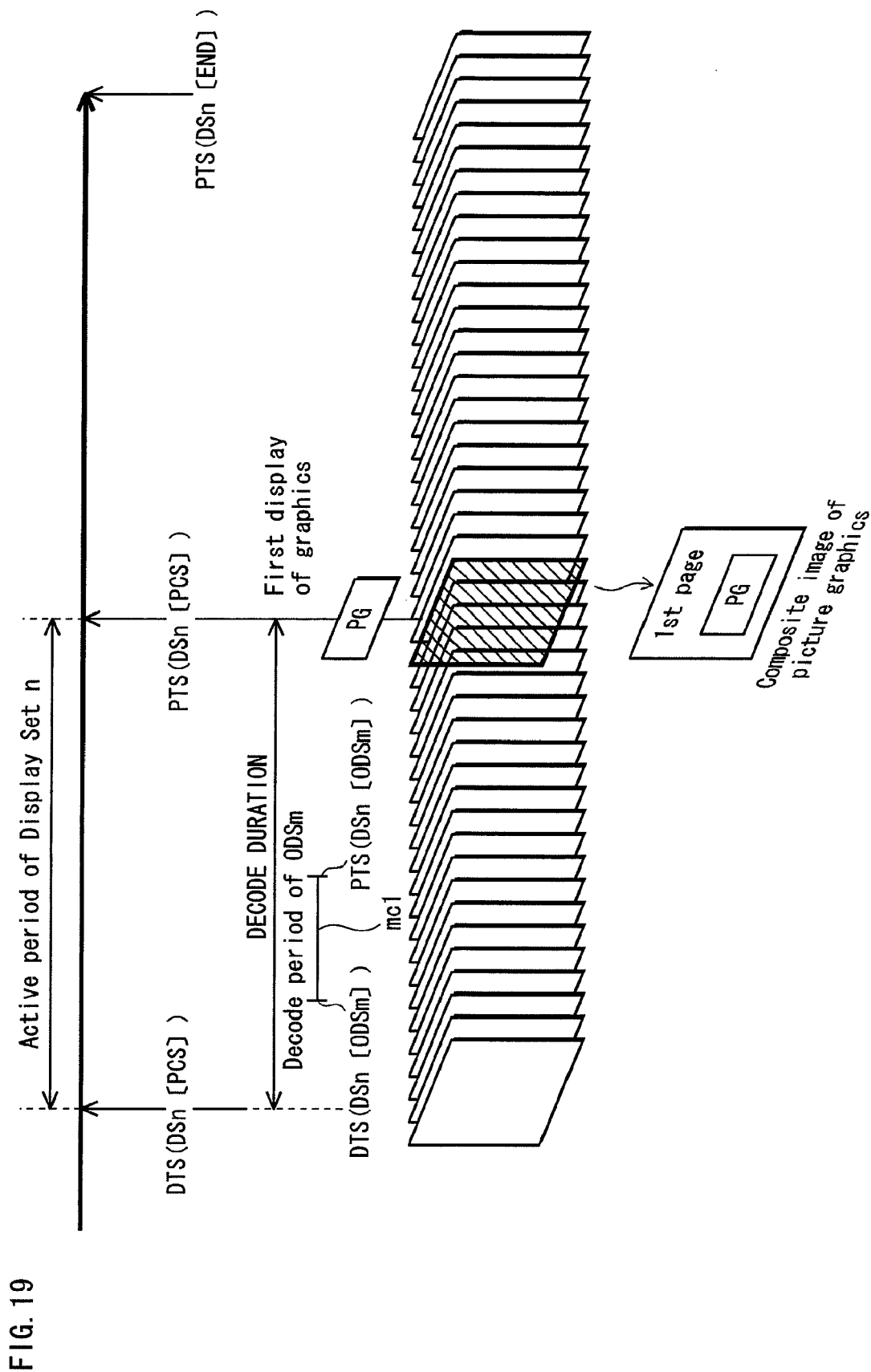
FIG. 19 indicates a playback time axis of an AV clip to which a DSn has been allocated.

A Display Set DSn of the Display Sets belonging to the Epoch is allocated to the playback time axis using a PTS and DTS which are set as shown in FIG. 19. FIG. 19 shows the AV Clip playback time axis to which the DSn has been allocated. In FIG. 19, the start of the DSn period is specified by a DTS value (DTS(DSn[PCS])) of a PCS belonging to the DSn, and the end of the period is specified by a PTS value (PTS(DSn [PCS])) of the same PCS. The timing for the first display is also specified by the PTS value (PTS(DSn[PCS])) of the PCS. If the timing of a desired picture in a video stream is matched with the PTS(DSn[PCS])), first display of the DSn will synchronize with the video stream.

The PTS(DSn[PCS]) is a value obtained by adding DTS (DSn{PCS}) a period for decoding ODS (DECODEDURATION) to the DTS(DSn[PCS]).

Decoding necessary for the first display of the DSn is performed in the DECODEDURATION. In FIG. 19, a period mc1 is a period during which an arbitrary ODS (ODSm) belonging to the DSn is decoded. The starting point of the decode period mc1 is specified by DTS(ODSn[ODSm]), and the end point of the decode period mc1 is specified by PTS (ODSn[ODSm]).

The Epoch is therefore prescribed by allocating each of the ODSs in the Epoch to the playback time axis. This concludes the description of the allocation to the playback time axis.

Clip Information File

Figure 20:
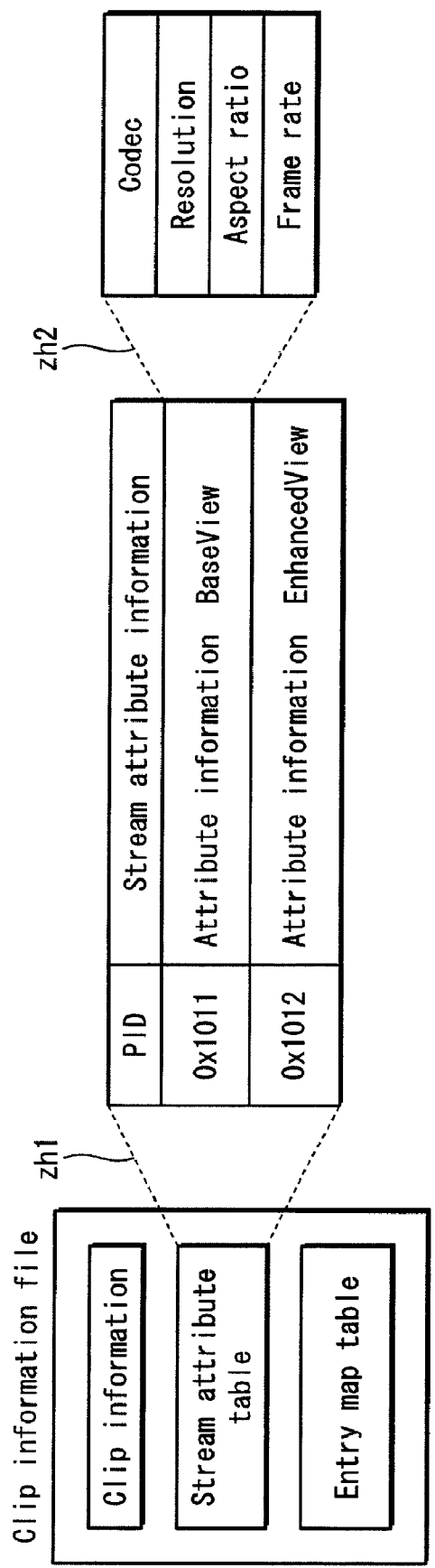
FIG. 20 shows an example of a clip information file.

FIG. 20 shows an example of a clip information file. As shown in the figure, each clip information file contains management information for an AV clip. The clip information files are provided in one to one correspondence with the AV clips, and are each composed of the clip information, a stream attribute table and an entry map table.

A lead line zh1 shows a close-up of an internal structure of a stream attribute table. As shown by the lead line, the stream attribute table contains, for each PID, a piece of attribute information of a corresponding stream included in the AV clip. The attribute information includes different information for each BaseView stream and EnhancedView stream.

A lead line zh2 shows a close-up of an internal structure of the BaseView stream. As shown by the lead line, the stream attribute information of the BaseView stream composed of TS packets having the PID=0x1011 specify the codec, resolution, aspect ratio, and frame rate.

The following describes an internal structure of the entry map table.

The entry map table shows a relationship between a source packet number of an arbitrary source packet and a PTS on an STC time axis, from among STC time axes specified with use of a packet ID.

The STC time axis is a time axis of a MPEG2-TS defined to indicate a decode time and a display time. An "STC sequence" refers to a series of source packets that are without any discontinuity in STC (System Time Clock), which is the system time-base for the AV streams.

Figure 21A:
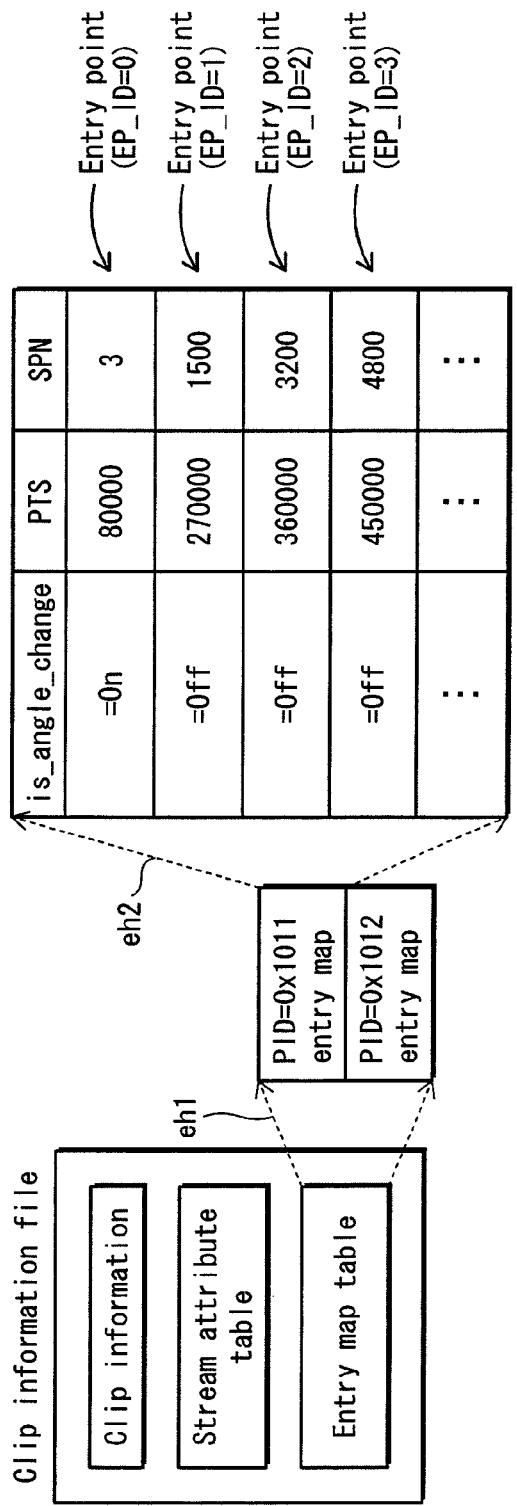
FIG. 21 shows an internal structure of an entry map table.

FIG. 21A depicts an internal structure of the entry map table. A lead line eh1 shows a close-up of the internal structure of the entry map table.

As shown by the lead line eh1, entry maps are provided one for each packetized elementary stream composed of a plurality of types of TS packets. More specifically, one entry map is provided for a BaseView stream composed of TS packets having the PID=0x1011, and one entry map for an EnhancedView stream composed of TS packets having the PID=0x1012. The entry maps indicates a plurality of "entry points" each of which is information made up of a pair of a PTS and an SPN. Each entry point has, in addition to the PTS and SPN, a display method flag (an "is_angle_change" flag) indicating whether decoding from that SPN is possible. Also, a value that is incremented for each entry point from a start point of 0 is called an "entry point ID" (hereinafter referred to as "EP_ID").

With use of this entry map, the playback apparatus is enabled to specify the location of a source packet corresponding to an arbitrary point on the time axis of the video stream. For example, when performing a special playback operation such as fast forward or rewind, the playback apparatus is enabled to effectively execute the playback without analyzing an AV clip, by selecting an I picture registered in the entry map as the playback start point. Also, an entry map is provided for each video stream multiplexed into the AV clip, and these entry maps are managed with use of PIDs.

The lead line eh2 shows a close-up of an internal structure of the entry map of an elementary stream composed of source packets having the PID=0x1011. The entry map indicates entry points corresponding to EP_ID=0, EP_ID=1, EP_ID=2, and EP_ID=3. The entry point corresponding to EP_ID=0 is composed of an is_angle_change flag set to ON, an SPN=3, and a PTS=80000. The entry point corresponding to EP_ID=1 is composed of an is_angle_change flag set to OFF, an SPN=1500, and a PTS=270000.

The entry point corresponding to EP_ID=2 is composed of an is_angle_change flag set to OFF, an SPN=3200, and a PTS=360000. The entry point corresponding to EP_ID=3 is composed of an is_angle_change flag set to OFF, an SPN=4800, and a PTS=450000.

Figure 21B:
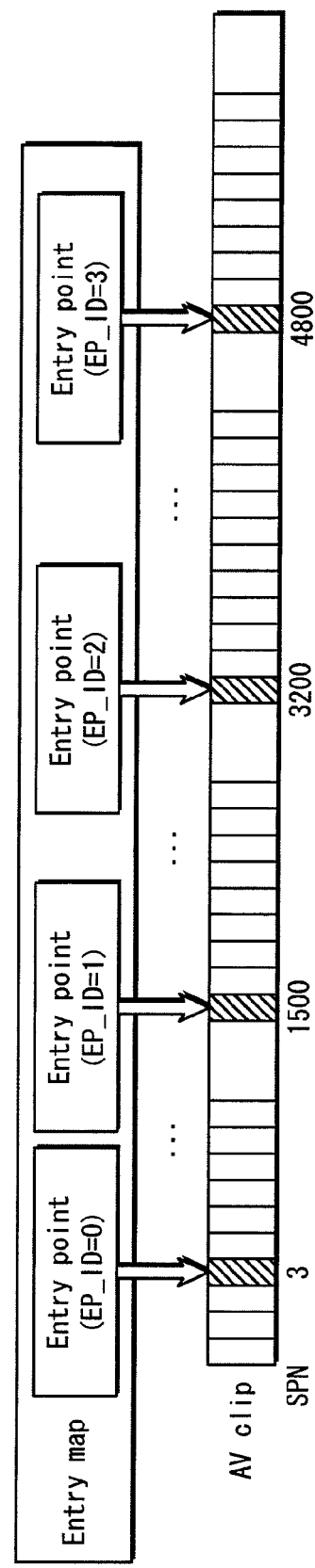

FIG. 21B shows source packets specified by the plurality of entry points in the entry map corresponding to the TS packets PID=0x1011 shown in FIG. 23A. The entry point corresponding to EP_ID=0 indicates SPN=3, and this source packet number is associated with PTS=80000. The entry point corresponding to EP_ID=1 indicates SPN=1500, and this source packet number is associated with PTS=270000.

The entry point corresponding to EP_ID=2 indicates the source packet having SPN=3200, and this source packet number is associated with PTS=360000. The entry point corresponding to EP_ID=3 indicates the source packet having SPN=4800, and this source packet number is associated with PTS=450000.

Figure 22:
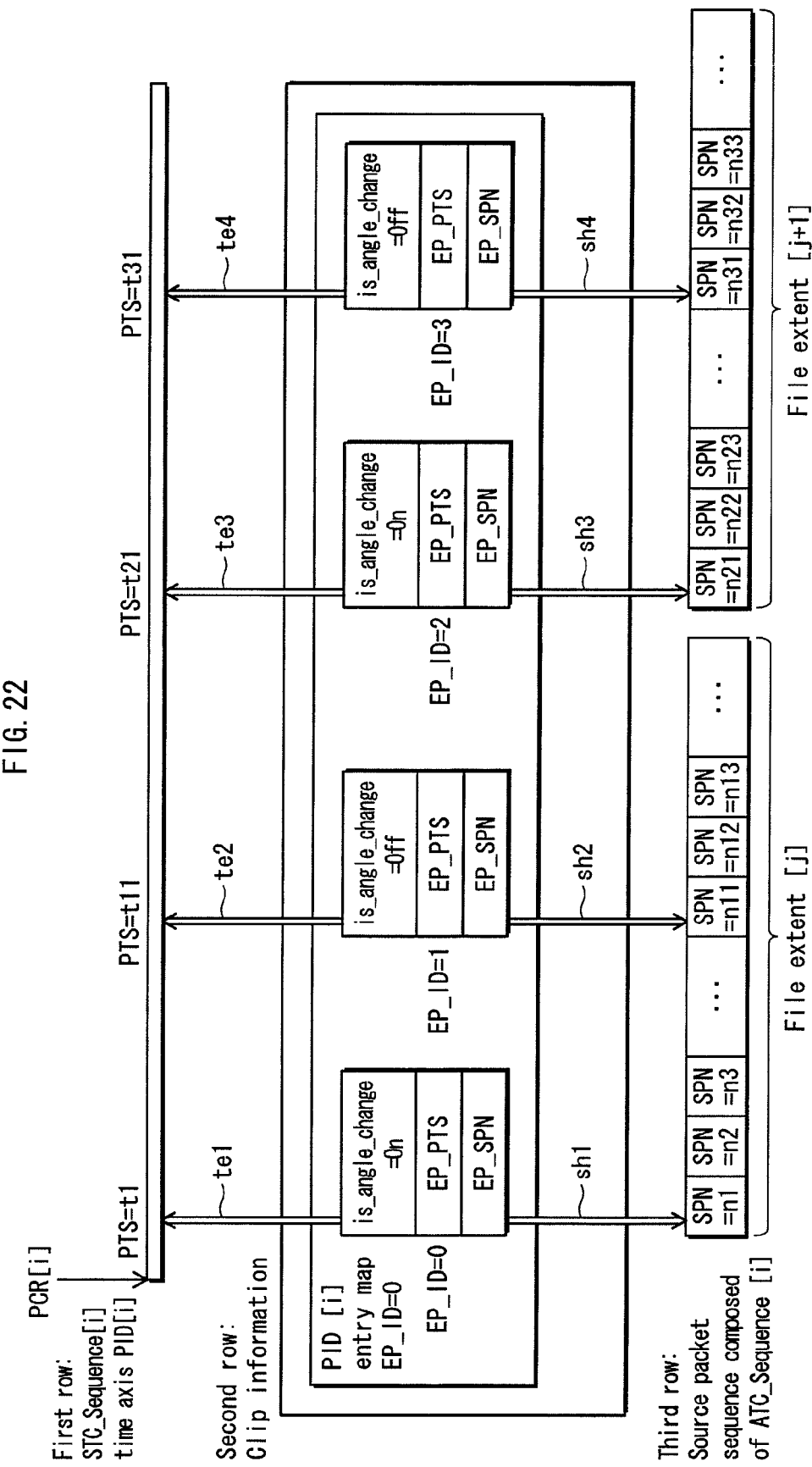
FIG. 22 shows a registration of an entry point on an entry map.

FIG. 22 depicts entry points registered in an entry map. The first row depicts a time axis specified by an STC sequence. The second row depicts an entry map in clip information. The third row depicts source packet sequences in the ATC sequence.

The arrows te1, te2, te3, and te4 schematically show a correspondence relationship between the playback points t1, t11, t21, and t31 in the ATC time axis and respective entry points. The arrows sh1, sh2, sh3, and sh4 schematically show a correspondence relationship between SPN=n1, n11, n21, and n31 and respective entry points.

Consider the entry map that specifies source packets having SPN=n1, from among the source packets in the ATC sequence. In the case of this entry map, the PTS is set to indicate t1 in the STC sequence. This entry map enables the playback apparatus to execute random access to SPN=n1 in the ATC sequence, with use of the time point PTS=t1 in the STC sequence. Also, if the source packet SPN=n21 is specified from among the source packets in ATC sequence, the PTS of the entry map is set to indicate t21 in the STC sequence. This entry map enables the playback apparatus to execute random access to SPN=n21 in the ATC sequence, with use of the time point PTS=t21.

Figure 23:
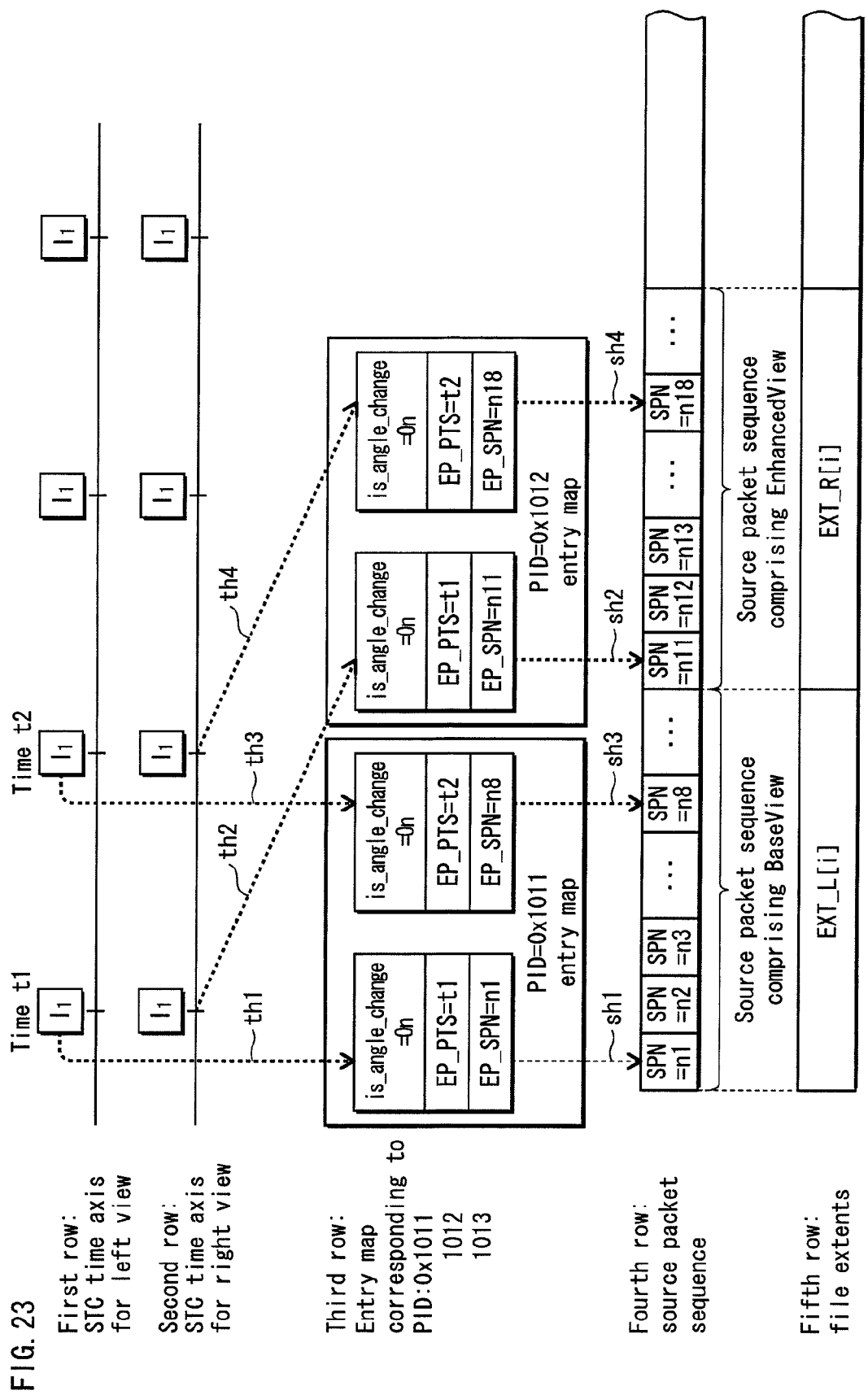
FIG. 23 shows how entry maps corresponding to each of the left view and the right view are set.

FIG. 23 shows how entry maps corresponding to each of the left view and the right view are set. According to the correspondences in FIG. 23, a source packet number in the STC sequence is recorded as the source packet number of each entry point, and a PTS in the STC sequence is recorded as the PTS of each entry point. The entry maps indicate how the source packets correspond to the time axis.

The arrows th1, th2, th3, and th4 schematically show the correspondence between playback time points t1 and t2 on the STC time axis and the entry points. The arrows sh1, sh2, sh3, and sh4 schematically show the correspondences between the SPN=n1, n11, n8, and n18 in the ATC sequence and entry points.

The fifth row depicts extents of a left view and a right view recorded by interleaving, and is the same as the figures described above. The third row shows entry maps corresponding respectively to PID=0x1011 and PID=0x1012. The entry map corresponding to PID=0x1011 includes an entry point indicating n1 and an entry point corresponding to n8. These entry points indicate correspondences between n1 and n8, and t1 and t2 on the STC time axis. The entry map corresponding to PID=0x1012 includes an entry point indicating n11 and an entry point indicating n18. These entry points show correspondences between n11 and n18, and t1 and t2 on the STC time axis.

That is, left and right view extents that are to be played back at the same time point on the time axis may be recorded in widely separated positions in the AV data recording area. Yet, with the use of entry maps corresponding respectively to the extents, source packets at the start of the right view extent and the left view extent may be uniquely accessed based on the corresponding PTS.

This concludes the description of the clip information files.

PlayList Information

Next, the details of the PlayList information are described.

Figure 24:
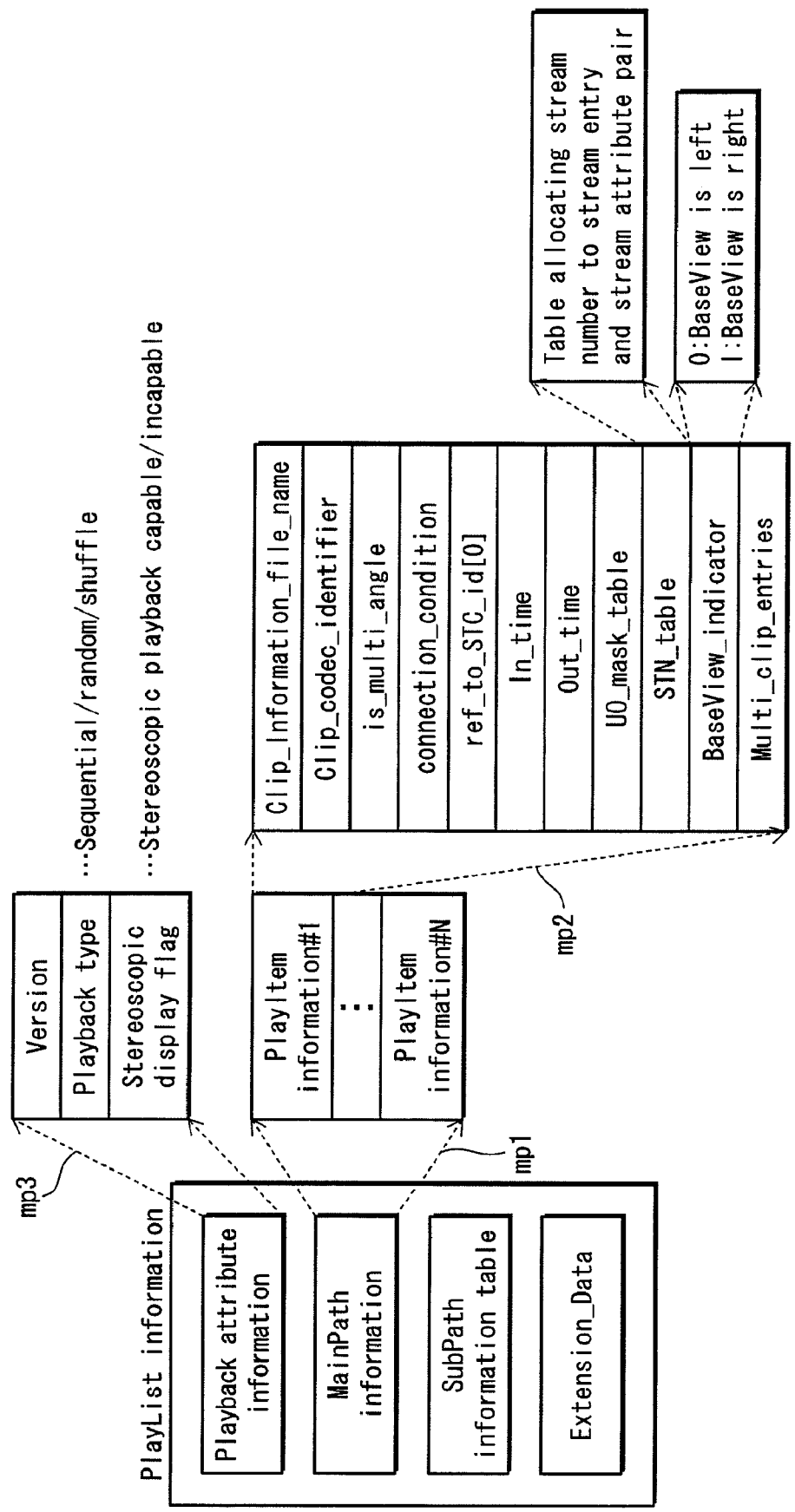
FIG. 24 shows a data structure of playlist information.

FIG. 24 depicts a data structure of PlayList information. In FIG. 24, the PlayList information includes playback attribute information, MainPath information, a SubPath information table, and extension data.

First, playback attribute information is described. The lead line mp3 shows a close-up of an internal structure of playback attribute information. As shown with the lead line mp3, the playback attribute information includes "version number" indicating the version of the standards on which the content is based, "playback type", and "stereoscopic display flag". The "version number" field may store a value such as "2.00" indicating the version of the BD-ROM application format. The "playback type" field causes a playback apparatus to execute "sequential" or "random/shuffle" playback. The sequential playback is to playback PlayItems included in a PlayList in order form the beginning.

Next, MainPath information is described. The lead line mp1 shows a close up of the internal structure of the MainPath information. As shown by the arrow mp1, a MainPath is defined by a plurality of PlayItem information pieces #1 . . . #m. The PlayItem information defines one logical playback section that makes up the MainPath. The structure of the PlayItem information is shown in close up by the lead line mp2. As shown by the lead line, the PlayItem information is constituted from sets of a "Clip_Information_file_name" that indicates a file name of playback section information of an AV clip belonging to the IN point and Out point of the playback section, a "Clip_codec_identifier" that indicates an encoding method of an AV clip, an "is_multi_angle" that indicates whether a PlayItem is a multi-angle, a "connection_condition" that indicates a connection state between the PlayItem (the current PlayItem) and the PlayItem that is immediately previous to the current PlayItem (previous PlayItem), a "ref_to_STC_id[°]" uniquely indicating an STC Sequence targeted by the PlayItem, an "In_time" that is time information indicating a start point of the playback section, an "Out_time" that is time information indicating an endpoint of the playback section, an "UO_mask_table" indicating which user operation is to be masked in the PlayItem, an "STN_table", a "BaseView_indicator", and a "multi_clip_entry". Among these, the items that are playback paths are the pair of the "In_time" that is time information indicating a start point of the playback section, and the "Out_time" that is time information indicating an endpoint of the playback section. Playback path information is composed of this pair of "In_time" and "Out_time".

The STN_table (Stream Number_table) is a table in which pairs composed of a stream_entry, including a packet ID, and a stream attribute are allocated to a logical stream number.

The order of the stream entry and stream attribute pairs in the STN_table indicates a priority ranking of the corresponding streams.

When a BaseView_indicator is 0, the BaseView is Left, and when the BaseView_indicator is 1, the BaseView is Right.

Figure 25:
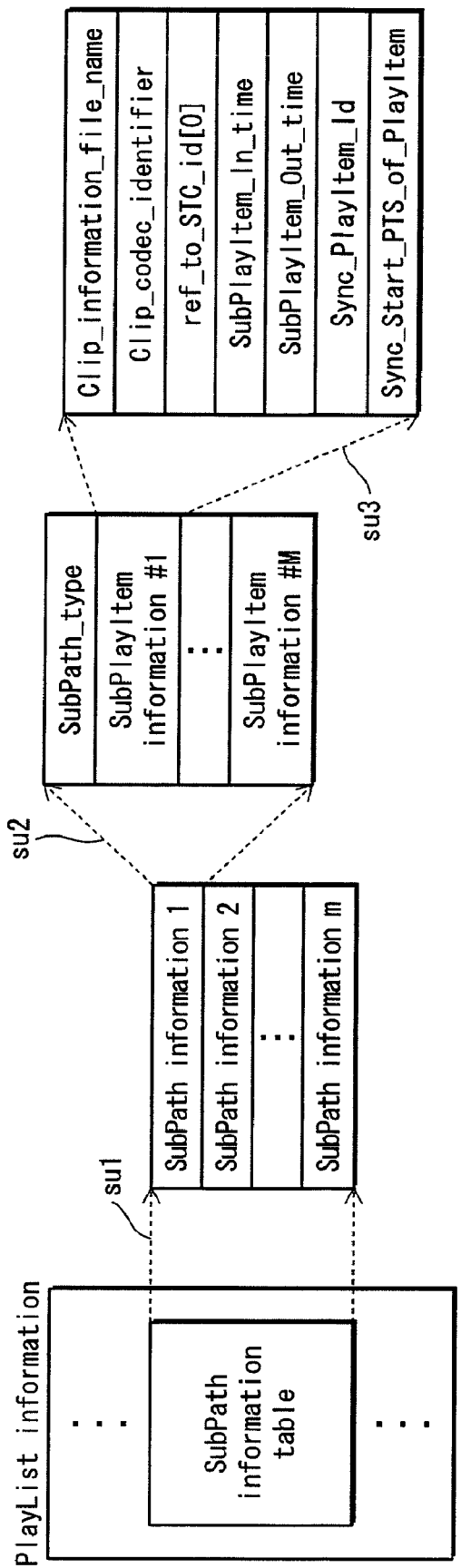
FIG. 25 shows a data structure of a subpath information table.

FIG. 25 depicts an internal structure of a SubPath information table. The lead line su1 shows a close-up of the internal structure of the SubPath information. As shown by the lead line su1, the SubPath information table includes a plurality of pieces of SubPath information 1, 2, 3 . . . m. These pieces of SubPath information are a plurality of instances derived from one class structure and thus have a common internal structure. The lead line su2 shows a close-up of the shared internal structure of the SubPath information. As shown by the lead line, each piece of SubPath information includes a SubPath_type indicating a SubPath type, and one or more pieces of SubPlayItem information ( . . . SubPlayItem information #1 to #m . . . ). The lead line su3 shows a close-up of the internal structure of the SubPlayItem. As shown by the lead line, each piece of SubPlayItem information is composed of a "Clip_information_file_name", a "Clip_codec_identifier", a "ref_to_STC_id[0]", a "SubPlayItem_In_Time", a "SubPlayItem_Out_time", a "sync_PlayItem_id", and a "sync_start_PTS_of_PlayItem". The following describes an internal structure of a SubPlayItem.

The "Clip_information_file_name" is information that uniquely specifies, by a file name of the clip information, a SubClip corresponding to a SubPlayItem.

The "Clip_codec_identifier" indicates an encoding method of the AV clip.

The "ref_to_STC_id[0]" uniquely indicates an STC Sequence targeted by the SubPlayItem.

The "SubPlayItem_In_time" is information indicating a start point of the SubPlayItem on the playback time axis of a SubClip.

The "SubPlayItem_Out_time" is information indicating an end point of the SubPlayItem on the playback time axis of the SubClip.

The "sync_PlayItem_id" is information that uniquely identifies a PlayItem, from among the PlayItems in the Main-Path, to be synchronized with the SubPlayItem. The SubPlayItem_In_time exists on the playback time axis of the PlayItem designated by the sync_PlayItem_id.

The "sync_start_PTS_of_PlayItem" indicates where, on a playback time axis of the PlayItem specified by the sync_PlayItem_id, a start point of the SubPlayItem specified by the "SubPlayItem" exists, with the time accuracy of 45 KHz.

Figure 26:
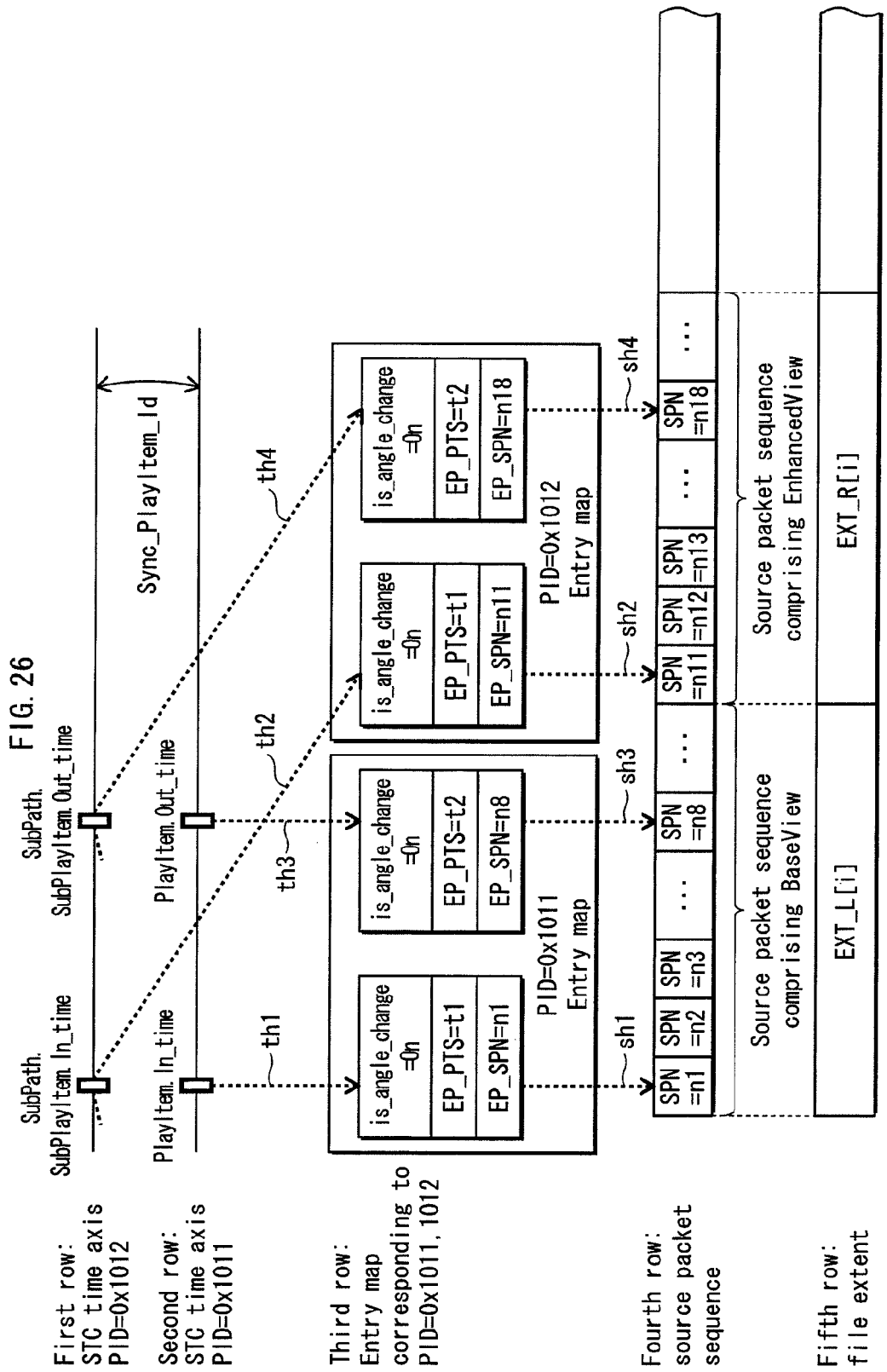
FIG. 26 shows what type of playback sections are defined for the left view and right view.

FIG. 26 depicts playback sections defined for each of the left view and the right view. FIG. 26 is drawn based on FIG. 23. More specifically, the In_Time and the Out_Time of a PlayItem is indicated in the time axis on the second row of FIG. 23 on which FIG. 26 is based. On the time axis of the first row, the In_Time and Out_Time of a SubPlayItem is drawn. The third to fifth rows are identical to corresponding portions of FIG. 23. The I pictures of the left view and the right view reside at the same point on the time axis. The left view and the right view are associated with each other by the PlayItem information and the SubPlayItem information.

The left view and the right view are associated with each other by the PlayItem information and the SubPlayItem information.

Figure 27:
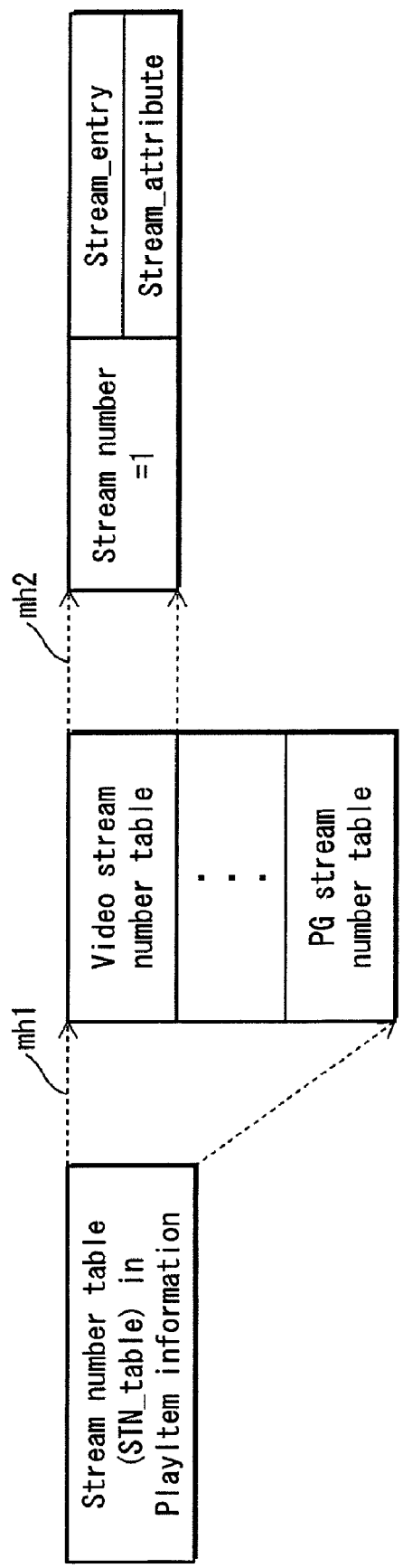
FIG. 27 shows an internal structure of a video stream number table.

FIG. 27 shows an internal structure of the video stream table. As shown by the lead line mh1, the video stream number table includes pairs of stream_entry and stream_attribute.

The "stream_entry" includes a "ref_to_stream_PID_of_main_Clip" indicating a reference value for the PIDs of the PES packets that make up a primary elementary stream, a "video_format" indicating a video display method such as NTSC, PAL etc., and a "frame_rate" indicating a frame rate such as ½4 second, 1/29.94 second, etc.

Figure 28:
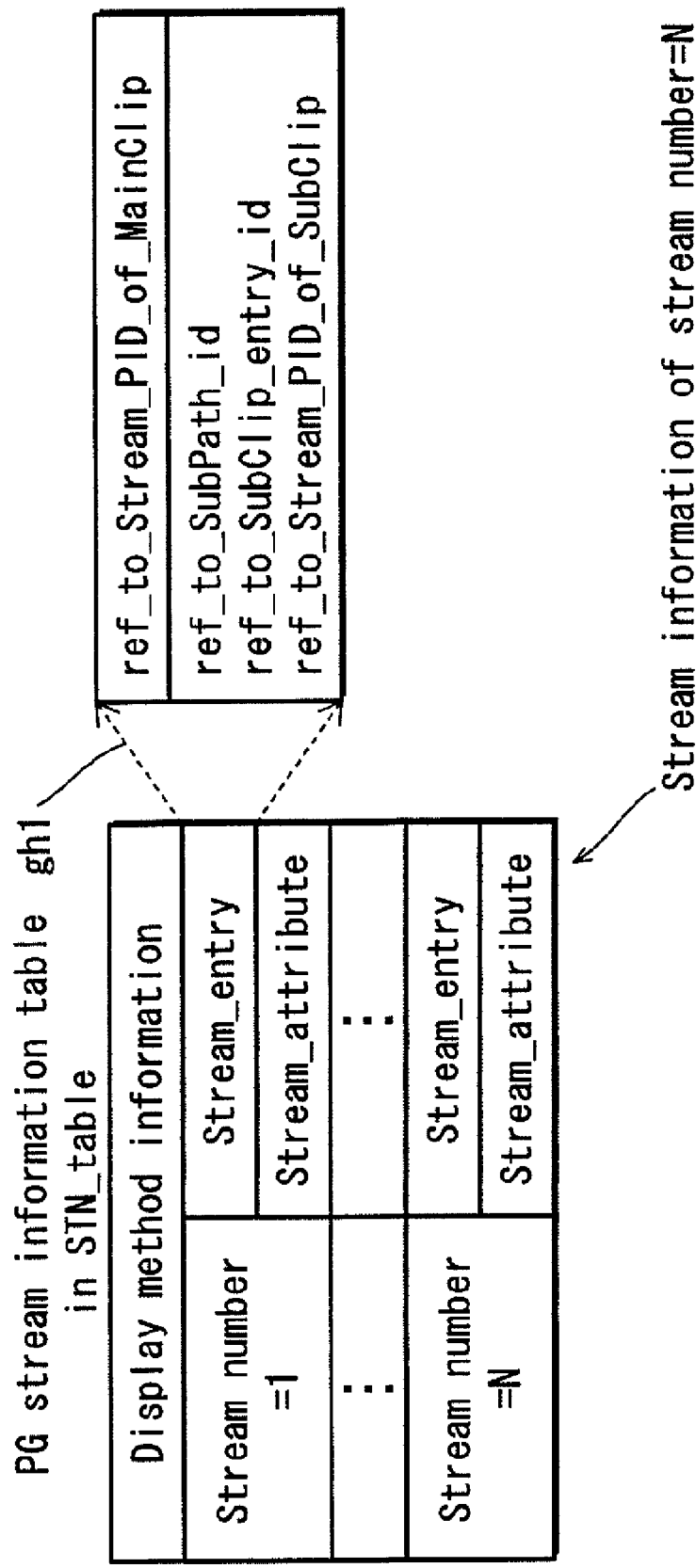
FIG. 28 shows an internal structure of a PG stream information table in an STN_table.

FIG. 28 shows an internal structure of a PG stream information table in an STN_table. The PG stream information table in the STN_table is constituted from "display method information" and "n pieces of stream information". The n pieces of stream information are in one-to-one correspondence with stream numbers, and are constituted from a stream_entry and a stream_attribute. The lead line gh1 shows a close-up of the internal structure of the stream_entry. One of "ref_to_stream_PID_of_mainClip", "ref_to_Sub_Path_id", "ref_to_SubClip_entry_id", and "ref_to_stream_PID_of_subClip" is set in the stream_entry. The "ref_to_stream_PID_of_SubClip" indicates a PID for a PG stream that corresponds to the stream number existing in the same AV Clip as the video stream.

Figure 29:
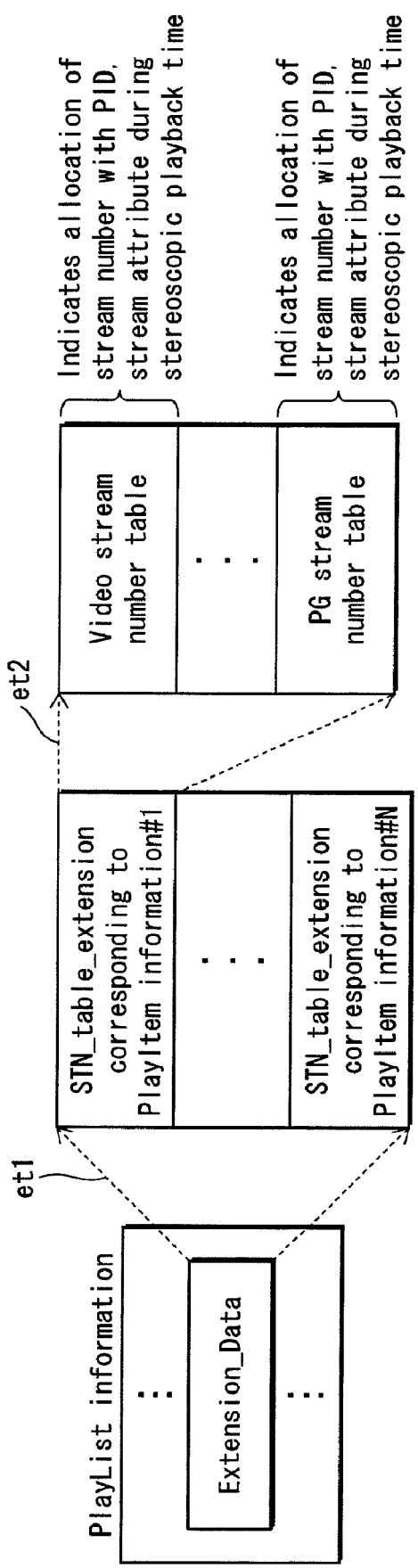
FIG. 29 shows an internal structure of extension data in playlist information.

The following describes the extension data. FIG. 29 shows an internal structure of extension data in the PlayList information. A lead line et1 shows a close-up of the internal structure of the extension data. As shown by this lead line, the extension data is composed of STN_table extension fields corresponding respectively to the PlayItem information pieces #1 to #N. The lead line et2 shows a close up of an internal structure of an STN_table extension corresponding to the PlayItem information piece #1. As shown by this lead line, the STN_table extension corresponding to the PlayItem information piece #1 includes the "video stream number table".

Figure 30:
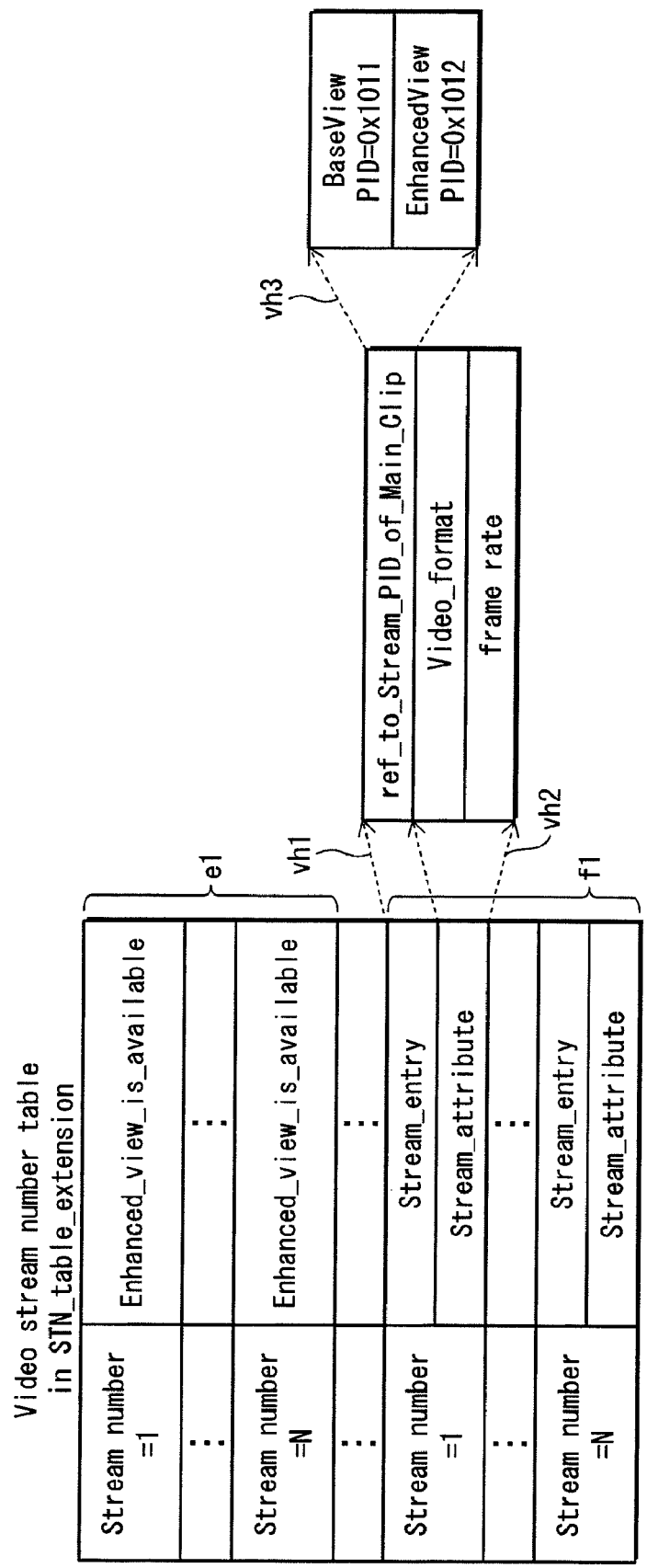
FIG. 30 shows an internal structure of a video stream number table.

FIG. 30 depicts an internal structure of the video stream number table.

The video stream number table includes N enhanced_view_is_available flags e1, and N pairs f1 of stream_entries and stream_attributes. These pairs are associated with the stream numbers 1 to N, and an enhanced_view_is_available flag can uniquely specify one of the pairs with use of a stream number from 1 to N. The pairs of stream_entry and stream_attribute can also be uniquely specified with use of a stream number from 1 to N.

As indicated with the lead line vh1, the "Stream_entry" includes a "ref_to_stream_PID_of_main_Clip" indicating the reference value for the PID assigned to the PES packets constituting the primary video stream. As indicated by the lead line vh2, the stream_attribute includes a "video_format" field and a "frame_rate" field.

The order of these stream_entries in these tables indicates the priority order of stream selection when the playback apparatus selects a stream. In other words, the playback apparatus preferentially selects the streams whose entries are highest in the table.

When the "enhanced_view_is_available" flag is set to ON to make EnhancedView valid, the "ref_to_stream_of_MainClip" is described to indicate the packet IDs 0x1011 and 0x1012.

The following describes the PG stream information table in the STN_table extension. The internal structure of the PG stream information table in the STN_table extension includes N pieces of stream information. The n pieces of stream information are in one-to-one correspondence with stream numbers, and are constituted from a stream_entry and a stream_attribute. The stream_entry includes a pair composed of a reference value corresponding to a PID of a PES packet that comprises a playable left view PG stream, and a reference value of a PID of a PES packet comprising a right view PG stream.

Here, there are the same number of stream_entry and stream_attribute pairs in the STN_table extension, as the number of stream_entry and stream_attributes pairs in the STN_table. The pairs of stream_entry and stream_attribute in the STN_table are in one-to-one correspondence with the pairs of stream_entry and stream_attribute in the STN_table, and these have the same stream numbers. The streams of left view and right view indicated by the stream_entry of the STN_table_extention and the streams shown by the stream_entry of the corresponding STN_table are basically identical, and the display position is only different in the horizontal direction. That is to say, a difference corresponding to the parallax between the human eyes has been added to the stream indicated by the stream_entry of the STN_table, and these are the left view and right view streams indicated by the stream_entry of the STN_table extention.

Note that the "content" referred to in the present specification is a unit including PlayList information managed by a certain title number, and a video stream in which AV clips referenced by the PlayList have been multiplexed, and is also called a "title".

This concludes the description of the PlayList information.

Playback Apparatus

Figure 31:
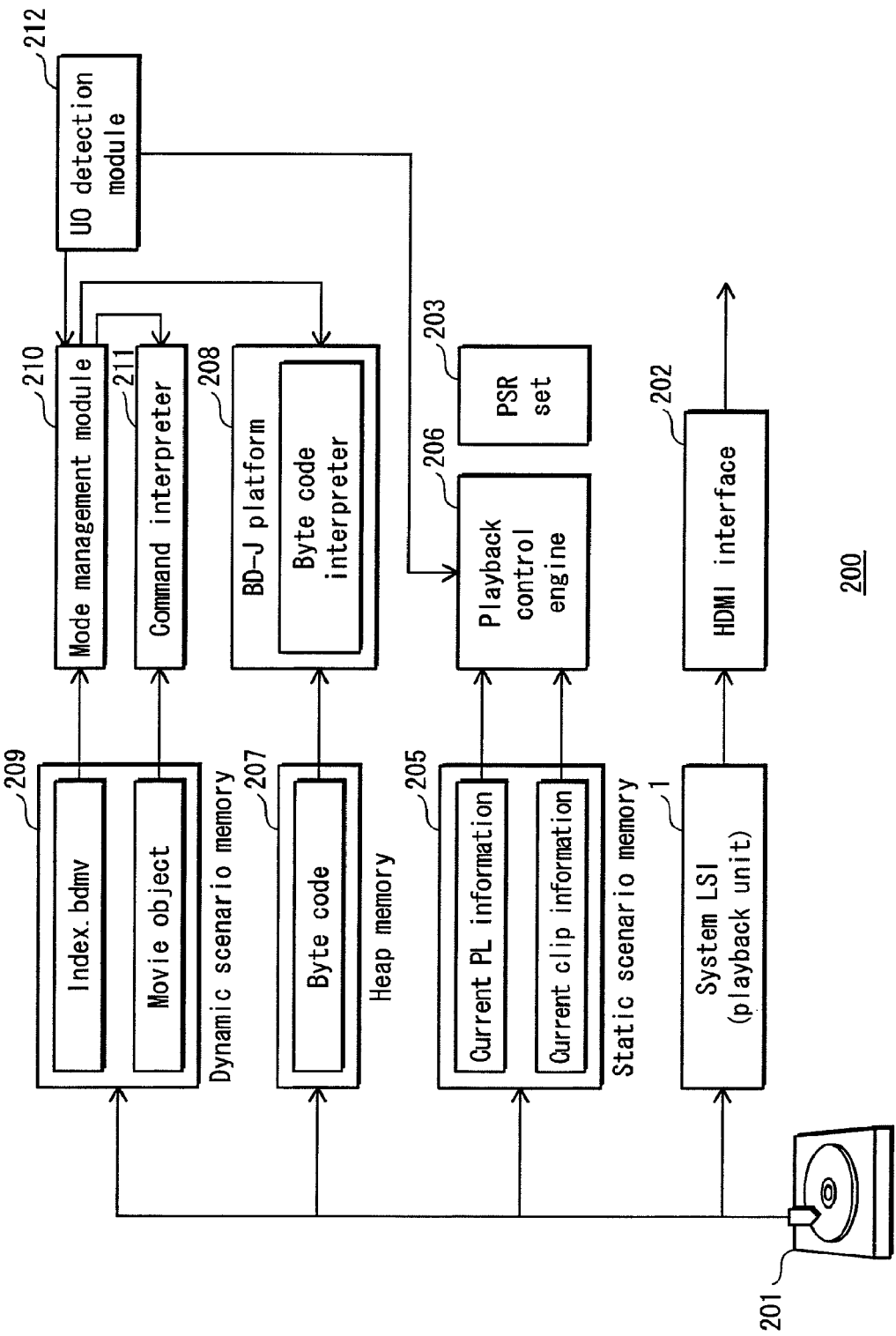
FIG. 31 shows an internal structure of a playback apparatus.

The following describes the details of the playback apparatus. FIG. 31 shows the internal structure of the playback apparatus. The playback apparatus 200 includes a BD drive 201, a system LSI (playback unit) 1, an HDMI interface 202, a playback state/setting register set 203, a static scenario memory 205, a playback control engine 206, a heap memory 207, a BD-J platform 208, a dynamic scenario memory 209, a mode management module 210, a command interpreter 211, and a UO detection module 212.

The BD drive 201 performs loading/reading/ejection of the BD-ROM, and executes an access of the BD-ROM. As a specific structure, the BD-ROM drive 112 includes, for example, a semiconductor laser (not depicted), a collimating lens (not depicted), a beam splitter (not depicted), an objective lens (not depicted), a condenser lens (not depicted), and an optical head (not depicted) including an optical detector (not depicted). An optical beam emitted from the semiconductor laser is focused onto an information side of an optical disk through the collimating lens, the beam splitter, and the field lens. The focused optical beam is reflected/refracted on the optical disk and is focused onto the light detector through the objective lens, the beam splitter, and the condenser lens. A signal generated according to the amount of light received by the light detector represents data read from the BD-ROM.

Figure 32:
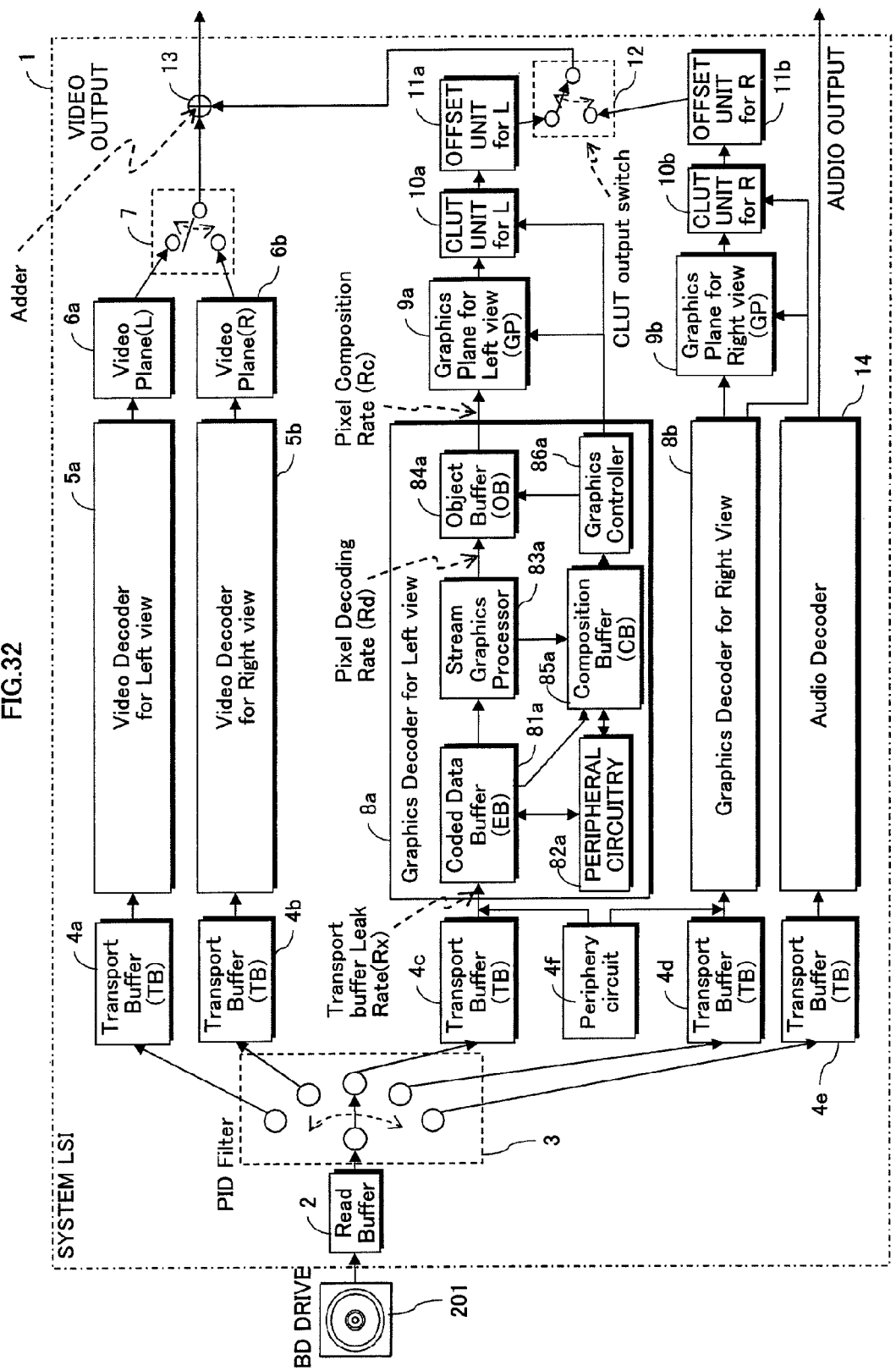
FIG. 32 shows an internal structure of a playback unit 1.

As shown in FIG. 32, the system LSI (playback unit) 1 includes a read buffer 2, a PID filter 3, transport buffers 4a, 4b, 4c, 4d, and 4e, a peripheral circuit 4f, a video decoder for left view 5a, a video decoder for right view 5b, a video plane (L) 6a, a video plane (R) 6b, a switch 7, a graphics decoder for left view 8a, a graphics decoder for right view 8b, a graphics plane for left view 9a, a graphics plane for right view 9b, a CLUT UNIT for L 10a, a CLUT UNIT for R 10b, an OFFSET UNIT for L 11a, an OFFSET UNIT for R 11b, a CLUT output switch 12, an adder 13, and an Audio Decoder 14.

The read buffer 2 is a typically an FIFO memory that temporarily stores therein a source packet read from a BD-ROM, and is a buffer for transferring the source packet to the PID filter 3 after adjusting the transfer speed thereof. Specifically, the read buffer 2 is composed of a right view read buffer for storing a right view source packet, and a left view read buffer for storing a left view source packet.

The PID filter 3 performs filtering on a plurality of TS packets that are output from the read buffer 2. The PID filter passes only TS packets having predetermined PIDs to one of the Transport Buffers 4a, 4b, 4c, 4d, and 4e. There is no buffering inside the PID filter 3. Accordingly, TS packets entering the PID filter 3 are instantaneously written to one of the Transport Buffers 4a, 4b, 4c, 4d, and 4e, according to the PID of the TS packet.

The Transport Buffers 4a, 4b, 4c, 4d, and 4e are FIFO memories for storing TS packets output from the PID filter 3. A speed at which a TS packet is read from the Transport Buffers 4a, 4b, 4c, 4d, and 4e is denoted by transfer rate Rx.

The peripheral circuit 4f has a wired logic for converting TS packets read from the Transport Buffers 4c and 4d to functional segments. The functional segments are then stored in the Coded Data Buffer (EB).

The video decoder for left view 5a decodes TS packets output from the PID filter 3 to obtain an uncompressed left view picture, and writes the picture to the Video Plane (L) 6a.

The video decoder for right view 5b decodes TS packets output from the PID filter 3 to obtain an uncompressed right view picture, and writes the picture to the Video Plane (R) 6b.

The video plane (L) 6a is a memory for storing therein uncompressed-type left view pictures.

The video plane (R) 6b is a memory for storing therein uncompressed-type right view pictures.

The switch 7 switches between outputting, to the adder 13, a left view picture and a right view picture.

The graphics decoder for left view 8a decodes a left view PG stream to obtain uncompressed graphics, and writes the uncompressed graphics to the graphics plane for left view 9a as graphics objects. Specifically, as shown in FIG. 32, the graphics decoder for left view 8a includes the Coded Data Buffer (EB) 81a, a peripheral circuit 82a, a Stream Graphics Processor 83a, an Object Buffer (OB) 84a, a Composition Buffer (CB) 85a, and a graphics controller 86a.

The Coded Data Buffer (EB) 81a is used for storing functional segments together with DTSs and PTSs. Such functional segments are obtained by removing a TS packet header and a PES packet header from each TS packet of a transport stream stored in the Transport Buffer 4c and arranging remaining payloads in sequence. DTSs and PTSs contained in the removed TS packet headers and PES packet headers are stored in the Coded Data Buffer in correspondence with the functional segments.

The peripheral circuit 82a has a wired logic for transferring data from the Coded Data Buffer (EB) 81a to the Stream Graphics Processor 83a and transferring data from the Coded Data Buffer (EB) 81a to the Composition Buffer 85a. When the current time reaches a DTS of an ODS, the peripheral circuit transfers the ODS from the Coded Data Buffer (EB) 81a to the Stream Graphics Processor 83a. Also, when the current time reaches the DTS of a PCS and a PDS, the peripheral circuit transfers the PCS and the PDS from the Coded Data Buffer (EB) 81a to the Composition Buffer (CB) 85a.

The Stream Graphics Processor 83a decodes the ODS to obtain uncompressed graphics having index colors, and transfers the uncompressed graphics to the Object Buffer (OB) 84a as a Graphics Object. The decoding by the Stream Graphics Processor 83a starts at a time of a DTS correlated to the ODS, and ends by the ending time of decoding shown by the PTS correlated to the ODS. The decode rate Rd of the graphics object described above is the output rate of the Stream Graphics Processor 83a.

The Object Buffer (OB) 84a corresponds to a pixel buffer in ETSI EN 300 743 standards. Graphics Objects decoded by the Stream Graphics Processor 83a are stored in the Object Buffer (OB) 84a.

The Composition Buffer 85a is a memory for storing a PCS and a PDS.

The Graphics Controller 86a decodes the PCSs in the Composition Buffer 85a, and performs control based on the decoded PCSs. Specifically, the graphics are written to the object buffer (OB) 84a, the graphics are read from the object buffer (OB) 84a, and the graphics are displayed. The execution timing of this control is based on the value of the PTS of the PES packet that stores the PCS.

The graphics decoder for right view 8b decodes a right view PG stream to obtain uncompressed-type graphics, and writes the uncompressed-type graphics to the graphics plane for right view 9b as graphics objects. Since the details of the structure are the same as the graphics decoder for left view 8a, description thereof is omitted.

The graphics plane for left view 9a is a plane memory having an area for storing one screen worth of graphics, and stores therein one screen worth of uncompressed graphics (left view).

The graphics plane for right view 9b is a plane memory having an area for storing one screen worth of graphics, and stores therein one screen worth of uncompressed graphics (right view).

The CLUT UNIT for L10a, with use of a color look-up table of a PDS indicated by a set palette_id, converts a pixel code stored in the graphics plane for left view 9a to a pixel value that is Y, Cr, Cb.

The CLUT UNIT for R10b, with use of a color look-up table of a PDS indicated by a set palette_id, converts a pixel code stored in the graphics plane for right view 9b to a pixel value that is Y, Cr, Cb.

Here, the same palette_id is set in both the CLUT UNIT for L1 10a and the CLUT UNIT for R10b.

The OFFSET UNIT for L11a adjusts the depth of color-converted left-view uncompressed graphics.

The OFFSET UNIT for R11b adjusts the depth of color-converted right-view uncompressed graphics.

The CLUT output switch 12 switches between left view uncompressed graphics and right view uncompressed graphics when outputting the uncompressed graphics to be output to the adder 13.

The adder 13 multiplies the uncompressed graphics converted by the CLUT unit for L10a (or the CLUT UNIT for R10b), by a T value (transparency) shown in the PDS. The adder 13 then obtains a composite image by adding the result of the multiplication to the uncompressed picture data stored in the Video Plane (L) 6a (or the Video Plane (R) 6b), and outputs the composite image.

The Audio Decoder 14 decodes TS packets output from the PID filter 3, and outputs uncompressed audio data.

This completes the description of the constituent elements of the playback unit 1.

Returning to FIG. 31, the HDMI transmission/reception unit 202 includes an interface that is compliant, for example, with HDMI standards (HDMI: High Definition Multimedia Interface), and performs transmission and reception in a manner compliant with HDMI standards between the playback apparatus and an apparatus (in the present example, the television 300), that is connected by HDMI. Video on which adding has been performed by the adder 13, and uncompressed audio data that has been decoded by the audio decoder 14, are transmitted to the television 300 via the HDMI transmission/reception unit 202.

The television 300 stores information indicating whether, for example, the television 103 supports stereoscopic display, information pertaining to possible resolution for monoscopic (i.e., two-dimensional) display, and information pertaining to possible resolution for stereoscopic display. In response to a request from the playback apparatus via the HDMI transmission/reception unit 202, the television 103 transmits to the playback apparatus requested necessary information (for example, information pertaining to whether the television 300 supports stereoscopic display, information pertaining to possible resolution for monoscopic (i.e., two-dimensional) display, and information pertaining to possible resolution for stereoscopic display). In this way, the playback apparatus is enabled to acquire information indicating whether the television 103 supports stereoscopic display, from the television 300 via the HDMI transmission/reception unit 202.

The playback apparatus/setting register (PSR) set 203 is a set of registers including a player status register storing the playback status of a PlayList, a playback setting register storing configuration information indicating the configuration of the playback apparatus, a general purpose register available for storing arbitrary information used by the contents. The playback status of a PlayList represents information such as a type of AV data that is being used from among various types of AV data information indicated in the PlayList, and a current position (time) of the PlayList is being played back. When the player status of the PlayList changes, the playback control engine 206 stores the changed player status in the PSR set 203. Further, in response to a request from an application being executed by the command interpreter, which is the executing entity in the HDMV mode, or by the Java platform, which is the executing entity in the BD-J mode, the playback control engine stores the value specified by the application in the PSR set 203 and passes the stored value to the application.

Also, there are flags, etc. indicating stereoscopic playback capability and stereoscopic playback display method, for example, in the PSR set 203.

Stereoscopic capability indicates whether a playback apparatus has the ability to execute stereoscopic playback.

A stereoscopic playback flag indicates whether a user intends to execute stereoscopic playback.

The static scenario memory 205 is a memory for storing current PlayList information and current clip information. The current PlayList information refers to a specific piece of PlayList information targeted for current processing from among the plurality of PlayList information pieces that can be accessed from the BD-ROM. The current clip information refers to information targeted for current processing from among the plurality of PlayList information pieces that can be accessed from the BD-ROM.

The playback control engine 206 executes AV playback functions and PlayList playback functions in accordance with function calls from the command interpreter, which is an execution entity in the HDMV mode, or from the Java platform, which is the execution entity in the BD-J mode. The AV playback functions are functional operations that follow DVD player and CD player operations, and include the following types of processing: Playback Start, Playback Stop, Pause, Stop Pause, Stop Static Image Function, Fast Forward at a speed specified with an immediate value, Rewind at a speed specified with an immediate value, Audio Change, SubTitle Change, and Angle Change. The PlayList playback functions are the functions Playback Start and Playback Stop, among the AV playback functions listed above that are performed according to PlayList information.

The heap memory 207 is a stack area for storing bytecodes of system applications, bytecodes of BD-J applications, system parameters used by system applications, and application parameters used by BD-J applications.

The BD-J platform 208 is a Java platform that is the execution entity in the BD-J mode, and fully implements Java2 Micro Edition (J2ME) Personal Basis Profile (PBP 1.0) and Globally Executable MHP specification (GEM1.0.2) for package media targets. The BD-J platform 208 includes a class loader and a bytecode interpreter. The class loader is one of system applications and reading the bytecode of a BD-R application from a class file contained in a JAR archive file into the heap memory, so that the BD-J application is loaded. The bytecode interpreter converts the bytecode comprising the BD-J application stored in the heap memory 207 and the bytecode comprising the system application into native code and enables the MPU to execute the BD-J application.

The dynamic scenario memory 209 is a memory for storing a current dynamic scenario and used for the processing by the command interpreter, which is the execution entity in the HDMV mode, and by the Java platform, which is the execution entity in the BD-J mode. The current dynamic scenario refers to a scenario that is targeted for current execution from among an Index.bdmv, a BD-J object, and a movie object recorded on the BD-ROM.

The module manager 210 that is an exemplary mode management module holds the index.bdmv read out from the BD-ROM, and performs mode management and branch control. The mode management by the module manager 210 is an assignment of a module, namely, specifying which of the command interpreter 211 and the BD-J module executes the dynamic scenario.

The command interpreter 211 is an exemplary HDMV module and is a DVD virtual player, which is the execution entity in the HDMV mode. The command interpreter, which is the execution entity in the HDMV mode, decodes and executes a navigation_command included in a scenario program. Since the navigation_commands are written in a syntax that is similar to DVD-Video, playback control similar to DVD-Video can be executed by executing the navigation_command.

The UO detection module 212 detects a user operation made on the remote controller 500 or on the front panel of the playback apparatus 200 and outputs information indicative of the detected user operation (hereinafter, simply "UO: User Operation") to the mode management module 210. From among the received UOs, UOs compliant with the current mode of the playback apparatus are selectably passed to one of the modules that executes the current mode. For example, if user operations for moving a cursor in one of up, down, right, and left directions and for activating the current selection is received in the HDMV mode, the UO detection module 212 passes the UOs to the HDMV mode module.

PlayList Playback Processing

The following describes the details of the PlayList playback processing.

Figure 33:
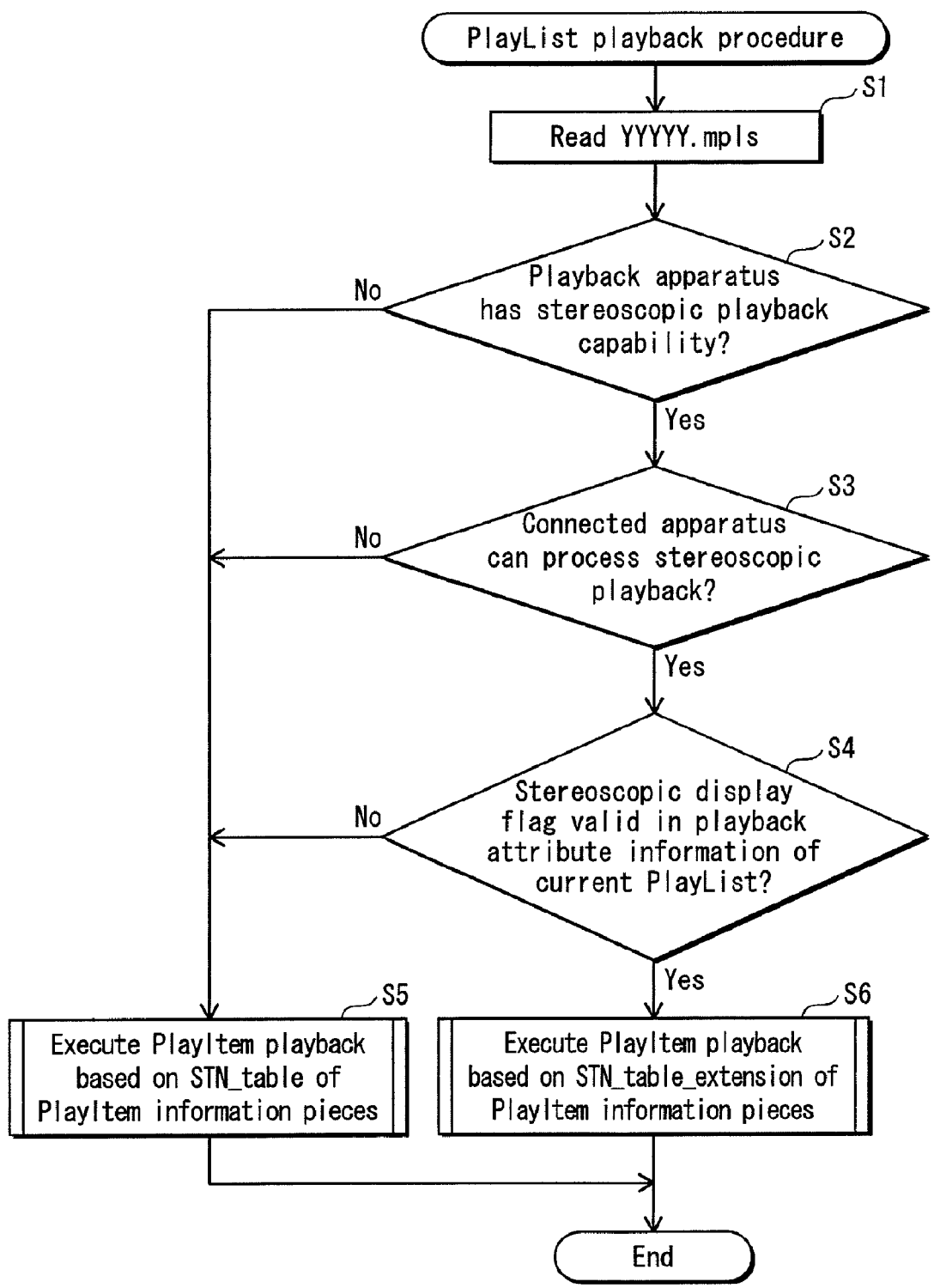
FIG. 33 is a flowchart showing a processing procedure of playlist playback processing.

FIG. 33 is a flowchart showing a processing procedure for PlayList playback processing.

In Step S1, PlayList information is read. Subsequently Steps S2-S5 are performed. In Step S2, it is judged whether the playback apparatus has the capability. In Step S3, it is judged whether a television connected to the playback apparatus has the capability of stereoscopic playback. In Step S4, it is judged whether the display method flag included in the playback attribute information of the current PlayList is valid. If any of the judgments in Steps S2-S4 result in "No", Step S5 is performed next to execute playback of each PlayItem based on the STN_table included in the respective pieces of PlayItem information.

If all the judgments in Steps S2-S4 result in "YES", Step S5 is performed to execute each PlayItem based on the STN_table_extension included in the respective pieces of PlayItem information.

Figure 34:
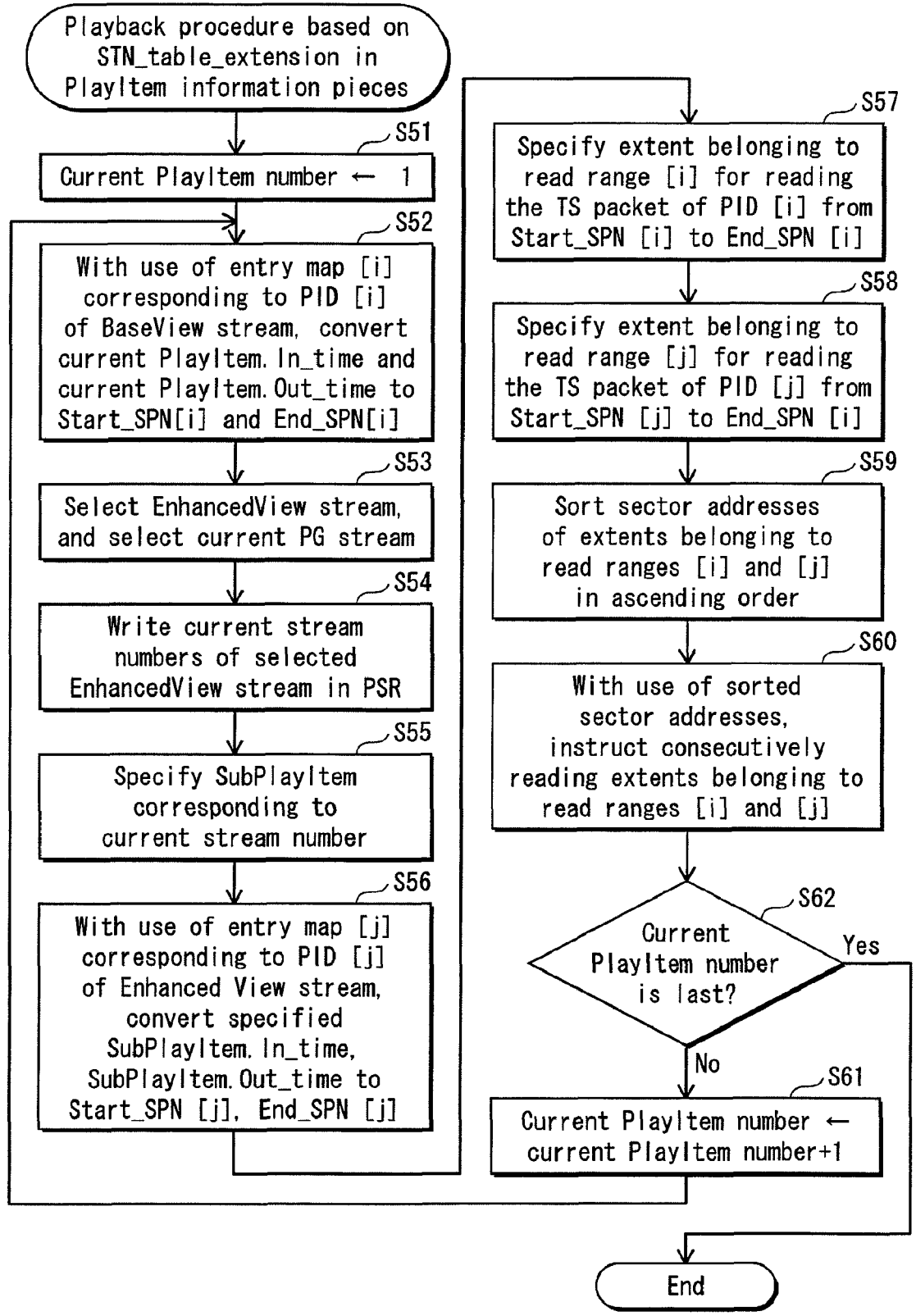
FIG. 34 is a flowchart showing a playback procedure based on an STN_table_extension.

FIG. 34 is a flowchart showing a procedure for executing playback according to STN_table_extensions.

In Step S51, the current PlayItem number is initialed to "1" and the processing goes onto the loop composed of Steps S52-S62. In the loop, Steps S52-S60 are executed on the current PlayItem number and then the current PlayItem number is incremented (Step S61) to repeat the Steps S52-S60 on the new current PlayItem number. The loop is repeated until the current PlayItem number reaches the last one of the PlayItem numbers (Step S62: Yes). The details of Steps S52-S60 are described below.

In Step S52, the PlayItem.In_Time and PlayItem.Out_Time of the current PlayItem are converted into Start_SPN[i] and End_SPN[i], with the use of the entry map corresponding to the packet ID of the BaseView stream.

Next, a suitable EnhancedView stream is selected and a suitable current PG stream is selected (Step S53). The current stream numbers of the selected streams are stored to the PSRs (Step S54). A SubPlayItem associated with the current stream number is specified (Step S55). The SubPlayItemIn_Time and SubPlayItemOut_Time are converted to Start_SPN[j] and End_SPN[j], with the use of the entry map [j] corresponding to the packet ID [j] of the EnhancedView stream (Step S56).

In order to read the TS packet[i] having the packet ID [i], the extents belonging to the read range [i] from the Start_SPN [i] to End_SPN[i] are specified (Step S57). In addition, in order to read TS packet [j] having the packet ID [j], the extents belonging to the read range from Start_SPN[j] and End_SPN [j] are specified (Step S58). Next, in Step S59, the extents belonging to the respective read ranges [i] and [j] are sorted in ascending order of the addresses. In Step S60, an instruction is given to the drive to sequentially read the extents belonging to the respective read ranges [i] and [j] based on the sorted addresses. This concludes the description of the playback procedure executed based on the STN_table_extension.

The following describes the procedure for selecting a PG stream.

There are two types of procedure for selecting a PG stream based on the STN_table or STN_table_extension. One is "Procedure when playback condition is changed" and the other is "Procedure when Stream change is requested". The selection of the PG stream is performed by the playback control engine 206.

The "Procedure when playback condition is changed" is executed when the status of the playback apparatus changes in response to an event occurred to the playback apparatus.

The "Procedure when Stream Change is requested" is executed when the user requests the switching between streams.

Figure 35A:
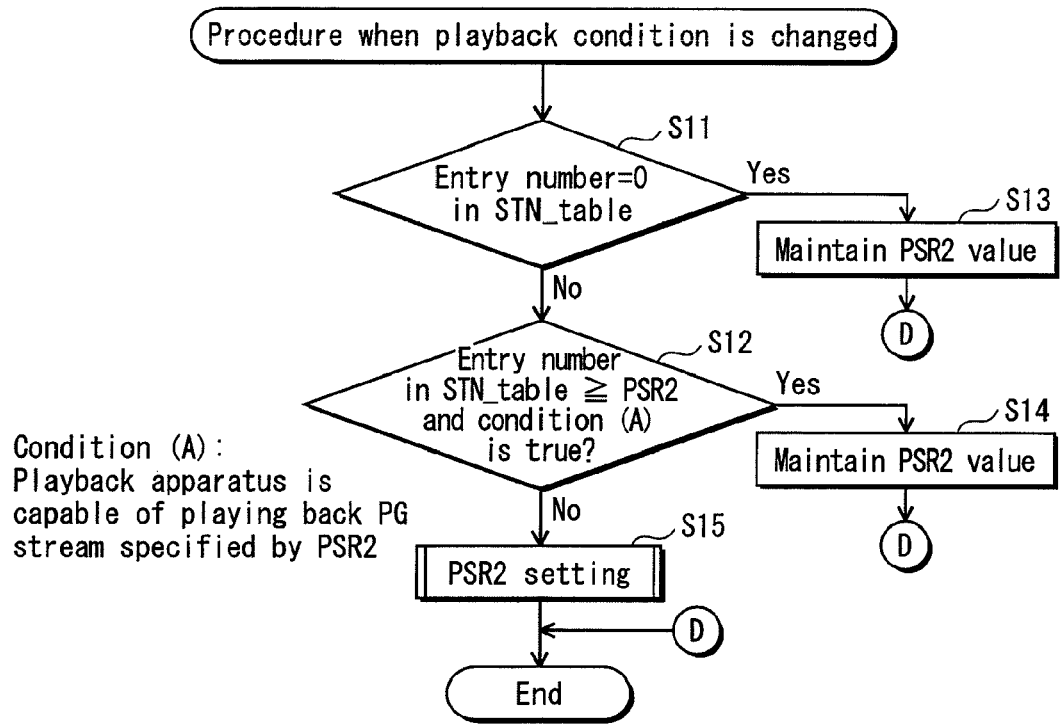
FIG. 35 is a flowchart showing a procedure for setting PSR2s when an apparatus state changes and when a stream change is required.

FIG. 35A is a flowchart showing the procedure for setting the PSR 2 at the time when a status change takes place. Here, the PSR2 indicates the current stream number of the PG.

In Step S11, a judgment is made as to whether the number of entries included in the STN_table is equal to "0". If the number of entries is equal to "0", the value held in the PSR 2 is maintained (Step S13).

Step S12 is performed if the number of entries included in the STN_table is not equal to "0". In Step S12, a judgment is made as to whether the number of entries included in the STN_table is larger than the value held in the PSR 2 and if the condition (A) is satisfied. The condition (A) is satisfied if the playback apparatus is capable of executing playback of the PG stream specified by the value held in the PSR 2. If the judgment in Step S12 results in "Yes", the value held in the PSR 2 is maintained (Step S14). On the other hand, if the value held in the PSR 2 is larger than the number of entries included in the STN_table or the condition (A) is not satisfied, the value of PSR 2 is reset (Step S15).

Figure 35B:
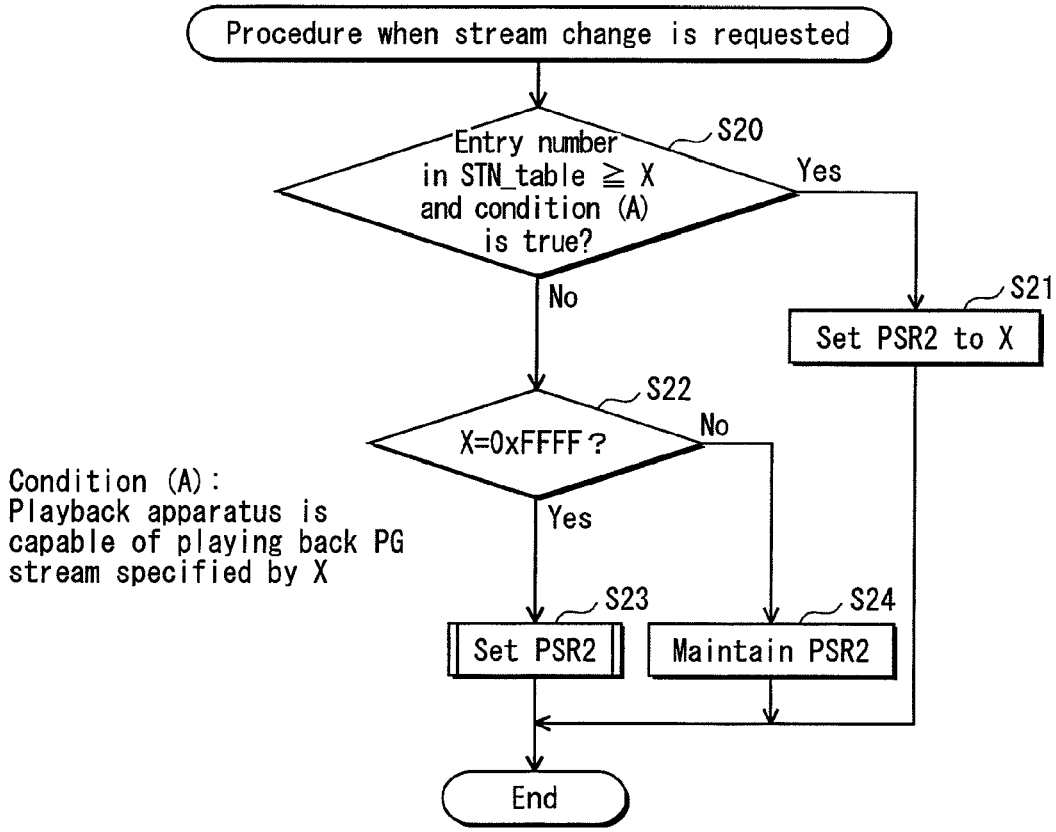

FIG. 35B is a flowchart showing the procedure for setting the PSR 2 at the time when a stream change takes place. The flowchart shown in FIG. 42B is identical to the flowchart shown in FIG. 42A, except that the denotation of "PSR 2" is replaced with X. The "X" denotes a value based on a user operation.

In Step S20 shown in this flowchart, a judgment is made as to whether the number of entries included in the STN_table is larger than X and if the condition (A) is true. The condition (A) is true if the playback apparatus is capable of executing playback of the PG stream specified by the value held in the PSR 2. This judgment is made by comparing the value of PSR 15 (indicating a subtitle capability) with the Stream_coding_type of the PG stream. If X satisfies this condition, the value of the PSR 2 is set to the value of X (Step S21).

On the other hand, if the value of X is larger than the number of entries or the condition (A) is not satisfied, it is then judged if the value of X is equal to "0xFFFF" (Step S22). If the value of X is not equal to "0xFFFF", the PG stream number specified by the user is assumed to be invalid. Thus, the value of X specified by the user operation is discarded and the value held in the PSR 2 is maintained (Step S24). If the value held in the PSR 2 is equal to "0xFFFF", the PSR 2 is set accordingly (Step S23).

FIG. 36 is a flowchart indicating a PSR2 setting procedure. In the flowchart, Steps S31 and S32 form a loop in which Steps S33 to S35 are repeated for each subtitle stream described in the STN_table. In the loop, the PG stream currently being processed is referred to as a PG stream i. In Step S33, it is judged whether the PG stream i is a graphics subtitle stream or a text subtitle stream. If the subtitle stream i is a graphics subtitle stream, the processing proceeds to Step S34.

In Step S34, it is judged whether the graphics subtitle stream i satisfies the following conditions (a) and (b).

The condition (a) is satisfied if the playback apparatus is capable of executing playback of the graphics subtitle stream i.

The condition (b) is satisfied if the language attribute of the graphics subtitle stream i matches the language settings of the playback apparatus.

The judgment regarding the condition (b) is made by checking if the PG_language_code included in the STN_table matches the value held in the PSR 16 (indicating the language setting of the apparatus).

In Step S35, on the other hand, it is judged whether the text subtitle stream satisfies the following conditions (a) and (b).

The condition (a) is satisfied if the playback apparatus is capable of expanding the text subtitle stream i into fonts.

The condition (b) is satisfied if the language attribute of the graphics subtitle stream i matches the language settings of the playback apparatus.

The judgment regarding the condition (a) is made by checking whether the PSR 30 of the playback apparatus indicates that the playback apparatus is "playback capable". The judgment regarding the condition (b) is made by checking if the PG_language_code included in the STN_table matches the value held in the PSR 16.

When the processes of Steps S33 to S35 have been repeated on each PG stream, the processes of Steps S36-S41 are performed.

In Step S36, a judgment is made as to whether any graphics subtitle satisfies the condition (a). If no graphics subtitle satisfies the condition (a), the PSR 2 is set to an invalid value (0xFFFF) (Step S38).

In Step S37, a judgment is made as to whether any PG stream satisfies both the conditions (a) and (b). If one or more PG streams satisfy both the conditions (a) and (b), the PSR 2 is set to a value equal to the stream number of one of the PG streams having a higher entry order in the STN_table (Step S41).

In Step 39, the PSR 2 is set to a value equal to the stream number of one of the streams having the highest entry order in the STN_table, from among graphics subtitle streams and text subtitle streams each satisfying the condition (a) only.

When the PRS2 has been set, a judgment is made as to whether the playback apparatus is capable of performing 3D playback using the left view and the right view. If 3D playback is possible, PIDs for a left view PG stream and a right view PG stream corresponding to a PSR2 stream number are set in the PID filter 3, and packet filtering is performed.

The left view graphics decoder and the right view graphics decoder are started up, and decoding is performed on two systems of TS packet groups.

According to the embodiment described above, the plurality of DSs of the left view PG stream and the plurality of DSs of the right view PG stream are in one-to-one correspondence, and an identical PTS is set in the presentation composition segments of corresponding DSs. Also, a composition_state having identical content is set in the presentation composition segments of corresponding DSs.

Therefore, if the composition_state is, for example, Epoch Start for the DS of one of the PG streams, the composition_state for the DS of the other one of the PG streams is also Epoch Start.

Accordingly, since these DSs are provided at points likely to be chosen as playback start points, during random access, if decoding one of the PG streams is possible, decoding the other PG stream is necessarily possible. Therefore, this enables ensuring the stereoscopic view of graphics during random access.

Also, in the DSs corresponding to the left view PG stream and the right view PG stream, the composition_number and the forced_on flag are set with identical content, and the PDS of the corresponding DS is set with identical content. Furthermore, in the WDS, the window_width, window_height, and window_vertical_position are set with identical content, and in the PCS, the object_cropping_width, the object_cropping_height, the object_cropping_vertical_position, and the object_vertical_position are set with identical content.

In this way, in the DS corresponding to the left view PG stream and the right view PG stream, fields other than the horizontal positions of the object and the display position (window_horizontal_position, object_horizontal_position, object_cropping_horizontal_position) are set with identical content, thus enabling the control content of the two graphics controllers in the playback apparatus to be substantially similar, and making the hardware structure simpler.

Variation 1-1

The playback apparatus includes a CLUT UNIT for L10a for left view and a CLUT UNIT for R10b for right view. Since the same palette_id is to be set for each CLUT UNIT, the same CLUT UNIT can be used. The following describes a variation in which left view and right view use the same CLUT UNIT.

Figure 37:
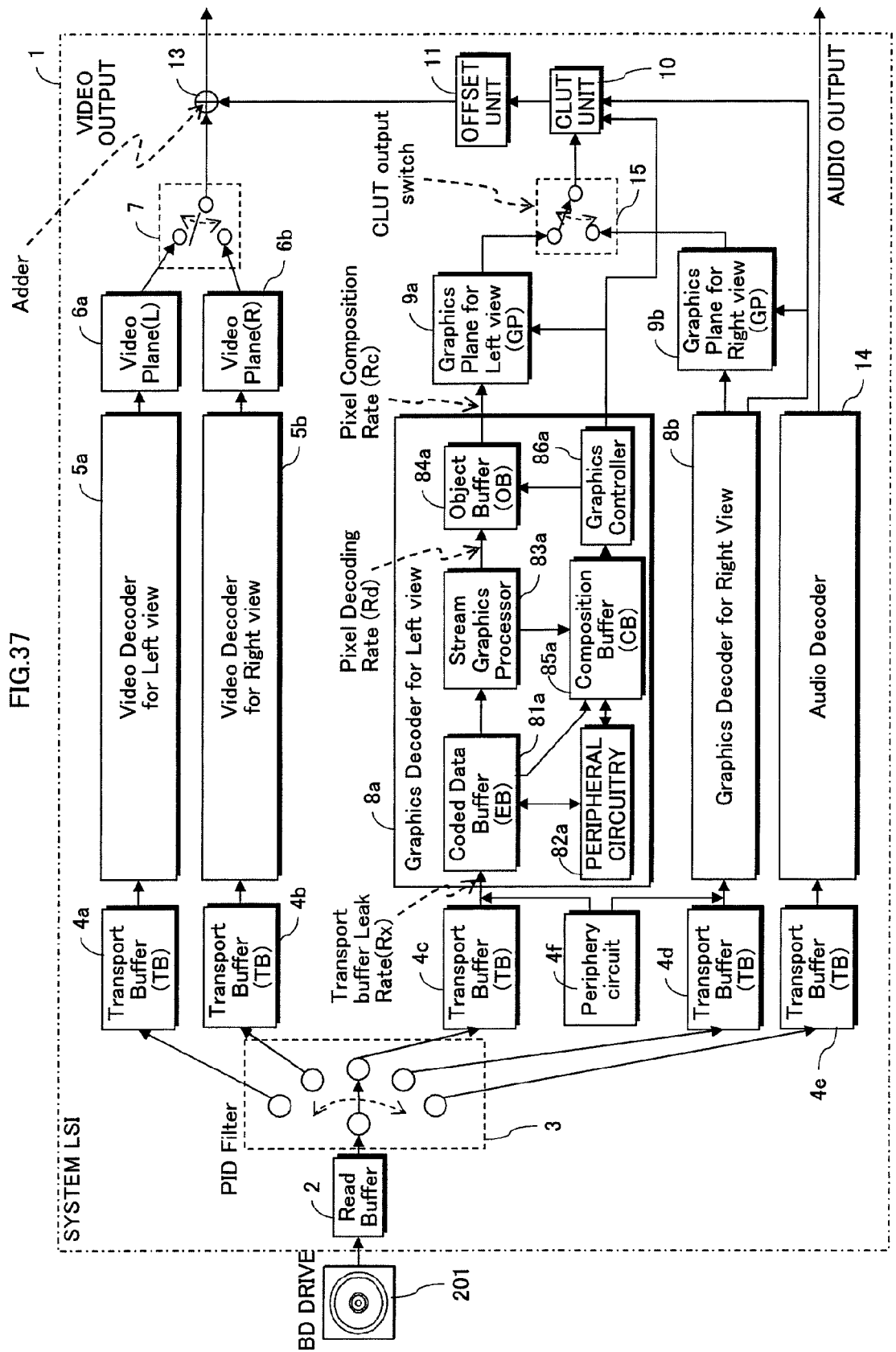
FIG. 37 shows an internal structure of a playback unit 1 in variation 1-1.

FIG. 37 shows an internal structure of a system LSI in the playback apparatus in variation 1-1.

The Graphics Plane for Left view and the Graphics Plane for Right view 9b are both connected to the CLUT output switch 15.

When outputting the uncompressed graphics to be output to the CLUT UNIT 10, the CLUT output switch 15 switches between left view uncompressed graphics and right view uncompressed graphics.

The OFFSET UNIT 11 adjusts the depth of the uncompressed graphics of the left view or the right view that have been color-converted by the CLUT UNIT 10, and outputs the depth to the adder 13.

As described above, since the output of the Graphics Plane for Left view 9a and the Graphics Plane for Right view 9b both connect to the same CLUT UNIT 10 via the CLUT output switch 15, along with reducing the scale of the hardware, there is a benefit that a 3D graphics decoder can be formed from the 2D graphics decoder with few changes.

Embodiment 2

Although embodiment 1 describes realizing a stereoscopic view of a PG stream in a 2-decoder model, the present embodiment describes a stereoscopic view of interactive graphics (hereinafter referred to as "IG") in a 2-decoder model.

An IG stream realizes interactive display of a graphics object. FIG. 38A shows the structure of the IG stream. The first row shows a TS packet sequence that makes up an AV clip. The second row shows a PES packet sequence that makes up a graphics stream. The PES packet sequence in the second row is constituted from TS packets from which payloads have been removed for TS packets having a predetermined PID, from among the TS packets in the first row, and linking the payloads together. The third row shows a structure of a graphics stream. The graphics stream is composed of functional segments referred to as an ICS (Interactive Composition Segment), a PDS (Palette Definition Segment), an ODS (Object Definition Segment), and an END (END of Display Set Segment). ICS is referred to as a presentation composition segment, and controls screen structure of interactive graphics objects. Since the correspondence between PES packets and functional segments, and details of other functional segments, are the same as PG, description thereof is omitted.

FIG. 38B shows a PES packet obtained by converting a functional segment. Since FIG. 38B is also similar to the case of PG, description thereof is omitted here.

Figure 39:
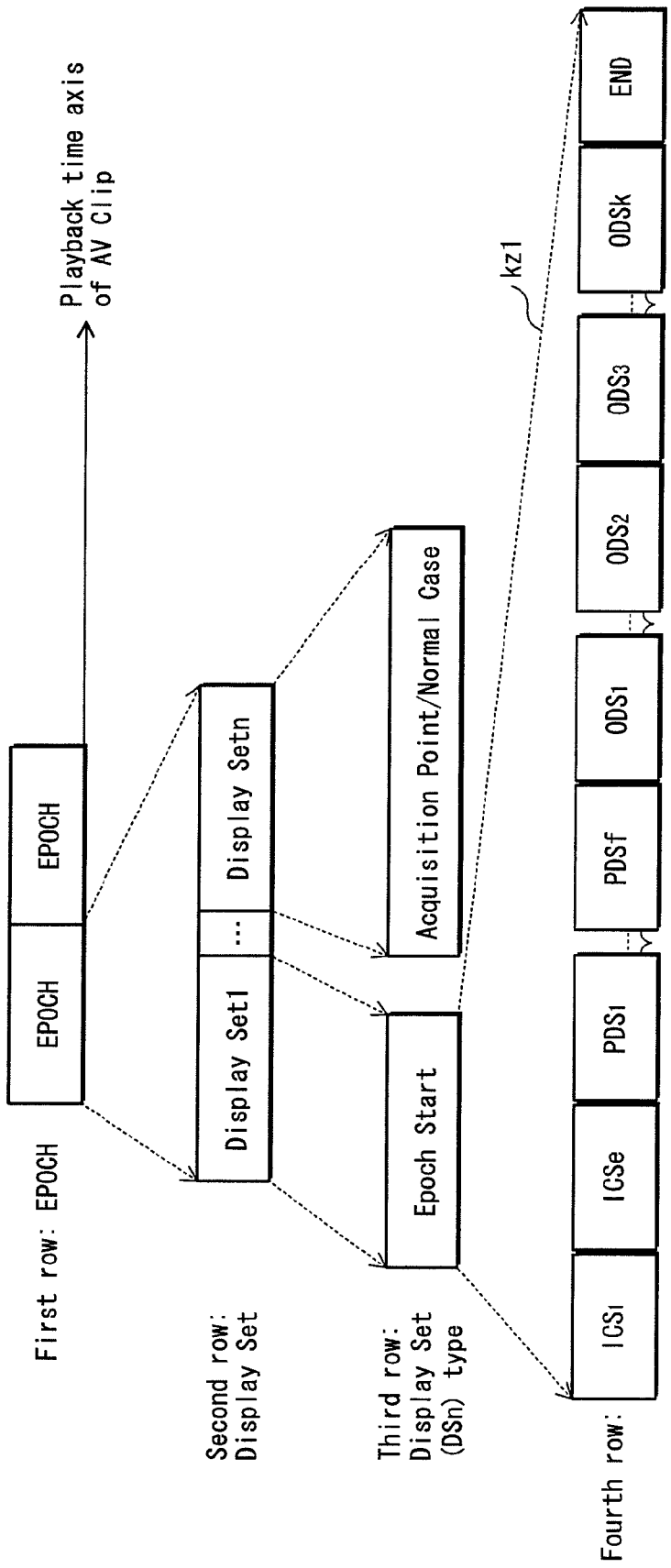
FIG. 39 shows a logical structure composed of a variety of types of functional segment.

FIG. 39 shows logical structures of various types of functional segments. The first row of FIG. 39 shows Epoch, the second row shows Display Set, the third row shows types of Display Set, and the fourth row shows functional segments belonging to a Display Set. There are also the types Epoch Start, Acquisition Point, and Normal Case, but these are the same as described in the case of PG.

The IG stream is characterized by control of behavior of the multi-page menu in accordance with progress, along the above-described playback time axis, of moving picture playback. The composition that allows this characteristic to be realized relates to an interactive_composition in the ICS. The following describes the internal structure of the interactive_composition.

Figure 40A:
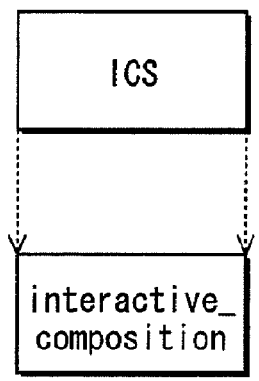
FIG. 40 shows correspondences between ICS and Interactive_composition.
Figure 40B:
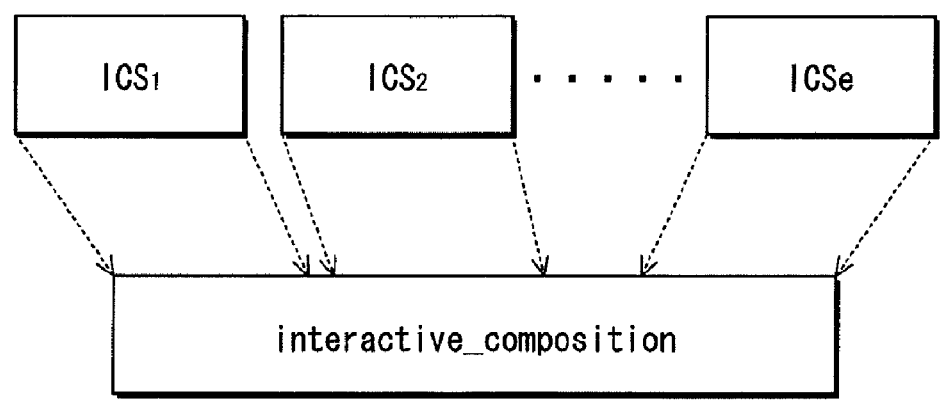

FIGS. 40A and 40B show the correspondence between the ICS and the interactive_composition. The relationship between the ICS and the interactive_composition is either a one-to-one correspondence of the type shown in FIG. 40A or a one-to-many correspondence of the type shown in FIG. 40B.

The relationship is a one-to-one correspondence when a data size of the interactive_composition is small enough to be stored in a single ICS.

The relationship is a one-to-many correspondence when a data size of the interactive_composition is large, and the interactive_composition is fragmented and stored by a plurality of ICS. Since the interactive_composition can be stored using a plurality of ICS, there is no limit to its data size, which may be increased to, say, 512 kMB, 1 MB, or more. A one-to-many correspondence is also possible between the ICS and the interactive_composition. However, for simplicity, the case where the ICS and the interactive_composition are in one-to-one correspondence is used in the following description.

Figure 41:
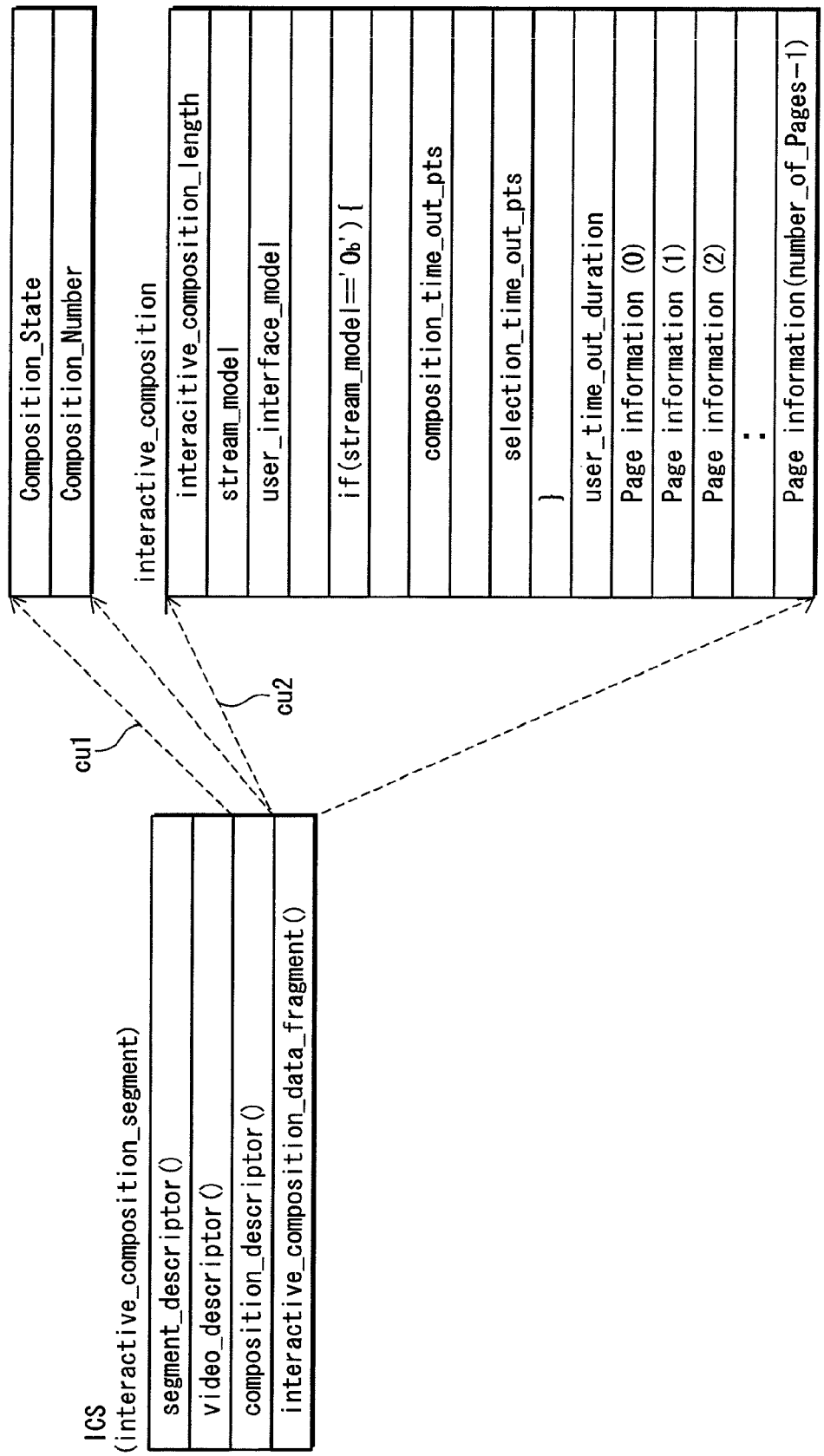
FIG. 41 shows an internal structure of ICS.

FIG. 41 shows a data structure of an ICS. Each ICS stores either an entire interactive_composition or a portion of an interactive_composition obtained by fragmentation. As shown in the left hand side of FIG. 41, the ICS includes a segment_descriptor to indicate that it is an ICS, horizontal and vertical pixel numbers to be used by the ICS, a video descriptor indicating a frame rate, a composition_descriptor, and an interactive_composition or a portion of an interactive_composition_data_fragment obtained by fragmentation.

The arrow cu1 in FIG. 41 points to a close-up of a data structure of the composition_descriptor. As indicated, the composition_descriptor includes a composition_state field that indicates whether a Display Set to which the ICS belongs is of the Normal Case-type, the Acquisition Point-type, the Epoch Start-type, or Effect_Sequence-type, and a composition_number indicating a count of screen combinations.

The arrow cut of FIG. 41 points to a close-up of a data structure of the interactive_composition. As indicated, the interactive_composition includes an interactive_composition_length_field, a stream_model_field, a user_interface_model_field, a composition_time_out_pts, a selection_time_out_pts, a user_time_out_duration, and pieces of page information (1) (2) ... (i) ... (number_of_page−1), each of which corresponds to a displayable page in the multi-page menu.

The interactive_composition_length field indicates the data length of the interactive_composition.

The stream_model field indicates a type of stream model the interactive_composition is using. The stream model indicates the format used to record the interactive_composition on the BD-ROM, and the manner in which the interactive_composition is to be managed by the composition buffer in the reproduction device. Specifically, the stream model indicates whether the graphics stream i) has been demultiplexed from an AV Clip and loaded in the composition buffer or ii) has been preloaded in the composition buffer as a SubClip.

The user_interface_model field indicates whether the user type of user interface assumed by the interactive_composition is an Always-on U/I or a Pop-up U/I. With an Always-on U/I a menu display/deletion occurs in accordance with playback progress of the AV Clip. With a Pop-up U/I, a menu display/deletion is triggered by a user operation.

The composition_time_out_pts indicates an end period (Epoch END) of the Epoch to which the ICS belongs. Since interactive control by means of the ICS becomes impossible at the end period, the time point indicated by the composition_time_out_pts indicates the end of interactive control.

The selection_time_out_pts indicates a time period allowed for a button in a selected state to automatically activate. More specifically, each button corresponds to an item selection on the multi-page menu, and the selection_time_out_pts specifies the time taken to alter the button to an active state upon selection.

The IF statement in FIG. 41 (if (Stream_model=='0b')) shows that the above-described composition_time_out_pts and selection_time_out_pts are information elements that appear only when the stream_model field=multiplexed. If the stream model is preloaded, neither the composition_time_out field nor the selection_time_out field are used.

The user_time_out_duration field indicates a period of time allowed before deletion for a page displayed in response to a user operation. In the case of the Always-on U/I, since only pages from the second page onwards are displayed in response to user operations, only these SubPages are deleted when the user_time_out duration has elapsed. After the SubPages are deleted, the first page is displayed. In the case of the Pop-up U/I, on the other hand, since the every page of the multi-page menu is displayed in response to a user operation, all pages are deleted when the user_time_out_duration has elapsed. The result is a state in which nothing is displayed (No Menu Display).

Figure 42:
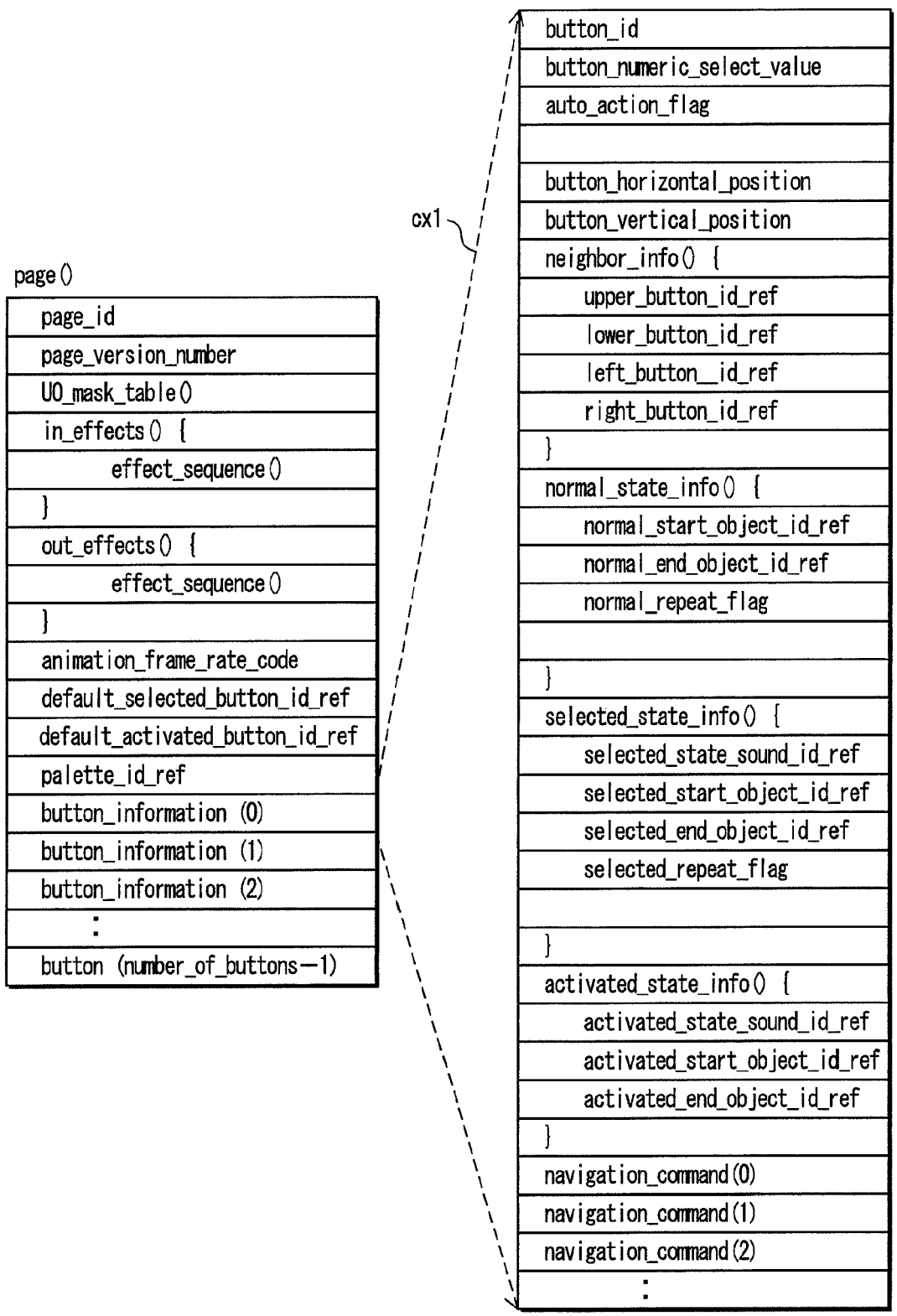
FIG. 42 shows an internal structure of page information for an arbitrary value (a number of pages x) among a plurality of pages.

FIG. 42 shows an internal structure of page information for a given page (page (x)) among a plurality of pages. As indicated on the left-hand side of FIG. 42, page information (x) includes a "page_id" that uniquely identifies page (x), a "page_version_number", a "UO_mask_table", an "in_effect" field, indicating a display result to be played back at the display start time of the page (x), an "out_effect" field indicating a display result to be played back at the display end time of the page (x), an "animation_frame_rate_code" in which a frame rate to be applied is written, a "default_selected_button_id_ref", a "default_selected_button_id_ref", a "default_activated_button_id_ref", a "pallet_id_ref", and a "button information (1) (2) . . . (number_of_buttons−1)" corresponding respectively to the plurality of buttons on the page (x).

The "UO_Mask_Table" field indicates whether to permit or not permit a user operation on the page (x). If this mask field is set to not permit, any user operation on the playback apparatus is invalidated.

The "default_selected_button_id_ref" field indicates, when display of page (x) begins, whether buttons whose default state is the selected state are determined interactively or passively. Specifically, when the field contains 0xff, the buttons whose default state is the selected state are determined interactively. In this case, settings values in the Player Status Register (PSR) in the reproduction device are preferentially interpreted, and the buttons indicated in the PSR are set to the selected state. When the field does not contain 0xff, the buttons whose default state is the selected state are determined statically. In this case, the button numbers specified in the default_select_button_id_ref field are written over the PSR, and the corresponding buttons are set to the selected state.

The "default_activated_button_id_ref" field indicates buttons automatically set in the active state when a time point indicated by the selection_time_out_pts is reached.

If the default_activated_button_id_ref field contains FF, the button in the selected state for the predetermined period is automatically selected. If the default_activated_button_id_ref field contains 00, the button in the selected state is not automatically selected. When the default_activated_button_id_ref field contains a value other than 00 or FF, the value is interpreted as a valid button number.

The "palette_id_ref" field indicates the ID of the palette to be set in the CLUT unit for the page(x).

The button information (button_info field) defines each button displayed on the page(x). The above-described fields specify each page in the multi-page menu. The following describes the internal structure of the button information. In the description, an arbitrary one of the buttons on the page (x) is denoted as a button (i). In FIG. 42, arrows cx1 indicate a close-up of the internal structure of the button_info(i).

Each button presented on the page has three states which area normal state, a selected state, and an activated state. When a button is in the normal state, the button is simply displayed. When a button is in the selected stated, the button is currently focused as a result of a user operation but not yet activated. When a button is in the activated state, the button has been activated. Since each button has these three states, the button_info (i) is provided with the following information.

The button_id field shows a value uniquely identifying the button(i) in the interactive_composition structure.

The button_numeric_select_value field shows a flag indicating whether the button(i) is numerically selectable.

The auto_action_flag field shows whether the button (i) is automatically activated. When the auto_action_flag field is set to ON (bit value of "1"), the button(i) is transferred not to the selected state but directly to the activated state when selected. On the other hand, when the auto_action_flag field is set to OFF (bit value of "0"), the button(i) is transferred not to the activated state but to the selected state when selected.

The button_horizontal_position field and button_vertical_position_field respectively specify the horizontal and vertical positions of the top left pixel of the button(i) on the interactive display.

The neighbor_info structure shows buttons to receive the selected state in response to user operations made to move a focus in an up, down, right, and left direction when the button (i) is in the selected state. The neighbor_info structure is composed of upper_button_id_ref, lower_button_id_ref, left_button_id_ref, and Right_button_id_ref fields.

The upper_button_id_ref field specifies the button number of a button to receive the selected state if a user operation instructing to move the focus in the up direction is made while the button(i) is in the selected state. The move up operation is executed at a push of a Move Up key of the remote controller. If this field is set to the same button number as that of the button(i), the user operation to the Move Up key is ignored.

Similarly, the lower_button_id_ref field, the left_button_id_ref field, the Right_button_id_ref field each specify the button numbers of a button to receive the selected state if a user operation instructing to move the focus to the down, left, or right direction is made, while the button(i) is in the selected state. The respective operations are executed at a push of the Move Down key, Move Left key, and Move Right key of the remote controller. If these fields are set to the same button number as that of the button (i), the user operations to the those keys are ignored.

The normal_state_info structure defines the normal state of the button(i), and is composed of the normal_start_object_id_ref, normal_end_object_id_ref, and normal_repeat_flag fields.

The normal_start_object_id_ref field specifies the first one of the object_id values that are serially assigned to a sequence of ODSs used to present the normal state of button(i) in animation.

The normal_end_object_id_ref field specifies the last one of the object_id values that are serially assigned to the sequence of ODSs used to present the normal state of button (i) in animation. If the normal_end_object_id_ref field specifies the same ID value as that of the normal_start_object_id_ref, the static image of a graphics object identified by that ID is presented as the button(i).

The normal_repeat_flag field specifies whether the animation of the button(i) in the normal state is to be continuously repeated.

The selected_state_info structure defines the selected state of the button(i). The selected_state_info structure is composed of the selected_state_sound_id_ref, selected_start_object_id_ref, selected_end_object_id_ref, and selected_repeat_flag fields.

The selected_state_sound_id_ref field specifies sound data to be reproduced as a click sound when the button(i) is put to the selected state. The sound data is specified by the sound_id of a piece of sound data contained in the file called sound.b-dmv. When this field is set to "0xFF", no sound data is associated with the selected state of the button(i) and thus no click sound is reproduced when the button(i) is changed to the selected state.

The selected_start_object_id_ref field specifies the first one of the object_id values that are serially assigned to a sequence of ODSs used to present the selected state of button (i) in animation.

The selected_end_object_id_ref field specifies the last one of the object_id values that are serially assigned to the sequence of ODSs used to present the normal state of button (i) in animation. If the selected_end_object_id_ref field specifies the same ID value as that of the selected_start_object_id_ref, the static image of a graphics object identified by the ID is presented as the button(i).

The selected_repeat_flag field specifies whether the animation of the button(i) in the selected state is to be continuously repeated. If the selected_start_object_id_ref and selected_end_object_id_ref fields have the same value, the selected_repeat_flag field is set to the value of "00".

The activated_state_info structure defines the activated state of the button(i), and is composed of the activated_state_sound_id_ref, activated_start_object_id_ref, and activated end object_id_ref fields.

The activated_state_sound_id_ref field specifies sound data to be reproduced as a click sound when the button (i) is put to the activated state. The sound data is specified by the sound_id of a piece of sound data contained in the sound.b-dmv file. When this field is set to "0xFF", no sound data is associated with the activated state of the button(i) and thus no click sound is reproduced when the button(i) is changed to the activated state.

The activated_start_object_id_ref field specifies the first one of the object_id values that are serially assigned to a sequence of ODSs used to present the activated state of button (i) in animation.

The activated end_object_id_ref field specifies the last one of the object_id values that are serially assigned to the sequence of ODSs used to present the activated state of button (i) in animation.

The "navigation_command" structure shows a navigation command to be executed when the button(i) is activated. A representative example of the navigation_command is a SetButtonPage command. The SetButtonPage command instructs the playback apparatus to display a desired page of the Multi-Page menu with a desired one of buttons on the page in the selected state. With the use of such navigation commands, content creators can readily describe page transitions at the time of authoring.

This completes the description of the internal structure of the button information.

Restrictions when Using the 2-Decoder Model

The following describes how the fields of the above-described functional segments are set for left view and right view, respectively, and this is basically the same as in the case of PG. That is to say, the type of DS and the composition_number in the left view IG stream are set with identical values as the type of DS and the composition_number in the corresponding right view IG stream.

Also, an identical value is set in the interactive composition segment in the left view DS and the interactive composition segment in the corresponding right view DS for the PTS of the PES packets that store these presentation composition segments.

Furthermore, identical content is set for correspondences between code value, luminance and color difference, for both the palette definition segment of the left view DS, and the palette definition segment of the corresponding right view DS, and the palette_id is also identical.

Figure 43:
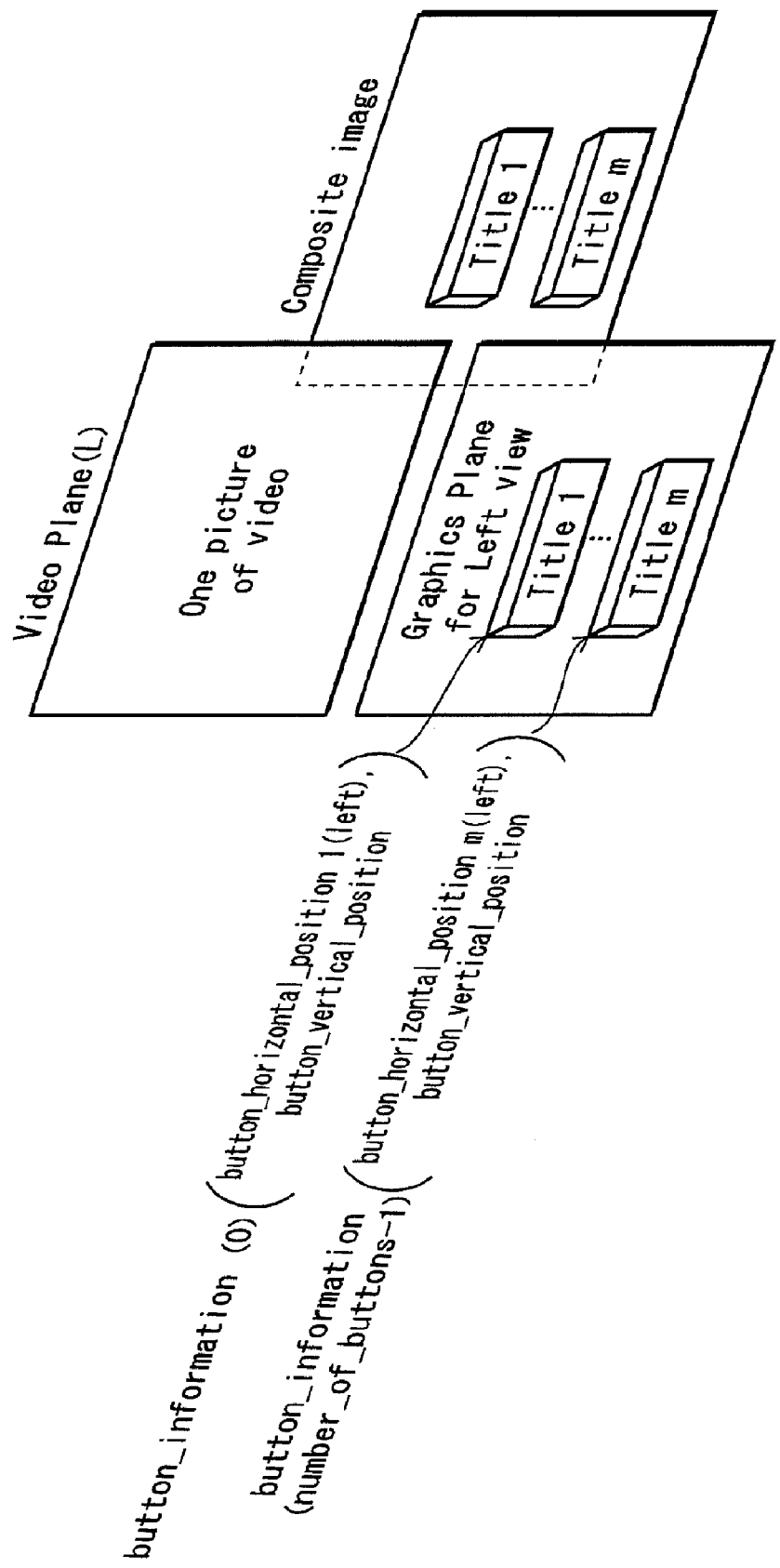
FIG. 43 shows a notation example of ICS belonging to a left view DS.
Figure 44:
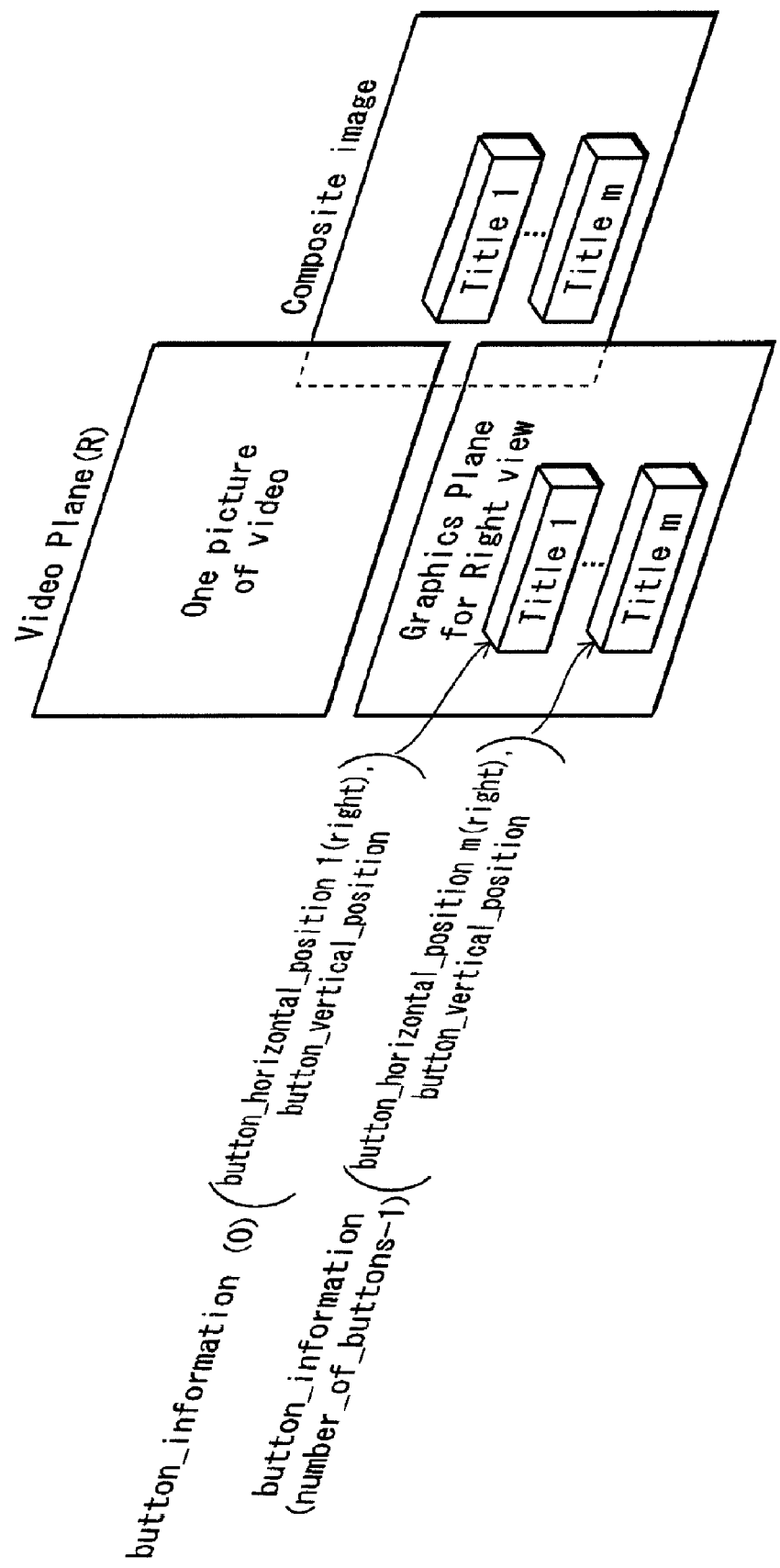
FIG. 44 shows a notation example of ICS belonging to a right view DS.

The following describes how fields other than those described above are written in ICS. FIGS. 43 and 44 show an example of writing ICS that belongs to a Display Set. FIGS. 43 and 44 show an example in which a plurality of buttons are written in a graphics plane.

FIG. 43 shows an example of an ICS belonging to a left-view DS. As shown in FIG. 43, a title 1 button defined by button information (0) is provided in a range which takes the button_horizontal_position 1 (left) and the button_vertical_position as a basepoint (top left) in the coordinate system of the graphics plane. Also, a title m button defined by button information (number_of_buttons−1) is provided in a range which takes the button_horizontal_position m (left) and the button_vertical_position as a basepoint (top left). In this way, the title buttons are written in the graphics plane. This causes the title button to be displayed as composited with the moving picture.

FIG. 44 shows an example of an ICS belonging to a right-view DS. As shown in FIG. 44, a title 1 button defined by button information (0) is provided in a range which takes the button_horizontal_position 1 (right) and the button_vertical_position as a basepoint (top left) in the coordinate system of the graphics plane. Also, a title m button defined by button information (number_of_buttons−1) is provided in a range which takes the button_horizontal_position m (right) and the button_vertical_position as a basepoint (top left). In this way, the graphics are written in the graphics plane. This causes the graphics to be displayed as composited with the moving picture.

Although the button_vertical_position is set with the same value as a basepoint in both the left view and the right view as described above, the button_horizontal_position is set with different values in the left view and the right view.

Also, the button_id is set with the same value in both the left view and the right view. The reason for this is that a playback apparatus that uses 2 decoders has a structure in which the two decoders are shared between the graphics controller. For this reason, unless the button_id is set with the same value as the graphics object of the DS corresponding to the left view and the right view, the graphics controller cannot distinguish which graphics objects correspond to each other.

The items other than the above in the button_information, namely the neighbor_info, the normal_state_info, the selected_state_info, the activated_state_info, and the navigation_command, identical content is used for both the left view and the right view.

Furthermore, in the DSs corresponding to the left view and the right view, identical values are set for the composition_time_out_pts, the selection_time_out_pts, and the user_time_out_duration.

Adding the above restrictions enables realizing stereoscopic view in a 2-decoder structure by a left view IG stream and a right view IG stream.

Playback Apparatus

Figure 45:
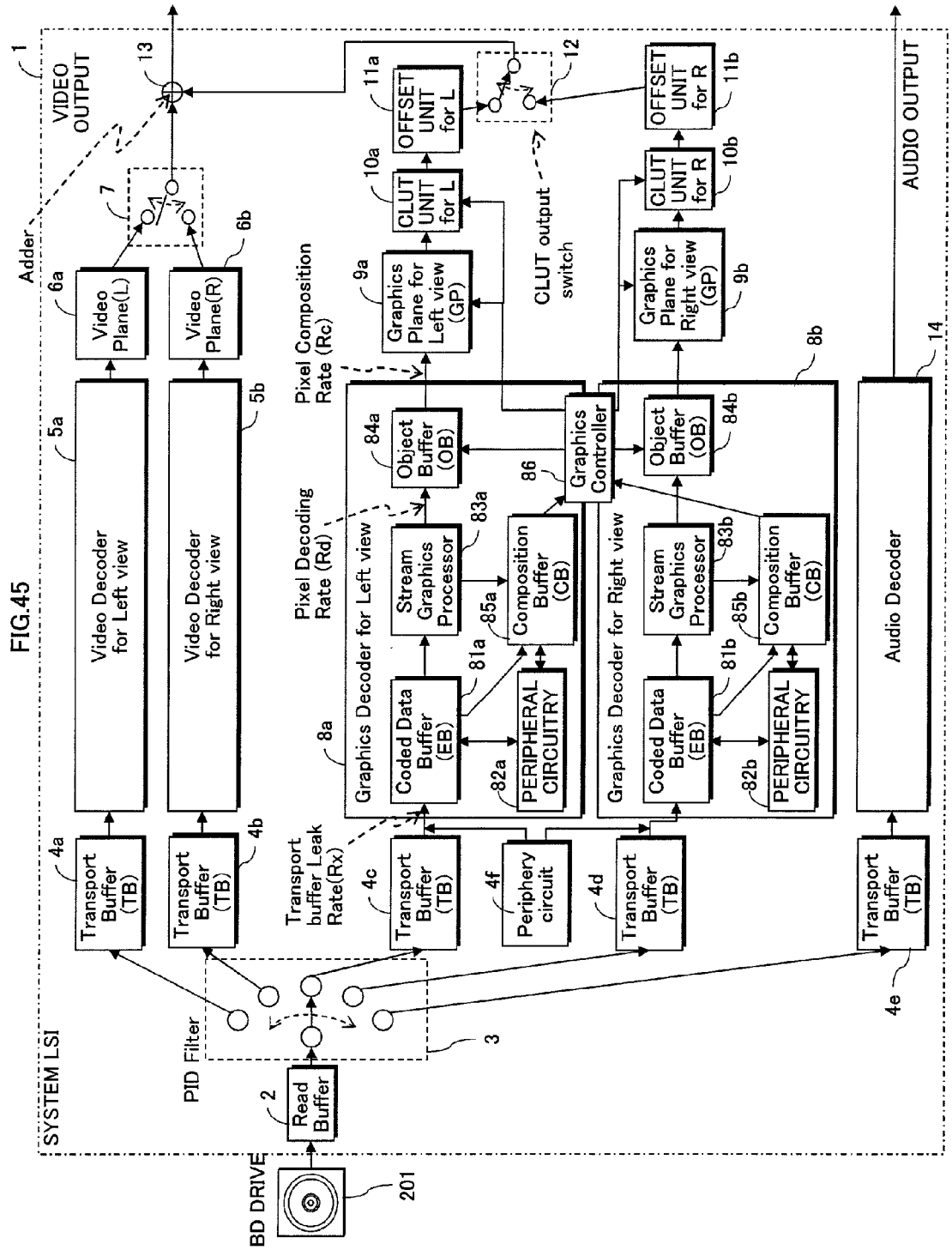
FIG. 45 shows an internal structure of the playback unit 1 in embodiment 2.

The following describes the details of the system LSI included in the playback apparatus of the present embodiment. FIG. 45 shows the internal structure of the system. LSI in the present embodiment. The basic structure is the same as FIG. 32. The difference from FIG. 32 is that the graphics controller 86 is shared between the left view graphics controller and the right view graphics controller. The following describes the reason for this. In the case of IG, the graphics decoder is expected to receive a notification of UO from a UO detection module. For this reason, when there are two graphics controllers, each receive a UO notification from the UO detection module. If this is done, since notifications of the UO from the UO detection module to the graphics controller can only be performed serially, a time difference occurs between the graphics controllers. As a result, when executing processing based on UO, there is a possibility of a malfunction occurring between the graphics controllers. For this reason, the graphics controller 86 is shared between the left view and the right view.

The graphics controller 86 that is shared between the left view and the right view decodes an ICS provided in a Composition Buffer 85a, performs control based on the ICS, decodes the ICS provided in the composition buffer 85b, and performs control based on the ICS.

Also, when notification of a UO is received from the UO detection module 212, the graphics controller 86 performs control corresponding to this UO on the Graphics Decoder for Left view and the Graphics Decoder for Right view, respectively.

In more detail, the Graphics Controller 86 performs drawing of graphics with reference to button information specified by the PSR 11 (current page information) from among the plurality of page information pieces in the ICS provided in the Composition Buffer 85a. This drawing is performed by reading graphics specified by the normal_start_object_id and normal_end_object_id of the normal_state_info from the Object Buffer 84a, in the button information pieces in the current page information, and writing the graphics to the Graphics Plane for Left view 9a. Among the button information of the current page information, the information specified by the PSR 10 is the graphics specified by the selected_start_object_id and the selected_end_object_id of the selected_state_info that is read from the Object Buffer 84a, and is written to the Graphics Plane for Left view 9a. According to the drawing, the pages arranged from the title 1 button to the title m button appear in the Graphics Plane for Left view 9a, and are composited with the moving picture. The right view is also similar.

According to the embodiment as described above, in the DS that correlates the left view IG stream and the right view IG stream, since the composition_state is set with identical content, by providing these DSs at points likely to be chosen as playback start points, similarly to the case of PS, enables ensuring the stereoscopic view of graphics during random access.

Also, by causing graphics controller in the playback apparatus to be shared between the left view and the right view, when compared to a case of using a 2-controller structure, enables reducing the scale of hardware, and realizing a reduced cost of the apparatus.

Supplementary Remarks

Although this completes the description of the best embodiment of the present invention known to the applicant at the time of filing the present application, of course, the present invention is not limited to the above embodiment.

(1) The playback apparatus 200 may further include a local storage. The local storage includes a built-in medium and a removable medium and is used for storing data, such as downloaded additional content and data that is used by applications. The storage area for additional contents is divided specifically for individual BD-ROMs, and the storage area for storing data used by applications is divided specifically for individual applications. Merge management information specifying rules for merging a downloaded additional content with data on a BD-ROM is also stored in the built-in medium or the removable medium.

The built-in medium is, for example, a writable recording medium such as a hard disk drive or a memory built into the playback apparatus.

The removable medium is, for example, a portable recording medium, and preferably is a portable semiconductor memory card such as an SD card.

The following description is given by way of an example in which the removable medium is a semiconductor memory card. The playback apparatus includes a slot (not depicted) for inserting the removable medium, and an interface (for example a memory card I/F) for reading the removable medium inserted in the slot. When the semiconductor memory card is inserted in the slot, the removable medium is electrically connected to the playback apparatus, and with use of an interface (for example, the memory card I/F), the data recorded on the semiconductor memory card can be converted to electrical signals and read.

When the playback apparatus 200 includes a local storage, a virtual file system may further be included. The virtual file system creates a virtual BD-ROM (virtual package) by merging an additional content stored on the local storage with a content residing on the BD-ROM, based on merge management information downloaded with the additional content to the local storage 113 together. The command interpreter, which is an executing entity in the HDMV mode and the BD-J platform, which is an executing entity in the BD-J mode can make reference to the virtual package in the same manner as the original BD-ROM. During playback of the virtual package, the playback apparatus is enabled to execute playback control, by using data on the BD-ROM and data on the local storage.

Also, the playback apparatus 200 may further include a network interface. A network interface is for performing communication with an communication with a device that is external to the playback apparatus. The network interface is capable of accessing a server connected to the network using the Internet, and accessing a server connected by a local network. For example, the network interface can be used to download additional BD-ROM content made available on the Internet, and playing back content using a network function by performing data communication with a server specified by the content on the Internet. BD-ROM additional content refers to content that is not included on an original BD-ROM, and for example includes additional dubbed audio, subtitles, special features, applications, etc. It is possible to control the network interface from the BD-J platform, and it is possible to download, to the local storage, additional content made available on the Internet.

(2) There are cases in which the left view and the right view PG streams are obtained by downloading the streams as additional content. In this case, in one AV clip, there are cases in which only left view and right view PG streams exist. The restriction in such a case is described below.

Figure 46:
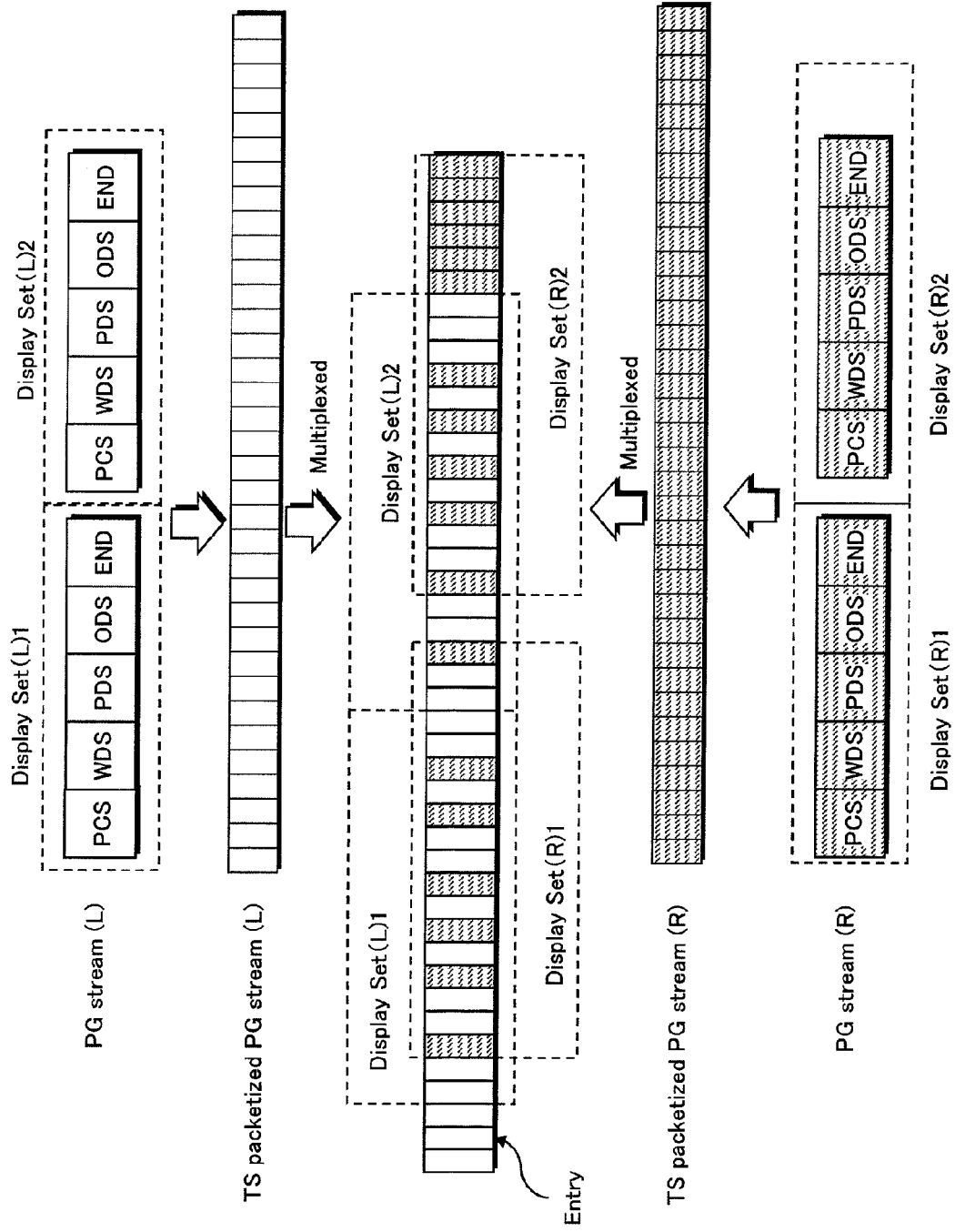
FIG. 46 pertains to a restriction of multiplexing order of a left view PG stream and a right view PG stream.

FIG. 46 is a pattern diagram showing multiplexing of a PG stream (L) and a PG stream (R). Here, the top row shows a structural example of the PG stream (L), and here is composed of two DSs, namely a Display Set (L) 1 and a Display Set (L) 2.

The second row from the top shows how a PG stream (L) has been TS packetized.

The bottom row shows a structural example of a PG stream (R), and here is composed of two DSs, namely a Display Set (R) 1 and a Display Set (R) 2.

The second row from the bottom shows how a PG stream (R) has been TS packetized.

Here, a pair of DSs made up of a left view and a right view is necessary for 3D display. In FIG. 46, the Display Set (L) 1 and the Display Set (R) 1 form a pair, the Display Set (L) 2 and the Display Set (R) 2 form a pair, and these pairs are used for 3D display. When multiplexing, the left view DS and the right view DS that form a pair are arranged, as shown in FIG. 46, so that the left view DS is always first in the stream. That is to say, the left view DS is provided with a smaller TS packet number. In addition, the entry table is set for the left view stream. Accordingly, even during interrupt playback, since the right view DS can be decoded immediately after the left view DS, the left view DS and the right view DS can always be decoded as a pair. Therefore, a situation can be avoided in which only one of the pair can be decoded, and the other one cannot be decoded.

Also, the positions of entries to be used for interrupt playback and special playback are written in FIG. 46, and by providing both DSs in the pair of left view and right view farther back than the TS packet that is indicated by the entry, even when performing interrupt playback based on the entry, the paired left view and right view DSs are correctly displayed.

Note that although an example is described of providing the DSs as a pair after the entry, both DSs may be provided in front of the entry. In this case, when performing interrupt playback based on the entry, since both paired DSs cannot be decoded, it is possible to prevent a case in which only one only one of the left view and the right view are displayed, and thus to reduce discomfort in the viewer.

Figure 47:
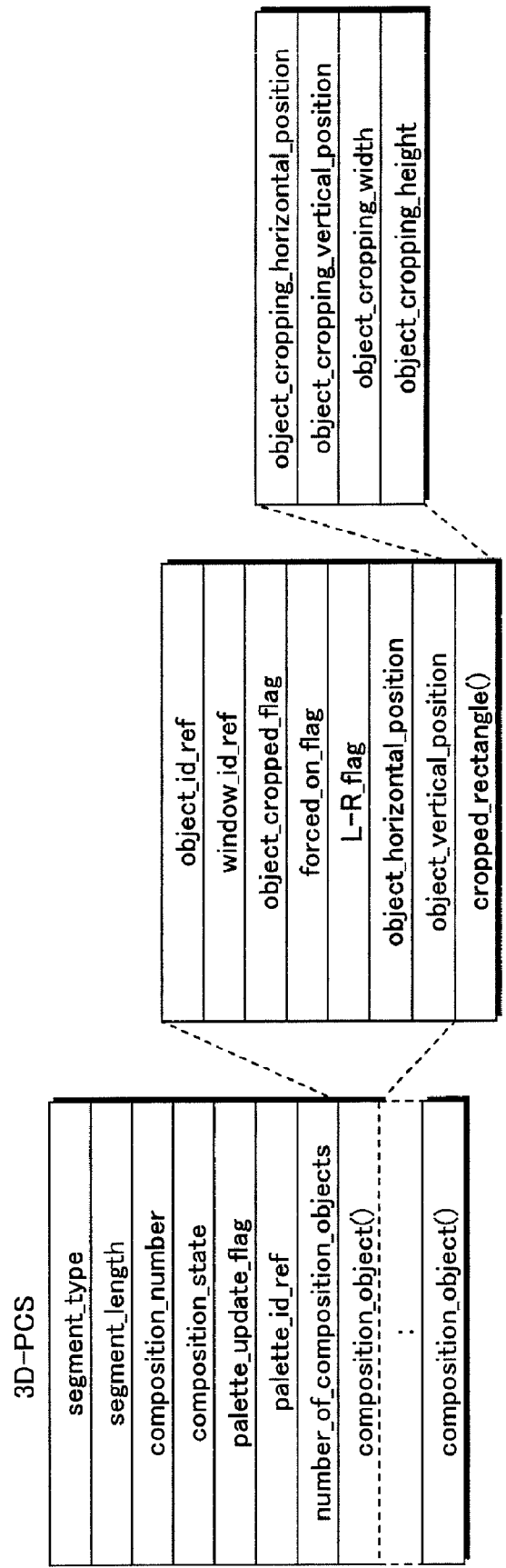
FIG. 47 shows a variation of a PCS data structure.

(3) Although a case is described in the above embodiments of preparing separate PG streams for left view and right view, here, a first method is described of adapting one PG stream to 3D display. FIG. 47 shows a data structure of 3D-PCS. The difference between the PCS depicted in FIG. 14 and the 3D-PCS is in the field indicated by composition_object( ) and an L_R_flag has been added to indicate whether the object is for the left eye or the right eye. For example, when a composition_object( ) indicates that the object is for the left eye, the L_R_flag is set to 0, and when the composition_object( ) indicates that the object is for the right eye, the L_R_flag is set to 1.

Normally when a PG is displayed in 3D, an Object for the left eye and the Object for the right eye must be a pair. In other words, the value of the number_of_composition in the 3D-PCS must necessarily be an even number, and there must be the same number of composition object ( ) for the left eye and composition object ( ) for the right eye.

Also, when the 3D-PCS as a functional segment is multiplexed (including a 2D PCS), as shown in FIG. 48A, the 3D-PCS is provided in a position ahead of the 2D PCS in the stream. In other words, the 3D-PCS is provided with a smaller TS packet number than the 2D PCS, and accordingly, since a 3D-compliant playback apparatus can find the 3D-PCS first, the 3D-compliant playback apparatus can skip over the 2D PCS that is not necessary for 3D display.

Also, the 3D-ODS labeled as such in the drawing indicates an ODS including an Object that can only be referenced from 3D-PCS. Setting different values for the segment_type of the 3D-ODS and the segment_type of the ODS enables reducing the decoding load in a playback apparatus that is not 3D compatible, since the 3D-ODS can be skipped over. Furthermore, when an Object is referenced by both a 2D PCS and a 3D-PCS, defining it as ODS instead of 3D-ODS enables the Object to be shared between 2D and 3D.

Also, for example, when there are a plurality of composition_objects in the 3D-PCS, corresponding right eye composition_objects ( ) may be arranged to follow the left eye composition_objects ( ) Successively arranging such L and R composition_object pairs has the benefit of enabling easily verifying that the forced_on_flags of respective L and R composition_objects ( ) are the same. Also, restricting the order of arranging L and R in this way, since L-R flags that indicate whether the composition_objects ( ) are L or R can be deleted, enables using exactly the same data structure as the 2D PCS that already exists, and interpreting the 3D-PCS with the 2D PCS interpretation program nearly unchanged.

The following describes a second method for making one PG subtitle stream 3D compatible. The difference from FIG. 48a is that the left eye 3D-PCS (3D-PCS(L)) and the right eye 3D-PCS (3D-PCS (R)) are prepared separately as a 3D-PCS (L) and a 3D-PCS (R) (see FIG. 48B). A benefit of thus separating the left eye 3D-PCS and the right eye 3D-PCS in advance is described next. For 3D-PCSs that include information for both L and R as described above, it is necessary to set a new flag (L_R_flag) for indicating whether the Object to be referenced is for the left eye or for the right eye. Also, when a flag is not provided, it is necessary to provide arrangement restrictions such as specifying that an odd-numbered composition_object ( ) is for L and an even numbered composition_object ( ) is for R. In other words, when decoding the 3D-PCS, it is necessary to change the program that interprets the 2D PCS so that a new field called L_R_flag can be read, or to perform processing so that odd-numbered composition_objects ( ) and even-numbered composition_objects ( ) can be treated respectively as L and R.

On the other hand, since separating the segments as 3D-PCS (L) and 3D-PCS (R) and performing transmission enables the structures of 3D-PCS (L) and 3D-PCS (R) to be the same as the structure of the 2D PCS, the same program can be used as the program used to interpret the 2D PCS. In this case, since the decoder distinguishes between the 3D PCSs (3D-PCS (L) and 3D-PCS (R)) and the 2D PCS, the respective segment_types may be set differently. For example, if the segment_type of a normal 2D PCS is set as 0x00, the value of the 3D-PCS (L) segment_type is set as 0x01, and the value of the 3D-PCS (R) segment_type is set as 0x02. Alternatively, by determining the arrangement of the 3D-PCS (L) and the 3D-PCS (R) in advance so that the TS packet number of the 3D-pCS (L) is smaller, enables distinguishing between 2D PCSs and 3D-PCSs even when the segment_types of both the 3D-PCS (L) and the 3D-PCS (R) are set to 0x01.

Also, regarding the PCS arrangement of the 3D-PCS (L), the 3D-PCS (R), and the 2D PCS, providing the 3D-PCS (L) and the 3D-PCS (R) first, and providing the 2D PCS thereafter, enables reducing the decoding load, since if the 3D-PCS is found first in a 3D-compatible playback apparatus, the 2D PCS found next can be skipped over.

(4) Although in the above embodiment, both the DSs corresponding to left view and right view are set with an equal value of composition_number, a new field (for example, L_R_Pairing_number) may be provided, and this field may be set with an equal value in both the corresponding DSs.

(5) Although in the above embodiment, the left view PG stream references the object in the left view PG stream, and the right view PG stream references the object in the right view PG stream, for example, the right view PG stream may be configured to reference the object of the left view PG stream. Configuring the left and right PG streams to reference each other's objects has the advantage that there is no need to transmit the same object to right and left, thus enabling conserving bandwidth necessary for transmission.

(6) Although in the above embodiment, the liquid crystal shutter goggles 104 are composed of a pair of liquid crystal shutters and a control unit and present stereoscopic view to the user with the use of the parallax between the user's eyes, the present invention is not limited to this. For example, there are glasses on the market that realize stereoscopic view by using a polarization filter instead of liquid crystal, and glasses using this type of mechanism may also be used.

(7) Although in the above embodiment, the description is premised on the method of causing stereoscopic viewing with use of the liquid crystal goggles 104, another method may also be used for showing a left view image and a right view image to the left eye and the right eye, respectively. For example, a method that does not use special viewing equipment such as glasses, that uses a side-by-side method, or a display such as a lenticular lens, may be used.

Furthermore, regarding the following technological topics, further improvements and modifications may be added. Whether to implement the embodiments in the manner described, or to use any of the improvements/modifications, is at the arbitrary discretion of the one implementing the invention.

Implementation as Recording Apparatus

When the playback apparatus 200 includes a local storage and a removable medium drive, since it is assumed in this structure that the writing will be performed to the built-in medium drive and the removable medium, the playback apparatus described in the present specification can be said to have a dual function as a recording apparatus. When the playback apparatus 200 functions as a recording apparatus, the writing of management objects is performed according to the following two modes.

i) When the playback apparatus 200 has a function of executing playback of a virtual package, the BD-J object is written as follows. That is, when the BD-ROM is inserted, according to a request from an application, additional content corresponding to the BD-ROM is acquired from a WWW server via a network. The acquired additional content includes the BD-J object in which the GUI management table is written. The "GUI management table" is a management table used when an application in operation performs GUI, and includes a resolution to use when executing GUI display, font data to use for the GUI, and a mask flag that specifies, when a user performs a menu call or a title call on the GUI, whether to mask such calls.

In the playback apparatus 200, a control unit that performs recording control writes the acquired BD-J object to the local storage according to a request from the application. By doing this, the contents recorded on the BD-ROM are combined with the additional contents recorded in the local storage to constitute the virtual package.

Here, the BD-ROM has recorded thereon an identifier of a disk root certificate, an identifier of an organization to which BD-ROM contents have been distributed, and a identifier of the BD-ROM. An area in which the additional contents are to be stored is specified by a file path including the disk root certificate identifier, the organization identifier, and the BD-ROM identifier.

The application performs the writing by passing to the control unit the file path that specifies the area in which the additional content is to be stored.

When the local storage has a file system with restrictions on the names of directories and files to be 255 characters or less, the file path used for writing to the local storage includes file names and extensions in a 8.3-format file system in which a directory name is limited to 8 characters or less and a file name as well as an extension name is limited to three characters or less.

ii) When the playback apparatus 200 supports the function of receiving an on-demand manufacturing service or an electronic sell-through service (MODEST), the BD-J object is written in the following manner.

When the playback apparatus 200 receives the BD-J object supplied via the on-demand manufacturing service or the electronic sell-through service, a default directory and a MODEST directory are created below the root directory of the removable medium, and a BDMV directory is crated below the MODEST directory. The MODEST directory is a first MODEST directory, which is the MODEST directory that is created when the service is received for the first time. At the time of receiving the service for the second time onward, the control unit of the playback apparatus 200 creates another MODEST directory corresponding to each service.

As described above, upon acquiring the BD-J object in which the GUI management table is written, the control unit writes a start-up program to the default directory, and writes the BD-J object to the BDMV directory below the MODEST directory. This start-up program is a first program to be executed when the recording medium is loaded in the recording apparatus 200. The start-up program causes the playback apparatus 200 to display a menu allowing a user to make an operation for selecting a BDMV directory. In response to such a user operation, the playback apparatus 102 executes a root change function. In response to a user operation made on the menu, the root change function causes the playback apparatus to recognize as the root directory the MODEST directory to which the selected BDMV directory belongs. The root change function enables executing playback control, by the same control procedure as playing back the BD-ROM, based on the acquired BD-J object.

Java™ Application

The BD-J application may be, for example, an Electronic Commerce (EC) client application, or may be an online game played against opponents on the Internet. Furthermore, by working together with a search engine, various online services can be provided to the user.

Units Incorporating the GUI Management Table

The GUI management table may be provided in a BD-J object. Also, the GUI management table may be configured so that PlayList information and PlayItem information are in correspondence. At a timing when a current PlayList becomes a specified PlayList or a current PlayItem becomes a specified PlayItem, after releasing the plane memory, a plane memory may be reserved for stereoscopic playback or a plane memory may be reserved for monoscopic playback. By doing this, the area management of the memory device is performed with greater time precision.

Video Streams for Stereoscopic View

In the above description, a pair of left- and right-view video streams are recorded on a BD-ROM but this is only one example. An EnhancedView video stream recorded on a BD-ROM may be a video stream with information indicating the depth value of per pixel for each of a plurality of pictures and playback of such a video stream is executed.

Packages to be Implemented

When implementing a playback apparatus, the following BD-J Extensions are preferably implemented in the playback apparatus. The BD-J Extensions include various packages that have been specialized for providing functions exceeding GEM [1.0.2] to a Java™ format. Packages to which BD-J Extensions are provided are as follows.

org.bluray.media

This package provides specialized functions to be added to the Java™ Media FrameWork. Control for angles, audio, and subtitle selection are added to the package.

org.bluray.ti

This package includes a structure for referring to an API for operating by mapping "services" to "titles" according to GEM [1.0.2] and referring to title information from a BD-ROM, and a structure for selecting a new title.

org.bluray.application

This package includes an API for managing the life cycles of applications. Also, this package includes an API for referring to necessary information for signaling when executing applications.

org.bluray.ui

This package includes a class that defines constant numbers for key events specialized in the BD-ROM, and realizes synchronization with the video playback.

org.bluray.vfs

This package provides a binding scheme for binding contents that are recorded on the BD-ROM (on-disk contents) and contents in the Local Storage that are not recorded on the BD-ROM (off-disk contents), so that seamless playback of the contents are enabled regardless of the location of the contents.

The Binding Scheme associates contents residing on the BD-ROM (AV clips, subtitles, BD-J applications) with related contents residing on the Local Storage. This Binding Scheme realizes seamless playback regardless of the location of the contents.

Application Range of Programming Language

It is described in the above embodiment that Java™ language is used as the programming language for the virtual machine. However, the programming language is not limited to Java™, and other programming languages, such as B-Shell, Perl Script, and ECMA Script, which are used in UNIX™ OS and the like, may also be used.

Changing to Multidrive

The above-described embodiment describes a BD-ROM as an example of a recording medium, and a BD-ROM drive as an example of a specific device having a function of reading data from the BD-ROM. However, a BD-ROM is merely one example, and it is also possible to perform the operations described in the above embodiment when an optical disk medium such as BD-R, BD-RE, DVD, or CD is used as the recording medium, data having the above-described data structure is stored on such recording medium, and there is a drive device capable of reading such recording medium.

The recording media of the embodiments include all types of package media such as optical disks, semi-conductor memory cards, etc. The recording media of the above embodiment is described by way of an example related to an optical disk (for example, an existing read-only optical disk such as a BD-ROM or a DVD-ROM). However, the present invention is not limited to this. For example, it is possible that a terminal device having a function of writing 3D contents (for example, the function may be included in the playback apparatus, or may be included in an apparatus other than the playback apparatus) writes 3D contents, including data that is necessary for implementing the present invention and has been broadcast or distributed over a network, on a writable optical disk (for example, an existing writable optical disk such as BD-RE or DVD-RAM). The present invention may be implanted by executing playback of such a recording medium by the playback apparatus according to the present invention.

Also, it is possible to implement the present invention when the recording medium is, besides an optical disk, for example, a removable medium such as an SD memory card (semiconductor memory card).

When a semiconductor memory is used instead of a BD-ROM, a structure may be used in which data is transferred to the read buffer 2, the heap memory 207, the interactive scenario memory 209, and the static memory 205, via an interface for reading data stored in the semiconductor memory card.

More specifically, the following structure may be used. That is, when a semiconductor memory card is inserted in a slot (not depicted) in the playback apparatus 200, the playback apparatus 200 and the semiconductor memory card are electrically connected via the memory card I/F. The data recorded on the semiconductor memory card may be transferred via the memory card I/F, to the read buffer 2, the heap memory 207, the interactive scenario memory 209, and the static scenario memory 205.

The following describes the mechanism of copyright protection of data stored on the BD-ROM. From a standpoint, for example, of improving the confidentiality of data and copyright protection, there are cases in which portions of the data recorded on the BD-ROM are encoded as necessary.

For example, among the data recorded on the BD-ROM, encryption may be applied to data corresponding to a video stream, data corresponding to an audio stream, and/or data corresponding to a stream that includes both video and audio.

The following describes decrypting encoded data that is among the data recorded on the BD-ROM.

Data corresponding to a key necessary for decrypting encoded data on the BD-ROM (for example, a device key) is stored in advance in the playback apparatus.

On the other hand, the BD-ROM has recorded thereon data corresponding to the key necessary for decrypting encoded data (for example, an MKB (media key block) corresponding to the device key), and data that is the key for deciphering encoded data, that is itself encoded (for example an encoded title key corresponding to the device key and the MKB), is recorded. Here, the device key, the MKB, and the encoded title key correspond to each other, and furthermore correspond to an identifier (for example, a volume ID) written in an area that cannot be normally copied on the BD-ROM (an area called BCA). If this combination is not correct, the code cannot be deciphered. Only if the combination is correct, the key necessary for deciphering the code (for example, a decoded title key obtained by decoding the encoded title key based on the device key, the MKB and volume key, can be elicited, and with use of the key necessary for the encoding, the encoded data can be deciphered.

When the inserted BD-ROM is played back in the playback apparatus, encoded data cannot be played back unless the BD-ROM includes a device key that is paired with a title key or MKB (or corresponds to a title key or MKB). The reason is that the key necessary for deciphering the encoded data (the title key) is itself encoded when recorded on the BD-ROM (as an encoded title key), and if the combination of the MKB and the device key is not correct, the key necessary for deciphering the code cannot be elicited.

On the other hand, the playback apparatus is configured so that, if the combination of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

Although the above description pertains to the mechanism of copyright protection of data stored on a BD-ROM, the recording medium is not limited to being a BD-ROM, and the present invention can be implemented even when using, for example, a readable/writable semiconductor memory (for example, a semiconductor memory card having a nonvolatile property such as an SD card).

For example, the playback apparatus may be configured to record data corresponding to data recorded on the BD-ROM on a memory card with use of digital distribution, and to playback the data from the semiconductor memory card. When distributing the necessary data with use of digital distribution and recording the distributed data, it is preferable to distribute the data after having performed partial or entire decoding of the distributed data as necessary, and leaving data that is necessary for the semiconductor memory card in an encoded state.

The following describes operation using digital distribution, for recording data (distributed data) corresponding to the data described in the above embodiments on the semiconductor memory.

The operations described above may be configured to be performed by the playback apparatus described in the embodiments, or by a terminal apparatus dedicated to recording distributed data on a semiconductor memory that is separate from the playback apparatus in the embodiments. Here, an example of the playback apparatus performing the operations is described. Also, an SD card is described as an example of the recording destination.

When recording distributed data to the SD memory card inserted in the slot of the playback apparatus, first, transmission is requested of the distributed data to a distribution server (not depicted) that accumulates the distributed data. The playback apparatus reads, from the SD memory card, information for uniquely identifying the SD memory card that is inserted at the playback apparatus at this time (for example, a specific identification number assigned individually to the particular SD memory card, more specifically, a serial number of the SD memory card, etc.), and transmits the read identification information to the distribution server along with the distribution request.

This identification information for uniquely identifying the SD memory card corresponds to, for example, the above-described volume ID.

Meanwhile, in the distribution server, decoding is performed so that necessary data among the data that is distributed (video streams, audio streams, etc.) can be deciphered with use of the key that is necessary for deciphering the code (for example, the title key), and the necessary data is stored in the server.

For example, a private key is stored in the distribution server, and the distribution server is configured so that different public keys are interactively created to correspond respectively to the semiconductor memory card-specific identification numbers.

Also, the distribution server is configured so that encoding is possible towards the key that is necessary for deciphering the encoded data itself (the title key) (in other words, configured so that an encoded title key can be generated).

The generated public key information includes information corresponding to the above-described MKB, volume ID, and encoded title key. If the combination of, for example, the semiconductor memory card-specific identification number, the actual public key included in the public key information described later, and the device key recorded in advance in the recording apparatus, is correct, the key necessary for deciphering the code (for example, the title key obtained by decoding the encoded title key based on, for example, the device key, the MKB, and the semiconductor memory card-specific identification number) is acquired, and with use of this acquired key (title key) necessary for deciphering the code, decoding of the encoded data can be performed.

Next, the playback apparatus records the received public key information and distributed data in the recording area of the semiconductor memory card inserted in the slot.

Next, the following describes an exemplary method for decoding and playing back encoded data, from among the data included in the public key information recorded in the recording area of the semiconductor memory card and the data included in the distribution data.

The received public key information is, for example, recorded on a device list indicating the public key itself (for example, the MKB and the encoded title key), signature information, the semiconductor memory card-specific identification number, and information pertaining to a device to be invalidated.

The signature information includes, for example, hash values of the public key information.

In the device list, information is recorded pertaining to, for example, an apparatus that is possibly performing unauthorized playback. This is for example a device key, an identification number of the playback apparatus, or an identification number of a decoder in the playback apparatus recorded in advance on the playback apparatus, information for uniquely specifying the device, a part included in the apparatus, or a function (program) of the apparatus possibly performing unauthorized playback.

The following description pertains to playback of encoded data from among the distribution data recorded in the recording area of the semiconductor memory card.

First, a check is performed pertaining to whether the encoded key itself may be operated before decoding the encoded data with use of the public key itself.

Specifically, the following checks are performed:

(1) whether there is a match between the semiconductor memory identification information included in the public key information and the specific identification number stored in advance on the semiconductor memory card, (2) whether there is a match between a hash value of the public key information calculated in the playback apparatus, and a hash value included in the signature information, and (3) whether, based on information indicated in the device list included in the public key information, the playback apparatus performing playback is possibly performing unauthorized playback (for example, by checking whether the device key included in the device list matches the device key stored in the playback apparatus in advance). These checks may be performed in any order.

Control is performed so that the playback apparatus does not decode the encoded data if any of the following is satisfied, in the above-described checks 1 to 3: i) the semiconductor memory-specific identification information included in the public key information does not match the specific identification number stored in advance on the semiconductor memory card, ii) the hash value of the public key information calculated in the playback apparatus does not match the hash value included in the signature information, or iii) a judgment is made that the playback apparatus performing the playback is possibly performing unauthorized playback.

Also, a judgment is made that the combination of the semiconductor memory-specific identification number, the public key included in the public key information, and the device key recorded in advance in the playback apparatus, is correct if i) the semiconductor memory card-specific identification information included in the public key information matches the specific identification number saved on the semiconductor memory card in advance, (ii), the hash value of the public key information calculated in the playback apparatus matches the hash value included in the signature information, and (iii) a judgment is made that the playback apparatus is not possibly performing unauthorized playback. When the combination is judged to be correct, the encoded data is deciphered with use of the key necessary for deciphering the code (based on a device key, the MKB and the semiconductor memory-specific identification number).

For example, when the encoded data is a video stream and an audio stream, the video decoder decodes (decodes) the video stream with use of the key necessary for deciphering the code (the title key obtained by decoding the encoded title key), and the audio decoder decodes (decodes) the audio stream with use of the key necessary for deciphering the code.

According to this type of structure, for any playback apparatus, parts, function (program), etc. that is possibly performing unauthorized use at the time of electronic distribution, information for the identification of such is provided to the device list, and if distribution is attempted, since playback decoding with use of public key information (the public key) can be suppressed on the playback apparatus side if information is included that is indicated in the device list, even if the combination of the semiconductor memory-specific identification number, the public key included in the public key information, and the device key recorded in the playback apparatus in advance, is correct, since control can be performed so that the deciphering of the encoded data is not performed, use of distributed data on an unauthorized device can be suppressed.

Also, it is preferable to use a structure in which the semiconductor memory card-specific identifier recorded in advance on the semiconductor memory card is stored in a highly confidential recording area. The reason is that when the specific number recorded on the semiconductor memory card (for example, in the example of an SD memory card, the SD memory card serial number, etc.) has been altered, illegal copying is facilitated. The reason is that different specific identification numbers are allocated to different semiconductor memory cards, but if the specific identification numbers are altered to be the same, the judgment in (1) becomes meaningless, and there is a possibility of illegal copying, corresponding to the number that was altered, being performed.

Accordingly, it is preferable for the information that is the semiconductor memory card-specific identification number to be recorded in a high-confidentiality recording area.

To realize this type of structure, for example by providing a recording area (called a second recording area) that is separate from the recording area (called a first recording area) that stores normal data as recording areas for recording high-confidentiality data that is semiconductor memory card-specific identifiers), and providing a control circuit for accessing the recording area, access to the second recording area can be made only via the control circuit.

For example, the data recorded in the second recording area has been encoded and recorded. For example, a circuit for decoding the encoded data is built into the control circuit. When there is access of the data in the second recording area via the control circuit, the structure need merely be such that the code is decoding and the decoded data is returned. Also, if the control circuit stores information of a storage location of data recorded in the second recording area, and there is a request to access the data, the corresponding storage location of the data need merely be specified, and the data read from the specified storage location be returned.

Upon issuing an access request to the data recorded in the second recording area to the control circuit via the memory card I/F (for example, semiconductor memory-specific identification number), applications that operate in the playback apparatus that request recording to the semiconductor memory card with use of digital distribution, the control circuit that received the request reads the data recorded in the second recording area and returns the data to the application operating in the playback apparatus. Along with the semiconductor memory card-specific identification number, the distribution request for the necessary data need only be requested from the distribution server, and the public key information sent from the distribution server and the corresponding request for distribution of the data, may be recorded to the first recording area.

Also, an application operating in the playback apparatus, that requests recording on the semiconductor memory card with use of digital distribution, before issuing the request to the control circuit via the memory card I/F to access the data recorded on the second recording area (for example, the semiconductor memory card-specific identification numbers), preferably checks in advance whether the application has been altered. For example, a digital certificate compliant with preexisting X.509 specifications may be used in the check for alteration.

Also, access to the distribution data recorded in the first recording area of the semiconductor memory card need not necessarily be access via a control circuit on the semiconductor memory card.

Implementation as a Program

The application program described in the embodiments can be made as described below. First, the software developer, with use of a programming language, writes a source program to realize the content of the flowcharts and the functional structural elements. When writing the source program that embodies the content of the flowcharts and the functional structural elements, the software developer uses the class structures, variables, array variables, and external function calls to write the program in accordance with the syntax of the programming language.

The written source programs are given as files to a compiler. The compiler translates the source programs and creates an object program.

The translation by the compiler is made up of the processes of syntax analysis, optimization, resource allocation, and code generation. Syntax analysis involves performing lexical analysis and semantic analysis of the source programs, and converting the source programs to an intermediary program. Optimization involves performing operations to divide the intermediary program into basic blocks, analyze the control flow of the intermediary program, and analyze the data flow of the intermediary program. In resource allocation, to improve suitability with a command set of a targeted processor, variables in the intermediary program are allocated to a register or a memory in a targeted processor. Code generation is performed by converting the intermediary commands in the intermediary program into program code, and obtaining an object program.

The object program generated here is made up of one or more program codes for executing, on a computer, the steps of the flowcharts and the various processes carried out by the functional structural elements in the embodiments. Here, program code may be any of various types such as native code of a processor or JAVA byte code. There are various formats for realization of the steps by the program code. If it is possible to use external functions to realize the steps, call statements that call such functions become program code. Also, there are cases in which a program code for realizing one step is attributed to separate object programs. In a RISC processor in which command types are limited, the steps of the flowcharts may be realized by combining calculation operation commands, logical calculation commands, branch instruction commands, etc.

When the object programs have been created, the programmer starts up a linker. The linker allocates the object programs and library programs to memory spaces, combines the object programs and library programs into one, and generates a load module. The load module generated thus is anticipated to be read by a computer, and causes the computer to execute the processing procedures and functional structural components shown in the flowcharts. The programs may be provided to users by being recorded on a recording medium that is readable by a computer.

Singular Implementation of the LSI

The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Planar view Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 200.

Such a system LSI can be embedded into various types of devices that can play back images, such as a television, game machine, personal computer, one-segment mobile phone, as well as into the playback apparatus 200. The system LSI thus greatly broadens the use of the present invention.

As shown in the above embodiment, when a buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback apparatus 200 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

In the embodiment, the invention is realized by middleware and hardware corresponding to the system LSI, hardware other than the system LSI, an interface portion corresponding to the middleware, an interface portion to intermediate between the middleware and the system LSI, an interface portion to intermediate between the middleware and the necessary hardware other than the system LSI, and a user interface portion, and when integrating these elements to form the playback apparatus, particular functions are provided by operating the respective elements in tandem.

Appropriately defining the interface corresponding to the middleware and the interface for the middleware and the system. LSI enables parallel, independent development of the user interface portion, the middleware portion, and the system LSI portion of the playback apparatus respectively, and enables more efficient development. Note that there are various ways of dividing up the respective interface portions. For example, when the video decoder, graphics decoder, audio decoder, and adder (composite unit) are fabricated on a single chip, development of an interface portion between the middleware to control these units and the middleware corresponding to these units is performed when developing the chip. After completion, including the developed middleware and interface portion in a storage unit such as a memory of the playback apparatus, along with integrating the chip into the playback apparatus, enables performing development of the playback apparatus and the chip in parallel, thereby improving development efficiency.

Versatility is improved when the same interface portion is used regardless of the type of developed chip and the middleware pertaining to the developed chip.

Needless to say, the portion structured as a system LSI in the above description is not limited to being structured as an LSI, and may instead be configured with use of a signal processing circuit that includes corresponding functions to those to be included in the system LSI.

Recording Medium

The following describes a method of making the recording medium, in other words, a use mode of the recording method for the recording medium on which predetermined data is recorded.

Recording methods pertaining to the above embodiment include not only real time recording in which AV clips and other data are created in real time and written directly to an area on the recording medium, but also a method in which optical disks are mass-produced by creating an entire image of a bit stream to be recorded in a volume area in advance, creating a master disk based on this bit stream, and pressing this disk, namely, pre-format recording. The recording medium pertaining to the above embodiment may also be specified by either a recording method by real time recording, or a recording method by pre-formatting recording.

These recording methods include the following steps: importing data materials such as video, audio, subtitles, and menus; obtaining a PES stream by digitally converting and compression coding imported data materials and encoding according to MPEG; obtaining an AV clip by multiplexing the PES stream; creating AV files and non-AV files in a BD-ROM-compliant file format by inputting a Java™ program and AV files obtained in the multiplexing step, writing non-AV files on the recording medium, and writing AV files on the recording medium.

Positioning Extents in the Volume Area

It has already been explained that when the predetermined data is stored in a file and recorded on the recording medium, the predetermined data is handled in the form of "extents" in the file system. In the recording medium, the addresses of such extents are managed as follows.

Extents are formed in a plurality of physically continuous sectors in partition spaces in the volume area. Partition spaces refer to areas that are structured from "areas in which file set descriptors are recorded", "areas in which terminal descriptors are recorded," "ROOT directory areas", "BDMV directory areas", "JAR directory areas", "BDJO directory areas", "PLAYLIST directory areas", "CLIPINF directory areas", and "STREAM directory areas", and are areas accessed by the file system. The following describes these areas.

"File set descriptors" include logical block numbers (LBN) pointing to which sector, of the areas in the directory, has a file entry of the ROOT directory recorded therein. "Terminal descriptors" indicate a terminal of the file set descriptor.

Next, the details of the directory areas are described. A plurality of directory areas as described above all have a common structure. That is to say, the "directory area" is composed of a "file entry", a "directory file", and a "file recording area for lower rank files".

The "file entry" includes a "descriptor tag", an "ICB tag", and an "allocation descriptor".

The "descriptor tag" is a tag indicating that the file entry is a file entry.

The "ICB tag" indicates attribute information pertaining to the file entry.

The "allocation descriptor" includes a logical block number (LBN) indicating a recording position of directory files. This concludes the description of file entries. The following describes the details of directory files.

"Directory files" include "file identification descriptor for low-rank directory" and "file identification descriptors for low-rank files".

The "file identification descriptor for low-rank directory" is reference information for accessing a low-rank file directory that is under the file entry, and includes identification information that indicates that low-rank directory, a length of a directory name of the lower rank directory, a file entry address that indicates in which logical block number is the low rank directory file entry written, and a directory name of that low rank directory.

The "file identification descriptor for low-rank files" is reference information for accessing a low-rank file that is under the file entry, and includes identification information indicating the low-rank file, a length of the low-rank file name, a file entry address indicating which logical block number stores the file entry therein for the low-rank file, and a file name of the low-rank file.

Since the file identification descriptors in directory files of these directories indicate in which logical block the low-rank directories and file entries of the low-rank files are stored, tracking back these file identification descriptors enables arriving at a file entry of the BDMV directory from the file entry of a ROOT directory, and arriving at a file entry of the PLAYLIST directory from the file entry of the BDMV directory. File entries of the JAR directory, the BDJO directory, the CLIPINF directory, and the STREAM directory can be arrived at similarly.

The "file recording area of low-rank files" is an area in which the substance of a low-rank file under a predetermined directory is stored. A "file entry" and one or more "extents" are stored in the "file recording area of low-rank files".

The "file entry" includes a "descriptor tag", an "ICB tag", and an "allocation descriptor".

The "descriptor tag" is a tag indicating that the file entry is a file entry. There are types of tags such as file entry descriptors, space bit map descriptors, etc., and in the case of file entries, "261" is written as a descriptor tag to indicate a file entry.

The "ICB tag" indicates attribute information pertaining to the file entry.

The "allocation descriptor" includes a logical block number (LBN) indicating a recording position of extents making up the low-rank files under a certain directory. The allocation descriptor includes data indicating an extent length, and a logical block number indicating a recording position of the extent. However, setting the upper 2 bits of data indicating the extent length to "0" indicates an extent for which allocation and recording has finished, and setting the upper 2 bits of data to "1" indicates an extent for which allocation has finished but recording has not finished. Setting to "0" indicates that the extent is a continuing extent of the allocation identifier. When a lower rank file under a certain directory is divided into a plurality of extents, the file entry has a plurality of allocation descriptors for each extent.

Referencing an allocation descriptor of a file entry as described above enables knowing an address of extents that make up PlayList information files, clip information files, AV clip files, BD-J object files, and JAR archive files.

Files that store streams, data, and flags that are the central focus of the present application refer to the file recording areas existing in the directory area of directories to which the files belong, and can be accessed by tracking back file identification descriptors in files of the directory files, and allocation identifiers in the file entries.

File Opening

The following describes processing when reading files on the recording medium to the device.

Since AV streams, Index.bdmv, JAR files, and BD-J objects as described above are recorded on the BD-ROM in accordance with the file structure and the directory structure, the playback device can read these to a memory by performing a system call for file opening.

File opening refers to searching directories by file name given at a time of a system call, and if the file exists, reserving an FCB (File Control Block), and performing processing to return the file handle.

Application of Real-Time Recording

The premise of the previous description is that, in pre-recording technology in an authoring system, AV clips and PlayList information are recorded on a BD-ROM and provided to a user. However, in real time recording, the AV clips and PlayList information may be recorded on a BD-RE, BD-R, hard disk, or semiconductor memory card, and provided to a user.

In this case, AV clips may be transport streams obtained by real time encoding performed by the recording apparatus on an analog input signal, or may be a transport stream obtained by partializing a transport stream that the recording device has entered digitally.

The recording device that executes real-time recording includes a video encoder that obtains a video stream by encoding a video signal, an audio encoder that obtains an audio stream by encoding the audio signal, a multiplexer that obtains an MPEG2-TS format digital stream by multiplexing video streams, audio streams, etc., and a source packetizer that converts TS packets that make up the MPEG2-TS format digital stream into source packets, and store the MPEG2 digital streams that have been converted to the source packet format in AV clip files, and write the stored digital streams on a BD-RE, a BD-R, etc.

The control unit of the recording device writes the digital streams, and also performs processing to generate the clip information and the PlayList information in the memory. Specifically, when recording processing is requested by a user, the control unit creates AV clip files and clip information files on the BD-RE and BD-R.

If a start position of a GOP in an audio stream is detected from a transport stream input from an external device, or a GOP of a video stream is generated by an encoder, the control unit of the recording device acquires a PTS of an intra-picture positioned at the start of this GOP, and a packet number of the source packet that stores the start portion of this GOP, and adds an entry map of the clip information file by pairing this PTS and packet number, and an EP_PTS entry with an EP_SPN entry. Thereafter, each time the GOP is generated, the combination of the EP_PTS entry and the EP_SPN entry is added to the entry map of the clip information file. At this time, when the start of the GOP is an IDR picture, an is_angle_change flag set to "on" is added to the pair of EP_PTS entry and EP_SPN entry. When the start of a GOP is not an IDR picture, an "is_angle_change" flag set to "off" is added to the pair of EP_PTS entry and EP_SPN entry.

Also, the attribute information of a stream in the clip information file is set according to an attribute of a stream to be recorded. In this way, AV clips and clip information are generated and written on a BD-RE or BD-R, and via the entry map in the clip information, PlayList information defining a playback channel is generated, and written to the BD-RE or BD-R. Executing this type of processing in real time recording technology enables obtaining a hierarchical structure such as AV clips—clip information—PlayList information.

Implementation as Playback Device Realizing Managed Copying

The playback device described in the embodiments may have a function of writing digital streams by managed copying.

Managed copying is technology for performing communication with a server and enabling copy execution only in a state in which authorization has been performed and permission received, when copying digital streams, PlayList information, clip information, and application programs recorded on a read-only recording medium such as BD-ROM, etc., to a readable/writable recording medium such as another optical disk (BD-R, BD-RE, DVD-R, DVD-RW, DVD-RAM, etc.), hard disk, removable medium (SD memory card, memory stick, compact flash memory, smart media, multimedia card, etc.). According to this technology, it is possible perform control such as restricting the number of times to perform backup, permitting backup only in state in which billing has been performed, etc.

When realizing copying from a BD-ROM to a BD-R or BD-RE, when a recording amount is the same between a copy source and a copy destination in managed copying, it is sufficient to perform the operation of sequentially copying, from an innermost circumference to an outermost circumference, bit streams in the BD-ROM that is the copy source.

Transcoding is necessary if copying between different types of medium is expected. Here, "transcoding" refers to processing by which a digital stream is made compliant with the application format of the copy destination medium, by converting the format of the digital stream recorded on the BD-ROM from the MPEG2 transport stream format to the MPEG2 program stream format, or lowering the bit rate allocated to the video stream and the audio stream and re-encoding the stream. It is necessary to acquire AV clips, clip information, and PlayList information by performing the above-described real-time recording technology processing for the relevant transcode.

Playback Apparatus Using an on-Demand Manufacturing Service or an Electronic Sell-Through Service (MODEST)

When the playback apparatus 200 supports the function of receiving an on-demand manufacturing service or an electronic sell-through service (MODEST), the BD-J object is written in the following manner.

When the playback apparatus 200 receives the BD-J object supplied via the on-demand manufacturing service or the electronic sell-through service, a default directory and a MODEST directory are created below the root directory of the removable medium, and a BDMV directory is crated below the MODEST directory. The MODEST directory is a first MODEST directory, which is the MODEST directory that is created when the service is received for the first time. At the time of receiving the service for the second time onward, the control unit of the playback apparatus 200 creates another MODEST directory corresponding to each service.

As described above, upon acquiring the BD-J object in which the GUI management table is written, the control unit writes a start-up program to the default directory, and writes the BD-J object to the BDMV directory below the MODEST directory. This start-up program is a first program to be executed when the recording medium is loaded in the recording apparatus 200. The start-up program causes the playback apparatus 200 to display a menu allowing a user to make an operation for selecting a BDMV directory. In response to such a user operation, the playback apparatus 102 executes a root change function. In response to a user operation made on the menu, the root change function causes the playback apparatus to recognize as the root directory the MODEST directory to which the selected BDMV directory belongs. The root change function enables executing playback control, by the same control procedure as playing back the BD-ROM, based on the acquired BD-J object.

Method of Data Structure Writing

Among data structures in the embodiments, repeating structures in which a plurality of information pieces having a specific determined form can be defined by setting an initial value of a control parameter and a repeat condition in a "for" clause.

Also, a condition to be satisfied and a parameter to be set when the condition is satisfied can be written using an "if" clause, that is an arbitrary data structure that defines specified information when a predetermined condition is satisfied. In this way, since the data structure described in the embodiment can be written using the grammar of a high-level programming language, the data structure described in the embodiments passes through a translation process by a compiler, the process including syntax analysis, optimization, resource allocation, and code generation, and is recorded on the recording medium in a state converted to a computer-readable computer code, similarly to the above-described program. In this way, the data structure written in the high-level programming language is treated as a member variable of an array type in a class structure, and forms a portion of the program. In other words, since the data is converted to computer code and recorded on a recording medium, and becomes a member variable of the program the data structure in the embodiments is substantially the same as the program, and is eligible to receive protection as a computer-related invention.

Positioning PlayList Information and Clip Information in the Program

In order to be loaded from a recording medium to a memory and provided for execution by a computer, a program formatted to perform AV playback based on PlayList information includes a plurality of sections in the memory, namely a text section, a data section, a bss section, and a stack section.

The text section is composed of data that does not include program code sequences, initial values, or reconfigurations.

The data section includes initial values, and an arrangement of data that can be reconfigured during execution. Data that is stored in files and accessed as needed is stored in the data section of the recording medium.

The bss section includes an arrangement of data not including initial values. Since the text section accesses the data of the bss section by specifying an address, an area must be reserved for the bss section on a RAM determined during compiling and linking.

The stack section is an area temporarily allotted to a program as necessary. Local parameters to be used temporarily for realizing the processing of the flowchart are stored here.

Initial values are set in the bss section when initializing the program, and necessary areas are reserved in the stack section when initializing the program.

Since the PlayList information and clip information are converted to computer code as described above and recorded on the recording medium, when executing the program, such information is managed as "data that is not reconfigured" in the text section, or "data stored in files and accessed as necessary" in the data section. The PlayList information and clip information described in the embodiments are to be constituent elements of the program at the time of executing the program, and do not qualify as simple data presentation.

The present invention may be any combination of the embodiments and supplementary remarks.

Although the present invention has been fully described by way of example with reference to the accompanying drawings, it is to be noted that various changes and modifications will be apparent to those skilled in the art. Therefore, unless such changes and modifications otherwise depart from the scope of the present invention, they should be constructed as being included therein.

INDUSTRIAL APPLICABILITY

The present invention can be applied to a recording medium on which 3D video contents are recorded, and is particularly effective in a case of realizing a stereoscopic view of a 3D character by a PG stream of a left view and a right view.

REFERENCE SIGNS LIST

100 BD-ROM
200 Playback apparatus
300 Television
400 Liquid crystal shutter goggles
500 Remote control
201 BD drive
202 HDMI interface
203 Playback state/setting register set
204 Non-volatile memory
205 Static scenario memory
206 Playback control engine
207 Heap memory
208 BD-J platform
209 Dynamic scenario memory
210 Mode management module
211 Command interpreter
212 UO detection module
1 Playback unit
2 Read Buffer
3 PID Filter
4a, 4b, 4c, 4d, 4e Transport Buffer 4f Periphery circuit
5a Video Decoder for Left view
5b Video Decoder for Right view
6a Video Plane (L)
6b Video Plane (R)
7 Switch
8a Graphics Decoder for Left view
8b Graphics Decoder for Right view
9a Graphics Plane for Left view
9b Graphics Plane for Right view
10a CLUT UNIT for L
10b CLUT UNIT for R
11a OFFSET UNIT for L
11b OFFSET UNIT for R
12 CLUT output switch
13 Adder
14 Audio Decoder

The invention claimed is:

1. A non-transitory recording medium on which is recorded a video stream, a left view graphics stream and a right view graphics stream, wherein
the left view graphics stream and the right view graphics stream each include one or more display sets,
each display set is a data group used for displaying one screen worth of one or more graphics objects,
the one or more display sets included in the left view graphics stream are in one-to-one correspondence with the one or more display sets included in the right view graphics stream, and an identical playback time for the video stream on a playback time axis is set in display sets that correspond with each other,
each display set includes state information indicating that the display set is one of (i) all data necessary for displaying the one screen worth of one or more graphics objects, and (ii) a difference from an immediately previous display set,
identical content is indicated by the state information included in display sets that correspond with each other in the left view graphics stream and the right view graphics stream,
each display set includes a plurality of function segments, the plurality of function segments including a presentation composition segment and one or more object definition segments,
the graphics objects are defined by the object definition segments,
the presentation composition segment is a functional segment that specifies a screen structure with use of the graphics objects,
the state information is included in the presentation composition segment,
each presentation composition segment includes a screen structure number,
the screen structure number indicates which number display set the presentation composition segment belongs to, and
an identical screen structure number is set in presentation composition segments included in display sets that correspond with each other in the left view graphics stream and the right view graphics stream.

2. A non-transitory recording medium on which is recorded a video stream, a left view graphics stream and a right view graphics stream, wherein
the left view graphics stream and the right view graphics stream each include one or more display sets,
each display set is a data group used for displaying one screen worth of one or more graphics objects,
the one or more display sets included in the left view graphics stream are in one-to-one correspondence with the one or more display sets included in the right view graphics stream, and an identical playback time for the video stream on a playback time axis is set in display sets that correspond with each other,
each display set includes state information indicating that the display set is one of (i) all data necessary for displaying the one screen worth of one or more graphics objects, and (ii) a difference from an immediately previous display set,
identical content is indicated by the state information included in display sets that correspond with each other in the left view graphics stream and the right view graphics stream,
each display set includes a plurality of function segments, the plurality of function segments including a presentation composition segment and one or more object definition segments,
the graphics objects are defined by the object definition segments,
the presentation composition segment is a functional segment that specifies a screen structure with use of the graphics objects,
the state information is included in the presentation composition segment,
each presentation composition segment includes a forced display flag,
the forced display flag is a flag that specifies whether to forcibly cause a playback device to display the graphics objects in a display set to which the presentation composition segment belongs, and
identical content is indicated by forced display flags in presentation composition segments included in display sets that correspond with each other in the left view graphics stream and the right view graphics stream.

3. A non-transitory recording medium on which is recorded a video stream, a left view graphics stream and a right view graphics stream, wherein
the left view graphics stream and the right view graphics stream each include one or more display sets,
each display set is a data group used for displaying one screen worth of one or more graphics objects,
the one or more display sets included in the left view graphics stream are in one-to-one correspondence with the one or more display sets included in the right view graphics stream, and an identical playback time for the video stream on a playback time axis is set in display sets that correspond with each other,
each display set includes state information indicating that the display set is one of (i) all data necessary for displaying the one screen worth of one or more graphics objects, and (ii) a difference from an immediately previous display set,
identical content is indicated by the state information included in display sets that correspond with each other in the left view graphics stream and the right view graphics stream,
each display set includes a plurality of function segments, the plurality of function segments including a presentation composition segment and one or more object definition segments,
the graphics objects are defined by the object definition segments,
the presentation composition segment is a functional segment that specifies a screen structure with use of the graphics objects, the state information is included in the presentation composition segment, the left view graphics stream and the right view graphics stream are packetized elementary streams (PESs), the presentation composition segment is stored in one or more PES packets, the playback time is added to the PES packet that stores the presentation composition segment, and the playback time indicates at what time to execute the display of the graphics objects in the display set to which the presentation composition segment belongs.

4. A playback apparatus for the non-transitory recording medium as recited in claim 1, comprising:

a read unit operable to read the left view graphics stream and the right view graphics stream from the non-transitory recording medium; and a controller operable to specify a left view screen structure based on a display set including a plurality of function segments extracted from the read left view graphics stream and specify a right view screen structure based on a display set including a plurality of function segments extracted from the read right view graphics stream.

5. A playback method for the non-transitory recording medium as recited in claim 1, comprising:

reading the left view graphics stream and the right view graphics stream from the non-transitory recording medium;

specifying a left view screen structure based on a display set including a plurality of function segments extracted from the read left view graphics stream; and specifying a right view screen structure based on a display set including a plurality of function segments extracted from the read right view graphics stream.

6. A playback apparatus for the non-transitory recording medium as recited in claim 2, comprising:

a read unit operable to read the left view graphics stream and the right view graphics stream from the non-transitory recording medium; and a controller operable to specify a left view screen structure based on a display set including a plurality of function segments extracted from the read left view graphics stream and specify a right view screen structure based on a display set including a plurality of function segments extracted from the read right view graphics stream.

7. A playback method for the non-transitory recording medium as recited in claim 2, comprising:

reading the left view graphics stream and the right view graphics stream from the non-transitory recording medium;

specifying a left view screen structure based on a display set including a plurality of function segments extracted from the read left view graphics stream; and specifying a right view screen structure based on a display set including a plurality of function segments extracted from the read right view graphics stream.

8. A playback apparatus for the non-transitory recording medium as recited in claim 3, comprising:

a read unit operable to read the left view graphics stream and the right view graphics stream from the non-transitory recording medium; and a controller operable to specify a left view screen structure based on a display set including a plurality of function segments extracted from the read left view graphics stream and specify a right view screen structure based on a display set including a plurality of function segments extracted from the read right view graphics stream.

9. A playback method for the non-transitory recording medium as recited in claim 3, comprising:

reading the left view graphics stream and the right view graphics stream from the non-transitory recording medium;

specifying a left view screen structure based on a display set including a plurality of function segments extracted from the read left view graphics stream; and specifying a right view screen structure based on a display set including a plurality of function segments extracted from the read right view graphics stream.

* * * * *